US009664197B2

(12) United States Patent
Walker et al.

(10) Patent No.: US 9,664,197 B2
(45) Date of Patent: May 30, 2017

(54) ELECTRICAL CONNECTOR WITH A JUMPER SWITCH AND PUSH-IN PORTS

(71) Applicant: Hunter Fan Company, Memphis, TN (US)

(72) Inventors: William Walter Walker, Walls, MS (US); Benjamin David Stout, Cordova, TN (US); Rickey Thomas Jones, Memphis, TN (US); Douglas Troy Mason, Horn Lake, MS (US)

(73) Assignee: Hunter Fan Company, Memphis, TN (US)

( * ) Notice: Subject to any disclaimer, the term of this patent is extended or adjusted under 35 U.S.C. 154(b) by 0 days.

(21) Appl. No.: 14/883,975

(22) Filed: Oct. 15, 2015

(65) Prior Publication Data
US 2016/0111816 A1    Apr. 21, 2016

Related U.S. Application Data

(60) Provisional application No. 62/064,606, filed on Oct. 16, 2014, provisional application No. 62/165,338, filed on May 22, 2015.

(51) Int. Cl.
| | |
|---|---|
| *H01R 31/08* | (2006.01) |
| *F04D 25/08* | (2006.01) |
| *F04D 25/06* | (2006.01) |
| *F04D 29/60* | (2006.01) |
| *H01R 13/70* | (2006.01) |
| *H01R 29/00* | (2006.01) |

(Continued)

(52) U.S. Cl.
CPC ....... *F04D 25/088* (2013.01); *F04D 25/0693* (2013.01); *F04D 29/601* (2013.01); *H01R 13/701* (2013.01); *H01R 29/00* (2013.01);

*H01R 31/08* (2013.01); *H01R 4/4827* (2013.01); *H01R 13/26* (2013.01)

(58) Field of Classification Search
CPC .... H01R 4/4818; H01R 4/4836; H01R 9/093; H01R 31/08; H01R 31/085; H01R 11/24; H01R 13/7032
USPC ................................ 439/441, 507, 537, 542
See application file for complete search history.

(56) References Cited

U.S. PATENT DOCUMENTS

| 4,227,762 A | 10/1980 | Scheiner |
|---|---|---|
| 4,637,673 A | 1/1987 | Yang |
| 4,721,480 A | 1/1988 | Yung |

(Continued)

FOREIGN PATENT DOCUMENTS

GB        2166294 A        4/1986

*Primary Examiner* — Chandrika Prasad
(74) *Attorney, Agent, or Firm* — McGarry Bair PC

(57) ABSTRACT

A plurality ceiling fan kits comprising one or more pre-wired downrods or a set of pre-wired downrods having internal wiring terminating on one or more ends in wire leads made of electrically conductive materials. Different electrical connectors, for use with the ceiling fan kits and pre-wired downrods, are adapted to electrically couple one or more sets of wiring by pushing in the electrically conductive wire leads into a plurality of ports disposed on the electrical connectors. The electrical connectors may include a jumper for switching between a single- and dual-power supply switch configuration and indicia for identifying the insertion of a wire into a corresponding port. A method of mounting a ceiling fan to a structure having an electrical supply, utilizing the pre-wired downrods and the electrical connectors.

12 Claims, 39 Drawing Sheets

(51) Int. Cl.
*H01R 4/48* (2006.01)
*H01R 13/26* (2006.01)

(56) References Cited

U.S. PATENT DOCUMENTS

| | | | |
|---|---|---|---|
| 4,784,614 A | 11/1988 | Sadigh-Behzadi | |
| 4,820,193 A | 4/1989 | Noorily | |
| 4,824,395 A * | 4/1989 | Blaha | H01R 4/4818 439/438 |
| 4,990,099 A | 2/1991 | Marin et al. | |
| 5,267,882 A | 12/1993 | Davis | |
| 6,161,278 A | 12/2000 | Easter et al. | |
| 6,296,377 B1 | 10/2001 | Wilson et al. | |
| 6,322,232 B1 | 11/2001 | Oliver | |
| 6,464,524 B1 | 10/2002 | Kerr, Jr. et al. | |
| 6,503,099 B2 | 1/2003 | Kerr, Jr. | |
| 6,648,488 B1 | 11/2003 | Pearce | |
| 6,780,049 B1 | 8/2004 | D'Angelo et al. | |
| 6,799,982 B2 | 10/2004 | Kerr, Jr. | |
| 6,923,675 B2 | 8/2005 | Gorin | |
| 6,997,740 B2 | 2/2006 | Kerr | |
| 7,297,019 B2 | 11/2007 | Landis et al. | |
| 7,297,022 B2 | 11/2007 | Pearce | |
| D574,772 S | 8/2008 | Sutter | |
| D574,773 S | 8/2008 | Sutter | |
| D580,360 S | 11/2008 | Vitito | |
| D580,371 S | 11/2008 | Farahani | |
| D580,866 S | 11/2008 | Vitito | |
| 7,473,123 B1 | 1/2009 | Breen, IV et al. | |
| 7,722,384 B2 | 5/2010 | Breen, IV | |
| 7,753,718 B2 * | 7/2010 | Bethurum | H01R 4/4818 439/293 |
| 7,771,217 B2 | 8/2010 | Bethurum et al. | |
| 7,777,147 B2 | 8/2010 | Wong et al. | |
| 7,887,353 B2 | 2/2011 | Bethurum et al. | |
| 7,988,481 B2 * | 8/2011 | Bethurum | H01R 4/4818 439/293 |
| 8,025,528 B2 | 9/2011 | Smith | |
| 8,162,690 B2 | 4/2012 | Smith | |
| 8,235,748 B2 | 8/2012 | Lacey et al. | |
| 8,303,336 B2 | 11/2012 | Smith | |
| 8,357,004 B2 | 1/2013 | Tao et al. | |
| 8,376,777 B2 | 2/2013 | Smith | |
| 8,579,650 B2 | 11/2013 | Keswani | |
| 2002/0163812 A1 | 11/2002 | Tseng | |
| 2005/0164552 A1 * | 7/2005 | Wlos | H01R 13/6277 439/578 |
| 2006/0286864 A1 * | 12/2006 | Bethurum | H01R 4/4818 439/595 |
| 2012/0149231 A1 * | 6/2012 | Keswani | H01R 4/4818 439/355 |
| 2013/0130537 A1 * | 5/2013 | Keswani | H01R 24/78 439/355 |

* cited by examiner

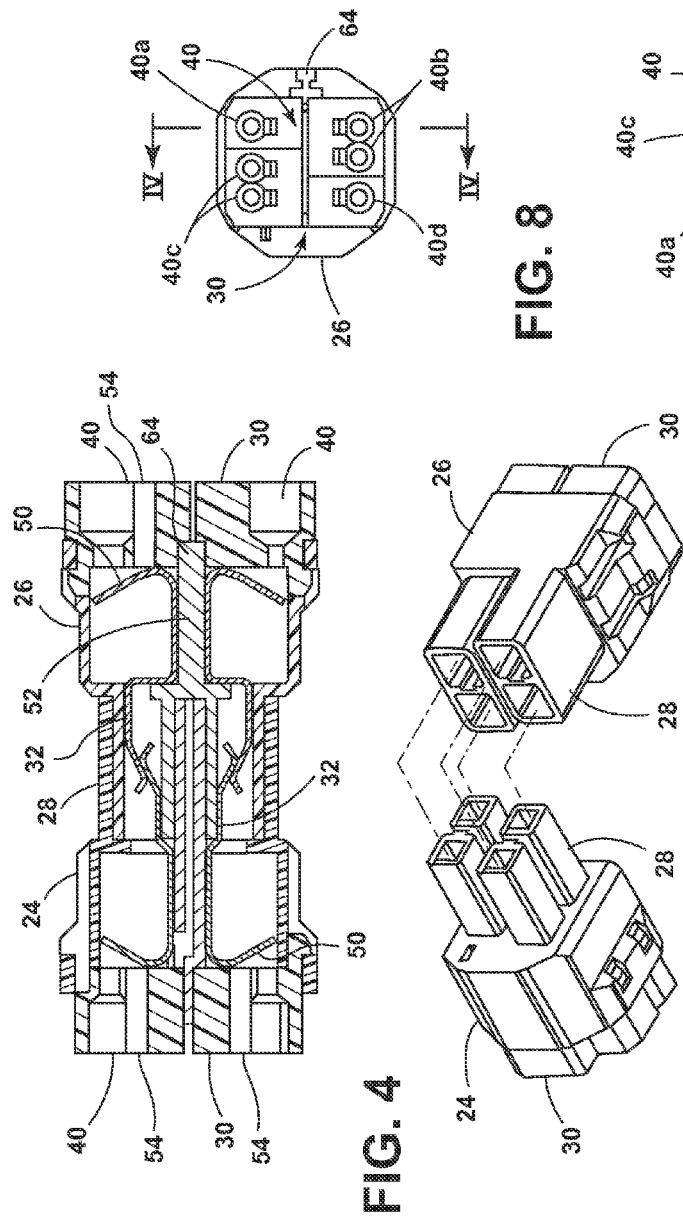

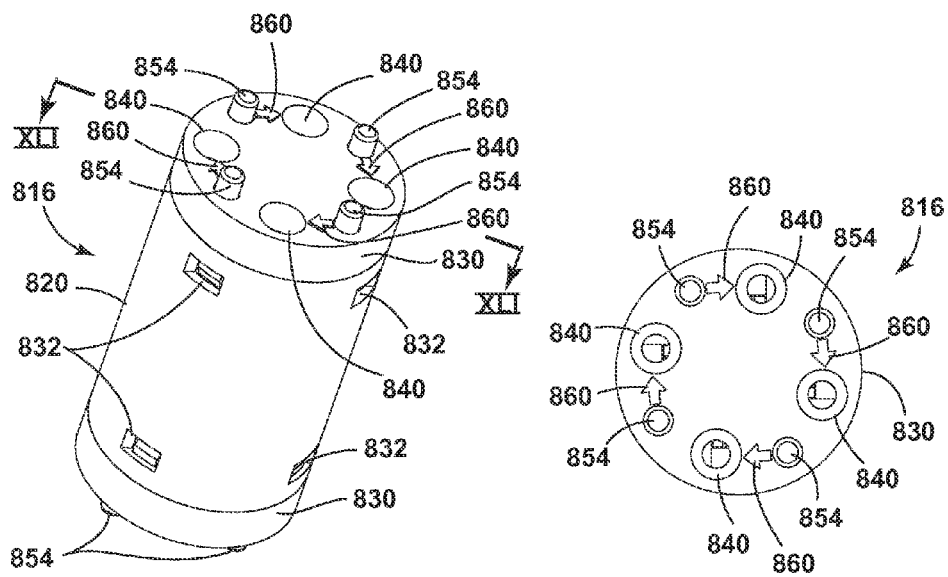
FIG. 37
FIG. 38
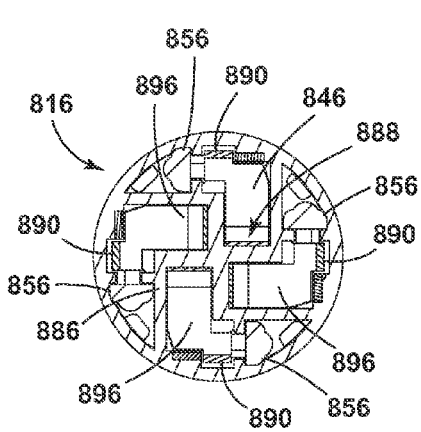
FIG. 39
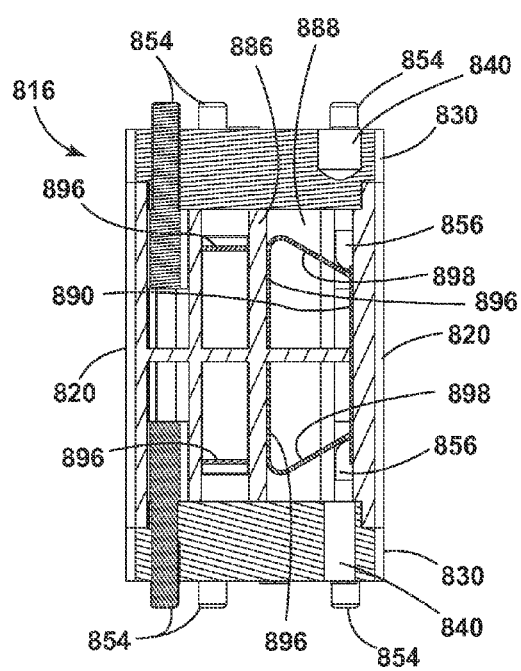
FIG. 40

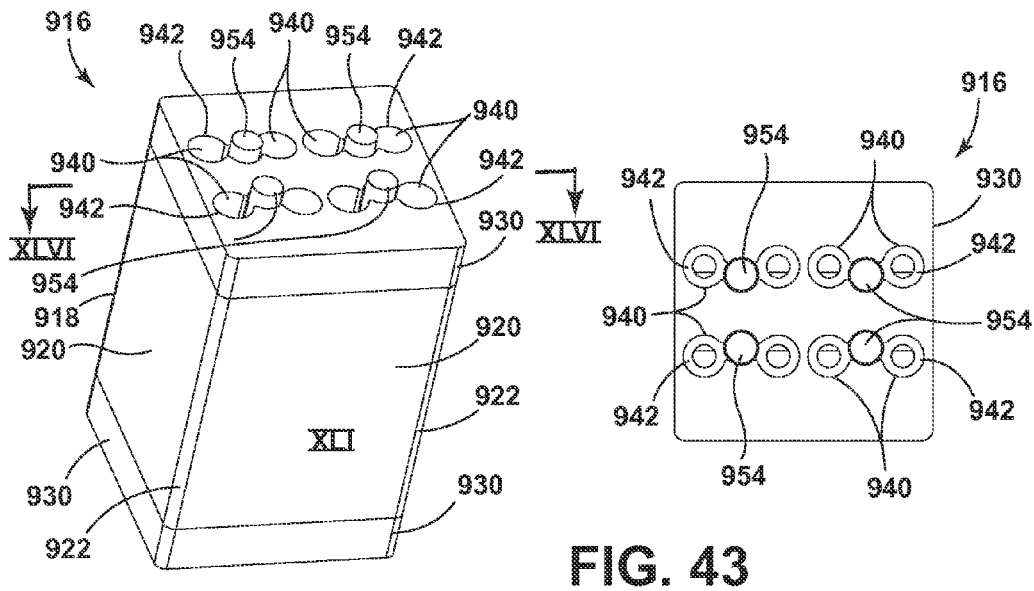
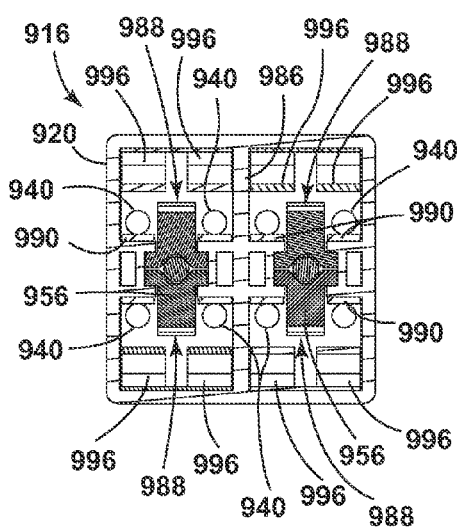
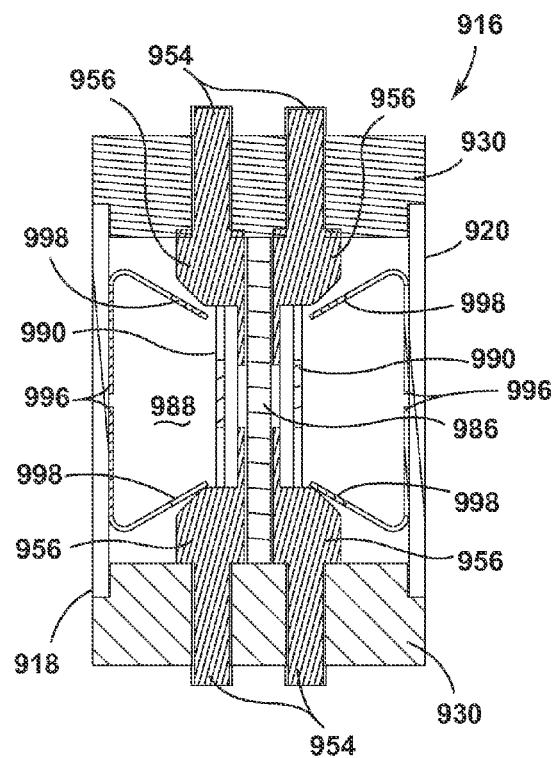
FIG. 42
FIG. 43
FIG. 44
FIG. 45

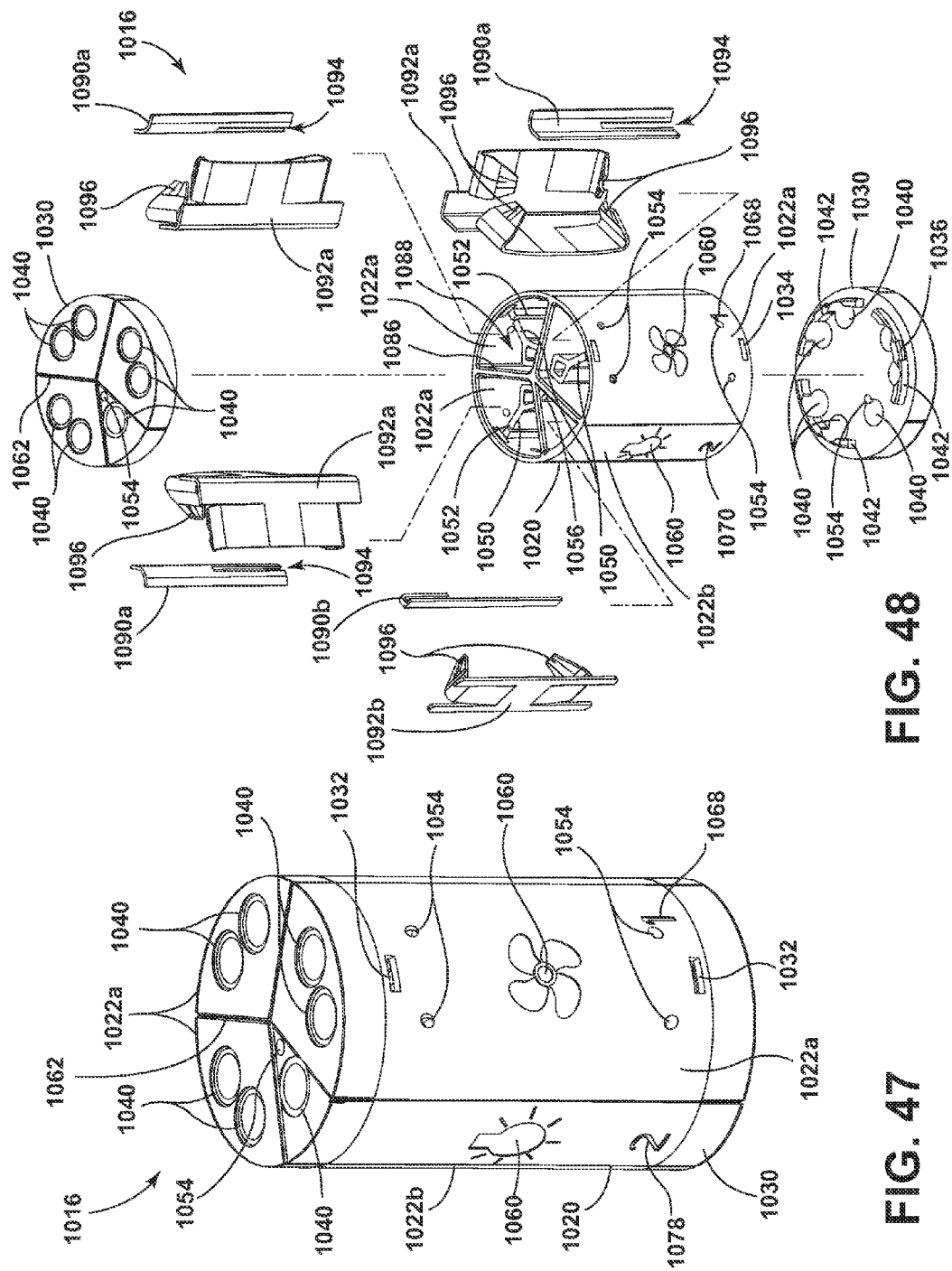

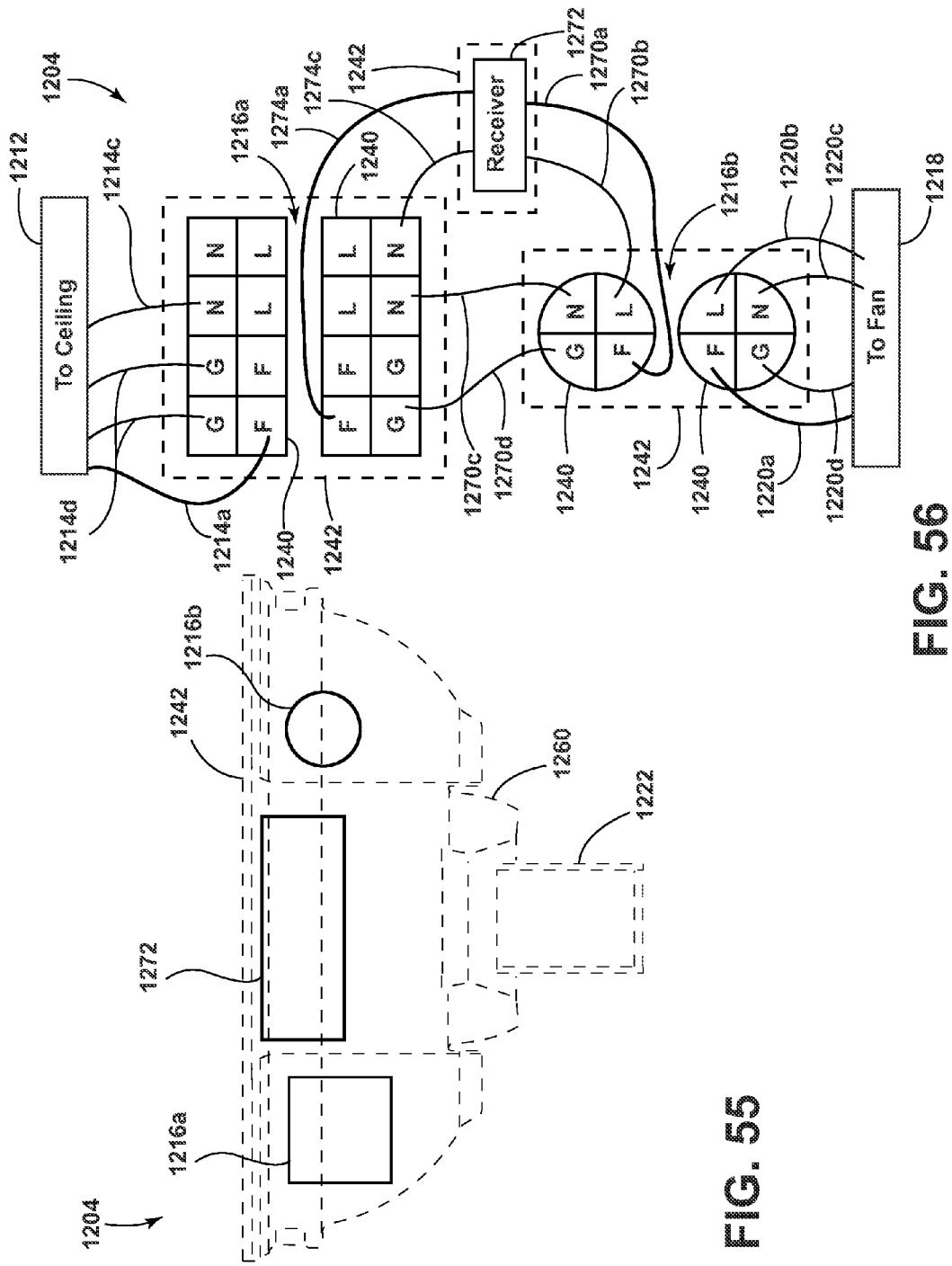

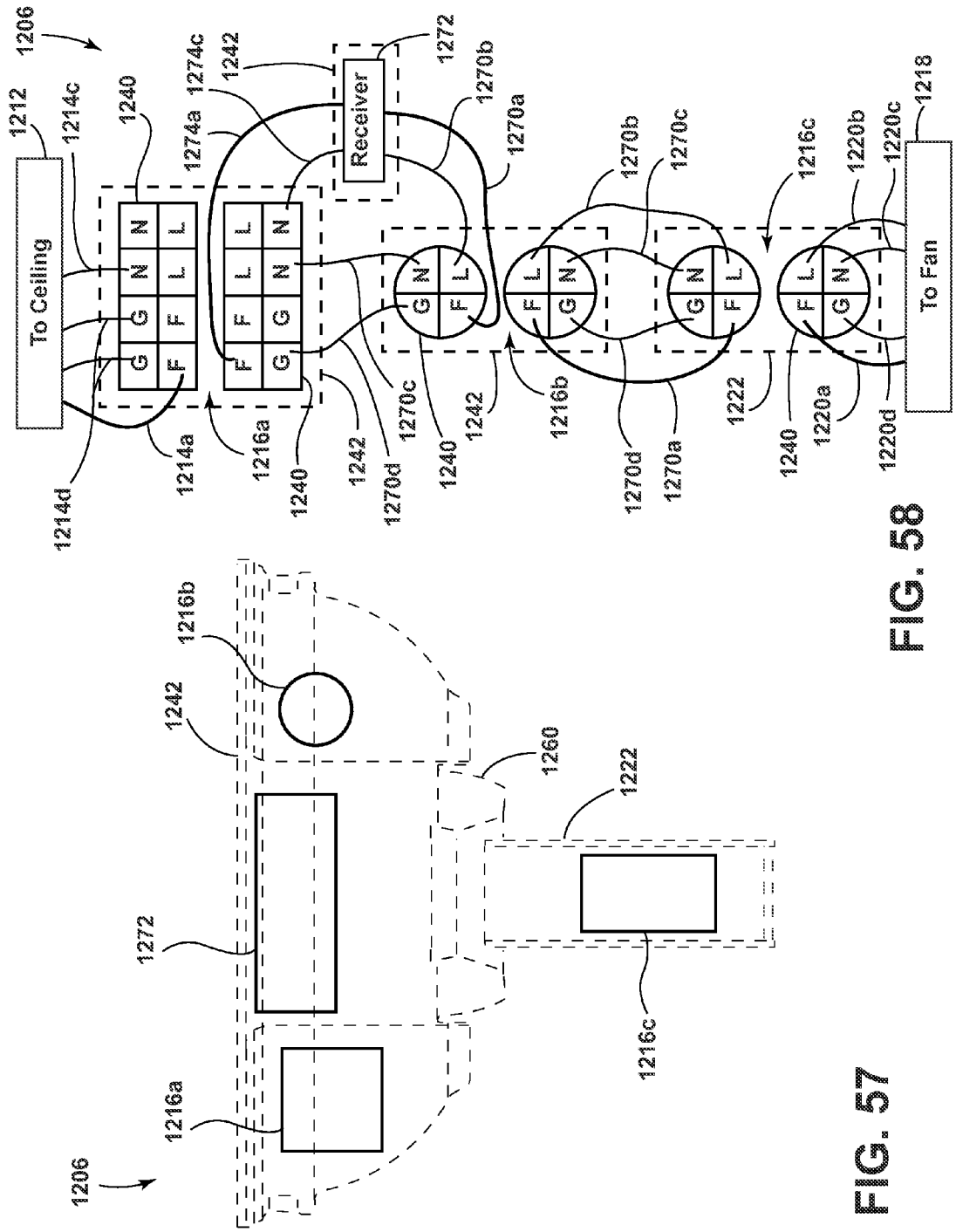

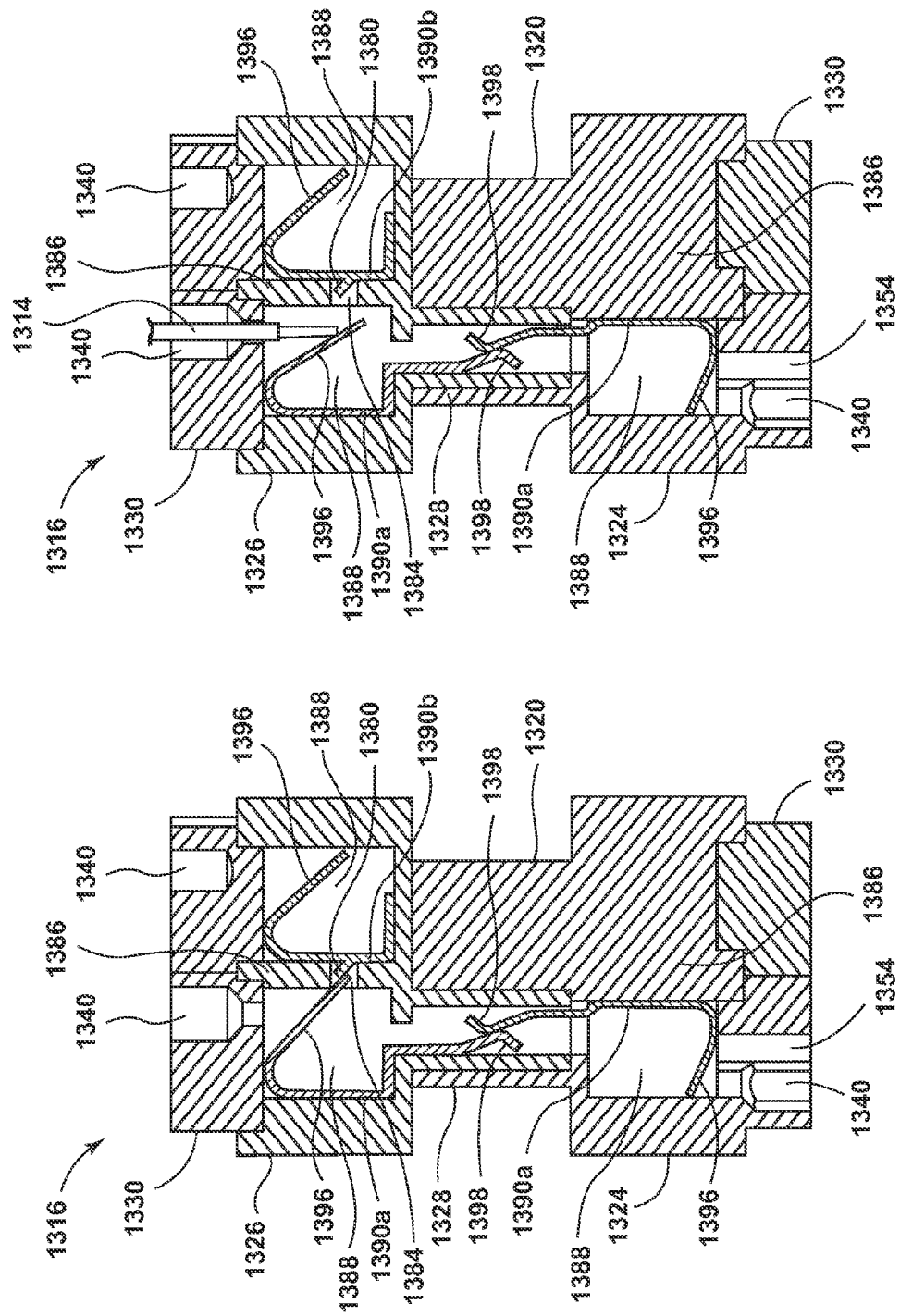

ELECTRICAL CONNECTOR WITH A JUMPER SWITCH AND PUSH-IN PORTS

CROSS REFERENCE TO RELATED APPLICATIONS

This application claims the benefit U.S. Provisional Application No. 62/064,606 filed Oct. 16, 2014, and to U.S. Provisional Application No. 62/165,338 filed May 22, 2015, which are incorporated herein by reference in their entirety.

BACKGROUND

Traditionally, ceiling fan installation is laborious, time consuming and often a cumbersome practice. The conventional ceiling fan includes a structure mount or ceiling plate, which secures to an electric outlet box by passing the lead wires of the outlet box through a central opening in the structure mount. Mounting screws pass through two elongated openings in the structure mount to threadably engage with two threaded holes diagonally separated from each other on the periphery of the outlet box. Alternatively, wood screws pass through the structure mount and the outlet box and into the building structure supporting the outlet box. In either event, the screws tighten until the structure mount securely couples to the structure or outlet box.

A typical ceiling fan assembly comprises a motor, a motor housing, a plurality of fan blades, a canopy, and an optional light assembly, which secures to the ceiling plate or structure mount by a downrod or a hanger rod. The downrod passes through a central opening in the canopy. One end of the downrod couples to a downrod coupler for mounting to the structure mount while the opposite end of the downrod mounts to the ceiling fan assembly, utilizing a motor coupler. A ball attaches to the downrod coupler and is received in a seat firmed in the structure mount, mounting the ceiling fan assembly to the structure mount, and thus the ceiling fan to the ceiling.

Traditionally, ceiling fans are sold with a single mounting style based on ceiling height, being either a low-profile mount, a normal profile mount, or a high or angled profile mount. Each mounting style attaches the ceiling fan either closer to or further from the ceiling based upon the height of the ceiling. For example, a low ceiling, being less than 8 feet tall will utilize a low-profile mount, mounting the fan close to the ceiling. Conversely, a high ceiling, being greater than ten feet tall will utilize a high profile mount, mounting the fan further from the ceiling.

Structure electrical wires extending through the ceiling to the structure mount connect to the fan electrical wires, which normally extend from the fan motor to a position adjacent the structure mount. Connecting the electrical wires is a time consuming and cumbersome practice, involving: (1) threading electrical wires through the various parts of the ceiling fan assembly, often including a downrod; (2) cutting and stripping the fan wires per manufacturer's instruction; (3) joining the structure electrical wires to the fan electrical wires by using wire connectors, such as wire nuts, per manufacturer's instructions, which may include both single and dual wall switch wiring instructions; (4) securing the wire connectors with electrical tape; and (5) tucking wires into the electrical box ensuring the live wires and ground wires are on opposite sides of the electrical box.

Cutting, stripping, and joining the wires during fan installation is often the most cumbersome task of the process. Typically, a ceiling fan manufacturer provides the fan electrical wires with a length sufficient to allow them to couple with the structure electrical wires according to the length of the downrod. The fan electrical wire length, which is commonly fifty-four to seventy-eight inches, is typically enough to mount the ceiling fan to a relatively tall ceiling. However, if the ceiling fan mounts to a relatively short ceiling, the installer must cut the fan electrical wires to an appropriate length. Furthermore, if fan electrical wires are included for a short ceiling fan, installation on a taller ceiling requires the connection of additional wiring to reach the structure electrical wires in the area of the structure mount.

BRIEF SUMMARY

The invention generally relates to ceiling fan apparatuses, and particularly to electrical connectors and downrods used for installation thereof.

In one embodiment, a ceiling fan adapted to couple to a structure having electrical wiring by way of a push-in connector. The ceiling fan comprises an electric motor having electrical wiring leads threadable through a canopy assembly adapted to be mounted to a ceiling structure, wherein the fan motor electrical wire leads are releasably connected to a push-in connector. The push-in connector comprises a plug portion and socket portion, each having a proximal and distal end. The plug portion and socket portion releasably connect at the proximal end to form a plug and socket combination. Each plug and socket portion comprises a distal end comprising a plurality of single or dual ports or receptacles capable of connecting to a plurality of tin dipped electrical wire releasably connected to the push-in connector. In one embodiment, the push-in connector has a jumper switch, which allows electrical connection between either one or two live wires.

According to another embodiment of the invention, a method for mounting a ceiling fan to a structure having an electrical supply includes selecting a pre-wired downrod from a set of pre-wired downrods having different lengths, electrically coupling a first set of wire leads from the pre-wired downrod to a motor, mechanically coupling the selected pre-wired downrod to the ceiling fan, electrically coupling a second set of wire leads from the pre-wired downrod to an electrical supply, and mechanically coupling the selected pre-wired downrod to the structure.

According to another embodiment of the invention, a ceiling fan mounting kit includes a set of pre-wired downrods having a hollow interior, with wiring passing through the hollow interior terminating on opposite ends in wire leads, and a hanger bracket configured to mount the pre-wired downrods to a structure.

According to another embodiment of the invention, a ceiling fan kit includes a set of pre-wired downrods, each with a hollow interior having wiring passing through the hollow interior, with the wiring terminating in a first and second set of wire leads on opposite ends, a structure mount configured to mount the pre-wired downrods to a structure, a fan motor assembly having wiring, with the wiring terminating in a third set of wire leads, at least one electrical connector configured to couple to at least one of the first, second, or third set of wire leads, and a set of blades configured to mount to the fan motor assembly.

According to another embodiment of the invention, a ceiling fan kit for mounting to a structure with a power supply having power supply wire leads includes at least one downrod having a hollow interior, having first and second openings providing access to the hollow interior, wiring having first and second ends corresponding to first and second wire leads, a structure mount configured to mount the at least one downrod to a structure, a fan motor assembly having wiring terminating in a third wire leads, and a first electrical connector having a releasably connectable plug and socket, each plug and socket having push-in ports for receiving the first wire leads and the power supply wire leads, and a jumper switch for switching between a first position and a second position where the first position corresponds to a single power supply configuration and the second position corresponds to a dual power supply configuration.

According to another embodiment of the invention, an electrical connector includes a plug having a first set of push-in ports including at least two live wire push-in ports, a socket having a second set of push-in ports including at least two live wire push-in ports, and a jumper on one of the plug and socket, operable between a first condition where the corresponding at least two live wire push-in ports are electrically disconnected, and a second condition where the corresponding at least two live wire push-in ports are electrically connected.

According to another embodiment of the invention, an electrical connector includes a body having a first set of push-in ports, with at least two live wire push-in ports, and a second set of push-in ports including at least two live wire push-in ports, and a jumper carried by the body, operable between a first and second condition where the first condition corresponds to at least two live wire push-in ports being electrically disconnected, and a second condition corresponding to at least two live wire push-in ports being electrically connected.

BRIEF DESCRIPTION OF THE DRAWINGS

In the drawings:

FIG. 4 illustrates the internal components of the push-in connector of FIG. 1 taken about the cross-section of FIG. 8.

FIG. 5 illustrates the push-in connector separated into a plug and socket component.

FIG. 6 illustrates a proximal end of the plug portion of the push-in connector.

FIG. 7 illustrates a proximal end of the socket portion of the push-in connector.

FIG. 8 illustrates a distal end of the socket for the fan side ports of the push-in connector.

FIG. 9 illustrates a distal end of the plug for the structure side ports of the push-in connector.

FIG. 37 illustrates a perspective view of a four-port push-in connector according to another embodiment of the push-in connector.

FIG. 38 illustrates a top view of the push-in connector of FIG. 37.

FIG. 39 illustrates a top view of the push-in connector of FIG. 37 with a distal end removed for clarity.

FIG. 40 illustrates a sectional view of the push-in connector of FIG. 37 showing the internal wiring connections.

FIG. 42 illustrates a perspective view of an eight-port push-in connector according to another embodiment of the push-in connector.

FIG. 43 illustrates a top view of the push-in connector of FIG. 42.

FIG. 44 illustrates a top view of the push-in connector of FIG. 42 with the distal end removed for clarity.

FIG. 45 illustrates a sectional view of the internal components of the push-in connector of FIG. 42.

FIG. 47 illustrates a perspective view of a seven-port push-in connector according to another embodiment of the push-in connector.

FIG. 48 illustrates an exploded view of the push-in connector of FIG. 47.

FIG. 55 illustrates a view of a push-in connector, a receiver, and another push-in connector disposed within a ceiling fan canopy according to another embodiment of the invention.

FIG. 56 illustrates a schematic view of the push-in connector of FIG. 55 electrically coupling a fan to structure wiring and a receiver.

FIG. 57 illustrates a view of a push-in connector, a receiver, a second push-in connector disposed within a ceiling fan canopy, and a third push-in connector disposed within a downrod according to another embodiment of the invention.

FIG. 58 illustrates a schematic view of the push-in connector of FIG. 57 coupling a ceiling fan to structure wiring and a receiver.

FIG. 59 illustrates an internal view another embodiment of the push-in connector without the need for a jumper.

FIG. 60 illustrates the push-in connector of FIG. 59 having a smaller busbar electrically uncoupled from an adjacent larger busbar.

DETAILED DESCRIPTION

Figure 17:
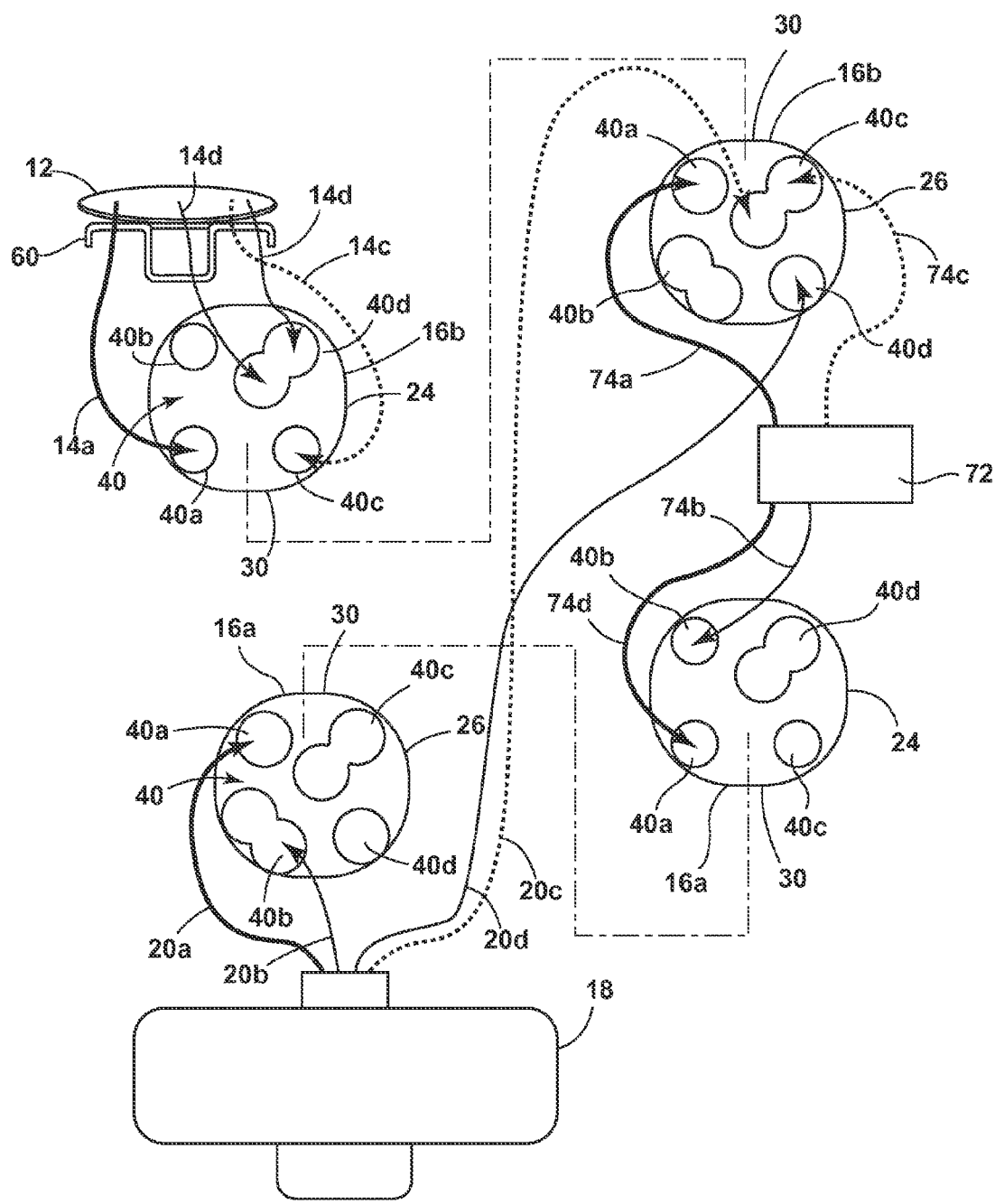
FIG. 17 illustrates a schematic view of a fan assembly with two push-in connectors electrically connecting the fan assembly to a structure, while interconnecting a receiver.
Figure 18:
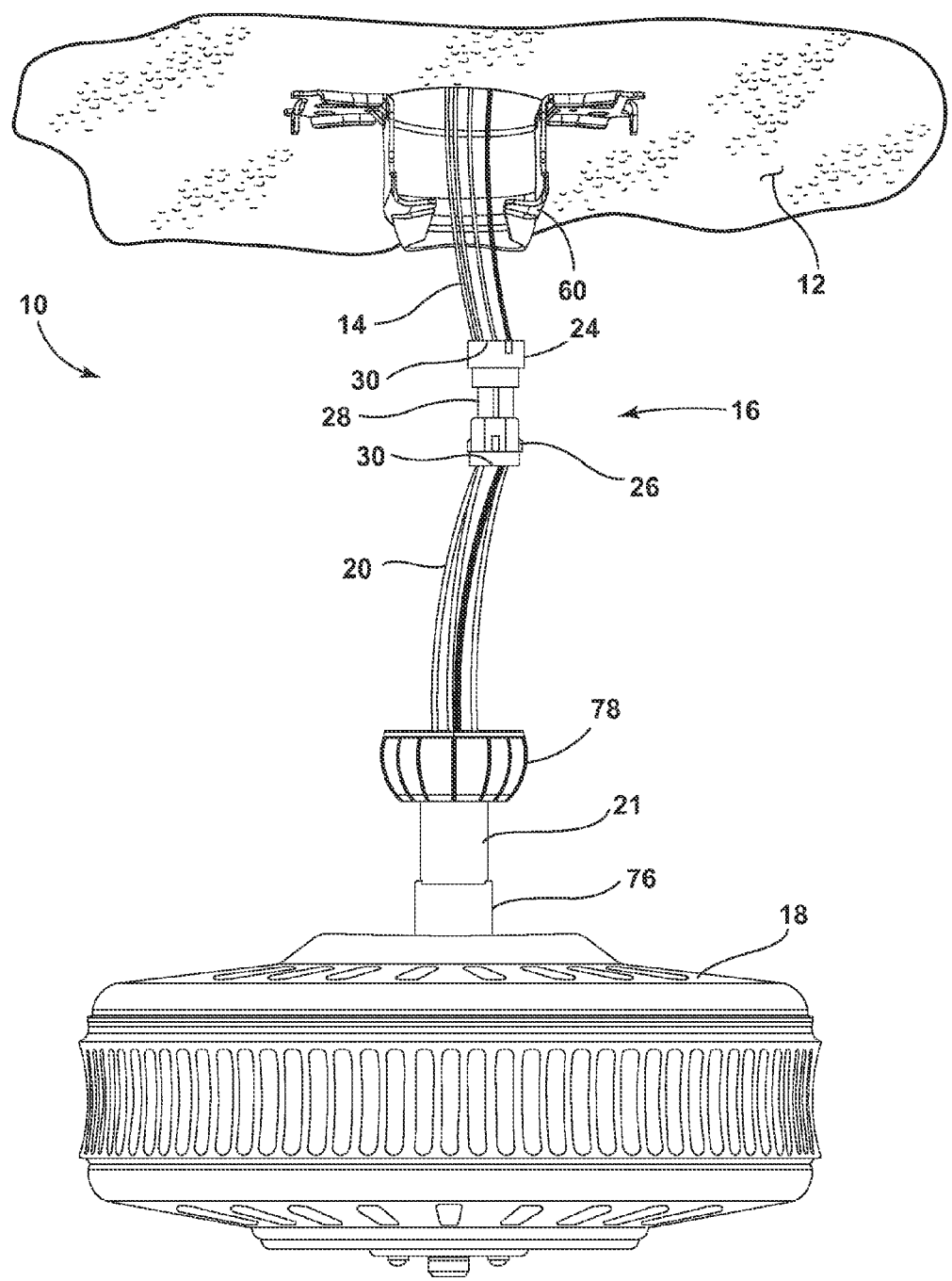
FIG. 18 illustrates an installation coupling the ceiling fan assembly with the structure using a non-pre-wired downrod with one push-in connector.
Figure 19:
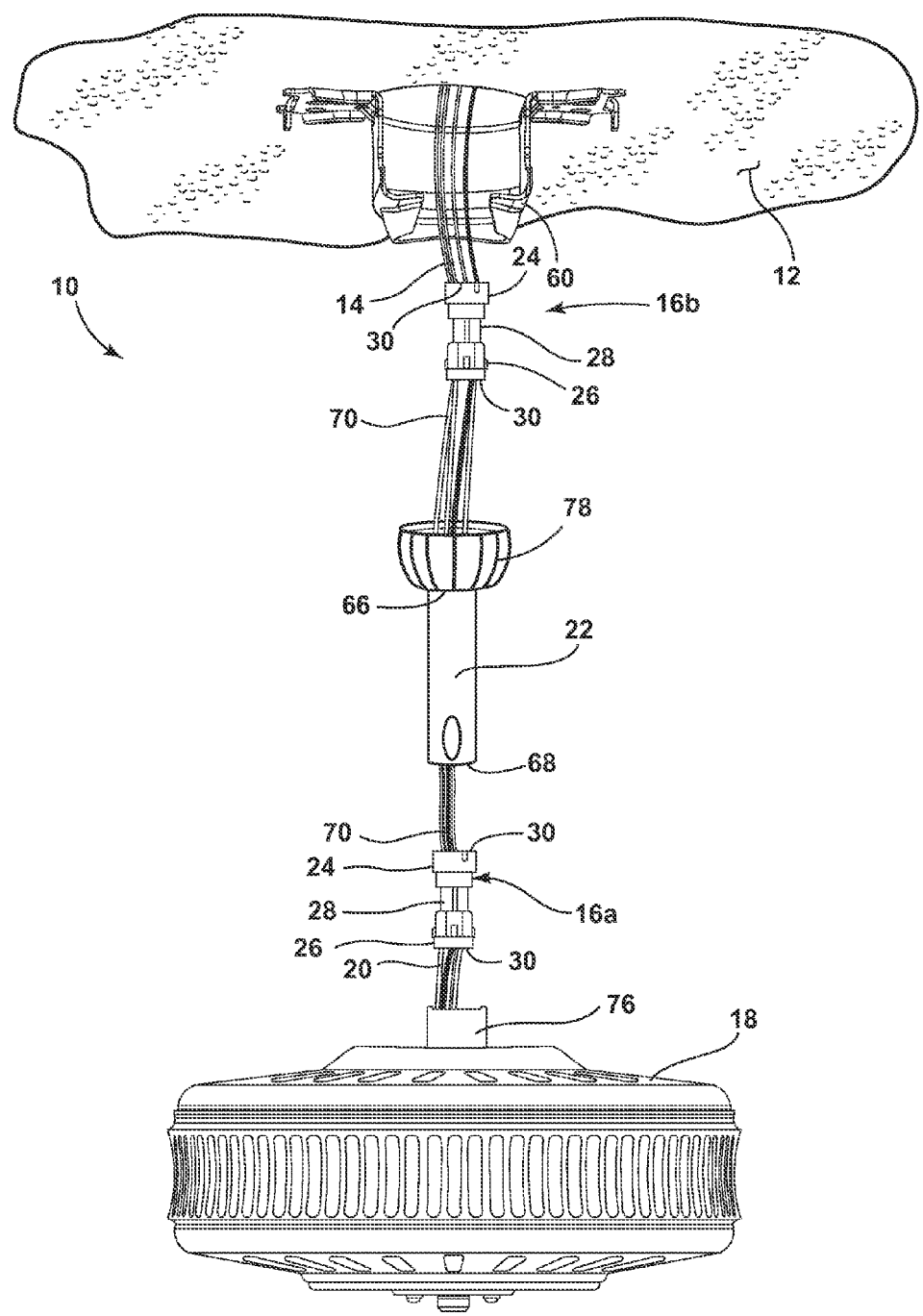
FIG. 19 illustrates an installation coupling the ceiling fan assembly with the structure using a pre-wired downrod with two push-in connectors.
Figure 20:
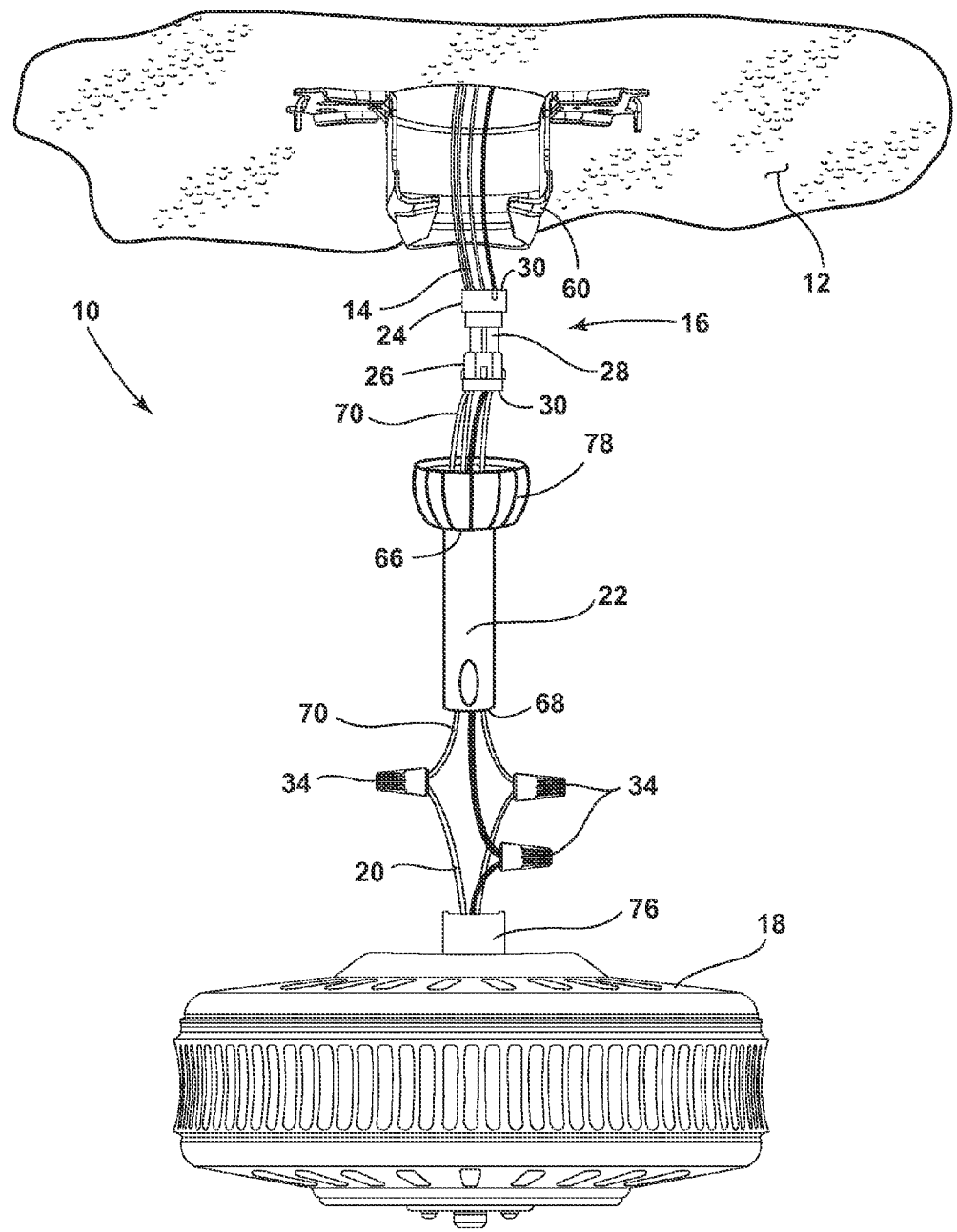
FIG. 20 illustrates an installation coupling the ceiling fan assembly with the structure using a pre-wired downrod with one push-in connector and wire nuts.

Referring generally to FIGS. 1-20, and more specifically to FIGS. 18-20, a ceiling fan 10 adapted to be coupled to a ceiling or other structure 12 having electrical wiring leads 14a-14e by way of a push-in connector 16 is disclosed. The ceiling fan 10 comprises a fan motor assembly 18 with an electric motor (not shown) having electrical fan wiring leads 20a-20d, threadable through a downrod 21 or pre-threaded through a pre-wired downrod 22, and/or canopy assembly (not shown) adapted to be mounted to the ceiling 12, wherein the electrical fan wiring leads 20a-20d are releasably connected to the push-in connector 16. Referring generally to FIGS. 1-20, the push-in connector 16 separates into a plug portion 24 and socket portion 26 (FIG. 5), each having a proximal end 28 and a distal 30 end, with the proximal direction defined at the one closer to each other. The plug portion 24 and socket portion 26 releasably connect at the proximal ends 28 to form a plug and socket combination (FIG. 5). In one embodiment, the plug 24 and socket 26 portions releasably connect by way of a plurality of electrical busbar connections 32 (FIG. 4). Each distal end 30 comprising a plurality of receptacle or ports 40, which are illustrated as either single or dual ports, capable of receiving a plurality of tin dipped electrical wiring leads which may be releasably connected to the plurality of ports 40 of the push-in connector 16. The plug 24 and socket 26 portions separate into two pieces allowing simple wiring and reconnection.

Figure 2:
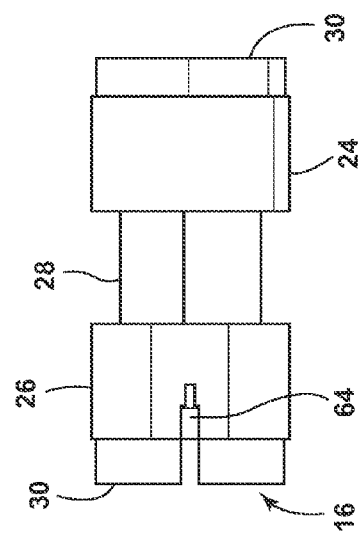
FIG. 2 illustrates a side view of the push-in connector of FIG. 1.
Figure 3:
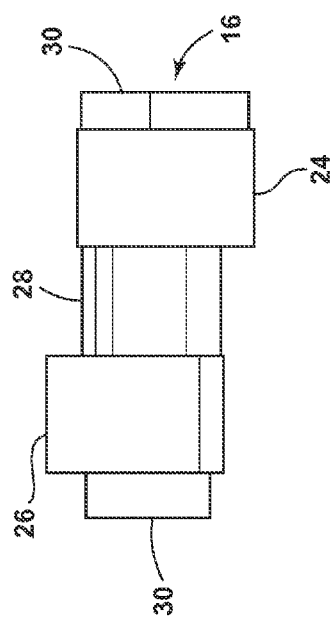
FIG. 3 illustrates a side view of the push-in connector rotated ninety degrees from the view of FIG. 2.
Figure 1:
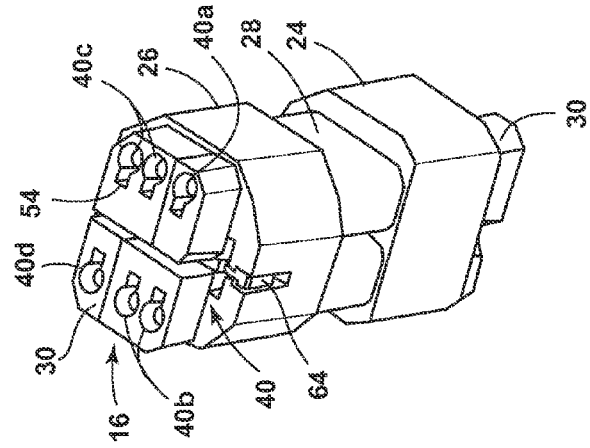
FIG. 1 illustrates a perspective view of a push-in connector.

Each plug 24 and socket 26 portion of the push-in connector 16 is separately connectable to a plurality of wires including the fan, light, neutral and ground wires. The plurality of ports 40 are capable of receiving at least one wire. The single ports 40 can receive one wire while the dual ports 40 can receive two wires. The use of a single or dual port is typically selected to simplify the wiring for the installer. Five ports 40 are disposed on the plug portion 24, comprising a live black fan port 40a, a live blue light port 40b, a white neutral port 40c, and two green ground ports 40d (FIGS. 1 and 9). The socket portion 26 is disposed with six ports 40 comprising one live black fan port 40a, two live blue light ports 40b, two white neutral ports 40c, and one green ground port 40d (FIG. 8). In one example embodiment, ports 40 on both the plug portion 24 and socket portion 26 of the connector 16 may be color coded to correspond with a particular type of wire, such as a black for fan, blue for light, white for neutral or green for ground wire to ensure the correct wire is received in the correct port 40. Ports 40 on both the plug portion 24 and socket portion 26 of the connector 16 may also be color coded to ensure proper wire connections are established.

When the plug 24 and socket 26 portions are connected, the ends of electrically connected wires form an electrical connection. Other ways of coding and identifying ports 40 and wires, other than color-coding, may be used as desired by one of skill in the art.

The ports 40 have wire release capability. As best shown in FIG. 4, which is a cross-sectional view of FIG. 8 about the IV-IV cross-section, each port 40 comprises a spring 50 which compresses the wire against the sidewall 52 of the port 40 upon the wire insertion into the port 40. In one embodiment, a slot or release port 54 is installed beside each port 40. The release port 54 allows access to depress the spring 50 located in the port 40 thereby releasing the electrical wire from the port 40. Once the spring 50 is depressed, the wire may be pulled out of the port 40. A suitable tool may be inserted into the release port 54 to depress the spring 50.

Referring generally to FIGS. 1-9, the push-in connector 16 comprises a jumper 64 or metal connector used to open or close part of an electrical circuit. The jumper 64 allows electrical connection between either one or two live wires. In one example embodiment, the jumper 64 may be a slider switch but any other jumper 64 may be used to open or close part of an electrical circuit as desired by one skill in the art. FIG. 4, the jumper 64 is located on a sidewall 52 of the socket portion 26 of the push-in connector in between the two ports 40 capable of receiving the live wires, such as the single black 40a and blue ports 40b. The jumper 64 allows single or dual wall switch wiring scenario. In one embodiment in which the jumper 64 is a slide switch, a small flat head screwdriver may be used to move the slider switch from single to dual wall switch wiring scenario.

The push-in connector 16 allows a plurality of wire connections such as fan, lighting, neutral and ground connections. Such wire connections are created by inserting each wire lead 14a-14e, 20a-20d from the ceiling fan and the ceiling into its designated port 40 on the distal ends 30 of the push-in connector 16 and then aligning the plug 24 and socket 26 portions and releasably connecting the plug 24 and socket 26 portions (FIGS. 13-17).

Figure 10:
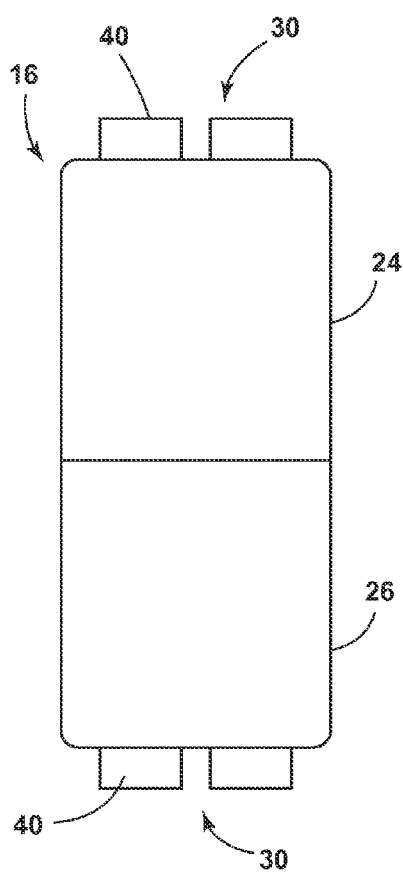
FIG. 10 illustrates a schematic side view of the push-in connector.
Figure 11:
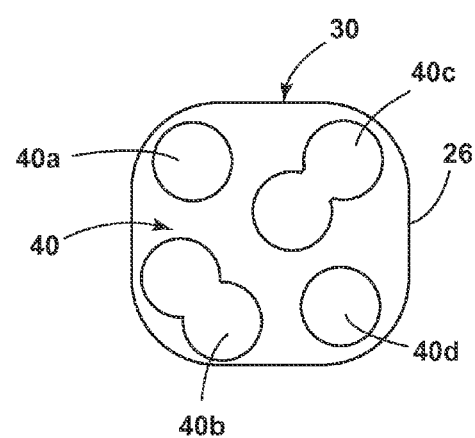
FIG. 11 illustrates a schematic view of the fan side ports on the distal end of the socket.
Figure 12:
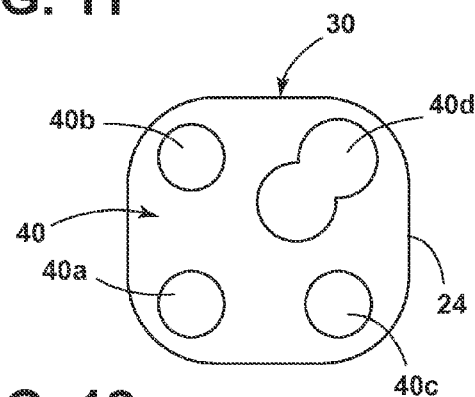
FIG. 12 illustrates a schematic view of the structure side ports on the distal end of the plug.

For purposes of discussing some of the more relevant wiring scenarios, a schematic version of the push-in connector 16 will be used and is illustrated in FIGS. 10-12. In the schematic representation of the push-in connector 16, the plug portion 24 (or top portion) of the push-in connector 16 has a plurality of ports 40 capable of receiving at least one wiring lead 14a-14e from the structure or ceiling 12, with each wiring lead 14a-14e being tin-dipped. However, the type of wire lead, tin-dipped or not, is not germane to the embodiments of the invention discussed herein, and is not limiting. The plurality of ports 40 for the plug portion 24, as illustrated in this embodiment, comprise the single black port 40a capable of receiving a first live wire 14a, (single switch scenario), single blue port 40b capable of receiving a second live wire 14e (dual switch scenario), single white port 40c capable of receiving a neutral wire 14c, and dual green ports 40d capable of receiving ground wires 14d including the ground wires from the electrical box (not shown and hanger bracket 60 (see FIG. 18-20) of the structure 12 to which the ceiling fan 10 is to be mounted. The hanger bracket 60 may be any structure mount designed to mechanically couple the ceiling fan 10 to a structure, building, or ceiling thereof. The socket portion 26 (or bottom portion) of the push-in connector 16 comprises a plurality of ports 40 capable of receiving at least one fan wiring lead 20a-20d from the ceiling fan motor assembly 18. In one embodiment, the plurality of ports 40 comprise the single black port 40a capable of receiving a fan wire 20a, dual blue 40b port capable of receiving alight wire 20b or up-light wire, dual white ports 40c capable of receiving a neutral wire 20c for wiring the fan and a neutral wire 20c for wiring a receiver 72 (FIG. 17), and green port 40d capable of receiving ground wires 20d including the ground wires from the ceiling fan motor assembly 18 or downrod 21.

Figure 15:
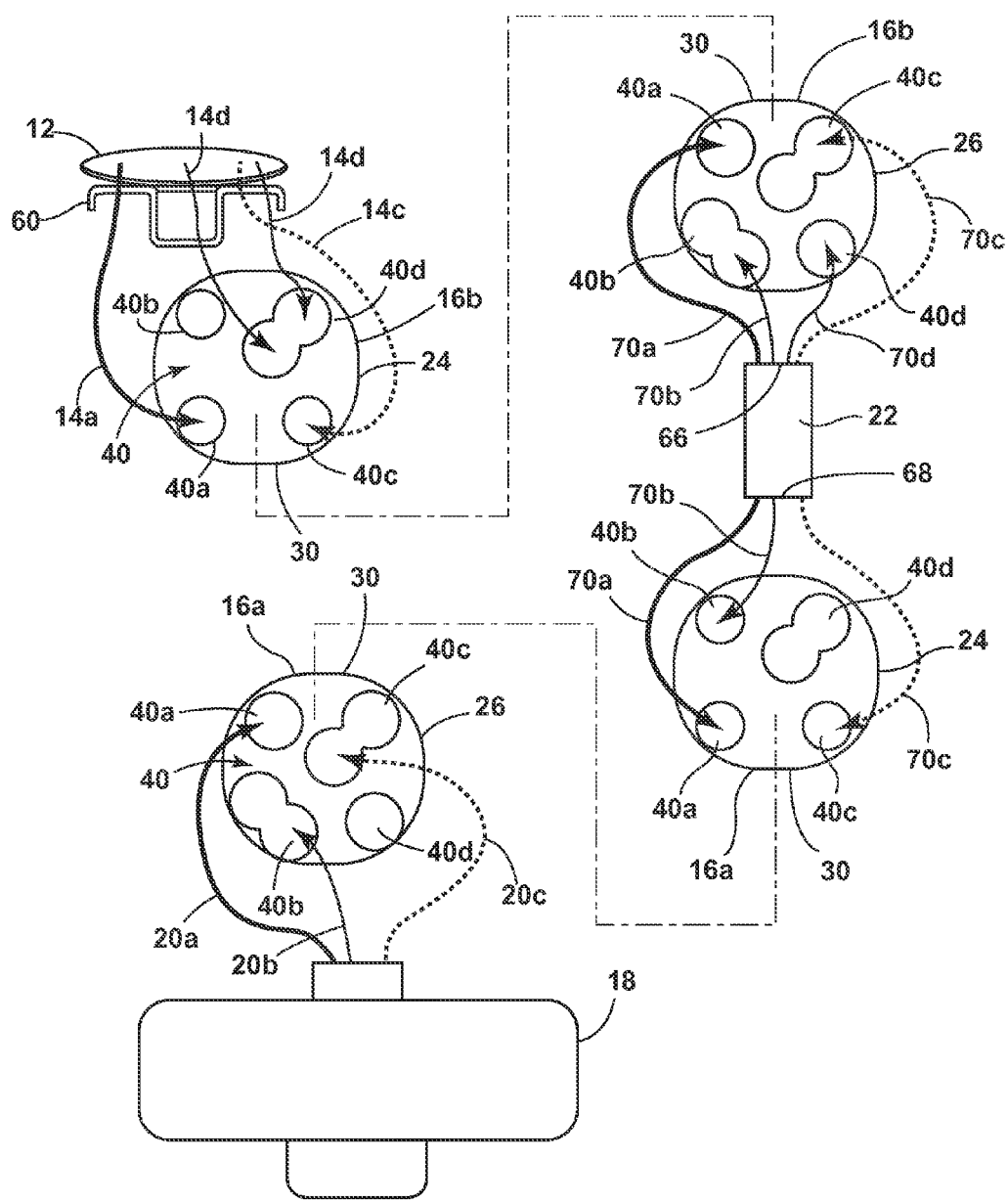
FIG. 15 illustrates a schematic view of a fan assembly with two push-in connectors electrically connecting the fan assembly to a structure through a pre-wired downrod, in a single switch wiring scenario.
Figure 16:
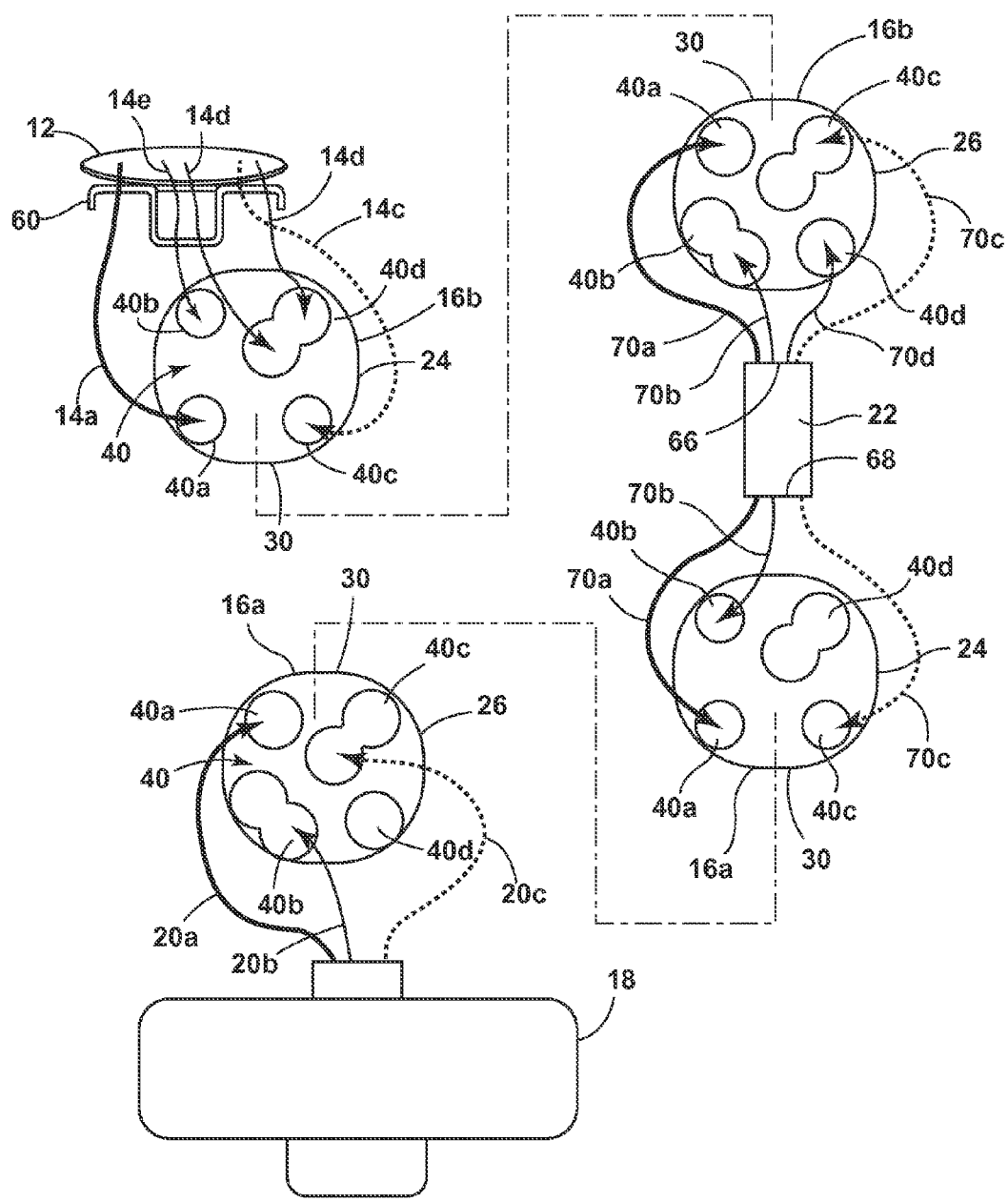
FIG. 16 illustrates a schematic view of a fan assembly with two push-in connectors electrically connecting the fan assembly to a structure through a pre-wired downrod, in a dual switch wiring scenario.

Looking now at some of the different wire connections or wiring scenarios, and with reference to FIGS. 15-16, in the context of a pre-wired downrod 22, one such wire connection is created by (A) inserting each wire lead 20a-20c from the ceiling fan motor assembly 18 into its designated port 40 on the distal end 30 of a socket portion 26 of a first push-in connector 16a, (B) inserting a downrod wiring lead 70a-70c exposed from the bottom end of a pre-wired downrod 22 into its designated port 40 of the distal end 30 of a plug 24 portion of the first push-in connector 16a, wherein the pre-wired downrod 22 is coupled to a socket portion 26 of a second push-in connector 16b having downrod wiring leads 70a-70d pre-wired to the distal end 30 of the socket portion 26 of the second push-in connector 16b, and (C) inserting each wire lead, electrical wiring leads 14a, 14c-14d in FIG. 15 and electrical wiring leads 14a, 14c-14e in FIG. 16, from the ceiling 12 into its designated port 40 on the distal end 30 of a plug portion 24 of the second push-in connector 16b.

Figure 13:
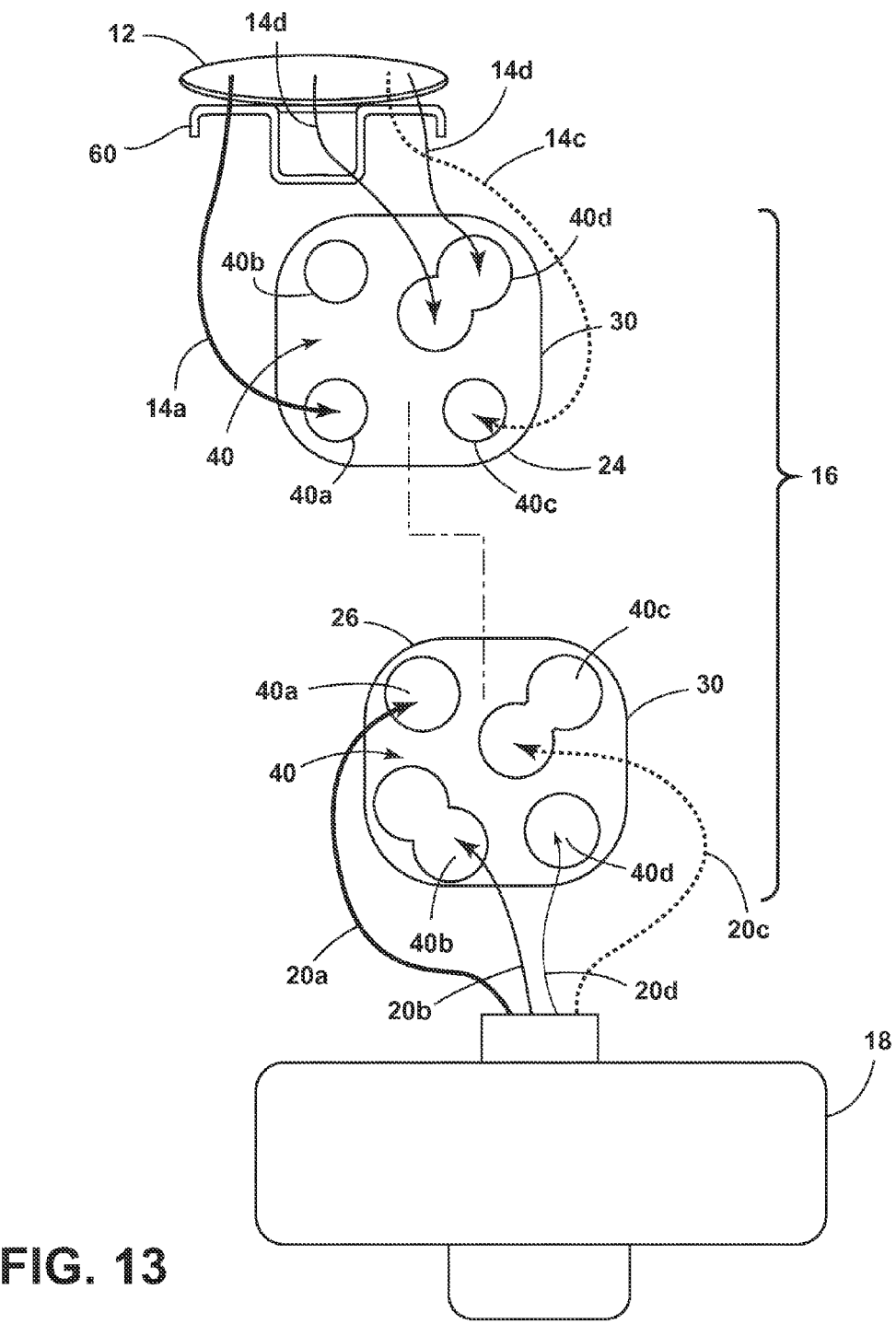
FIG. 13 illustrates a schematic view of a fan assembly wired in a single switch wiring scenario.

Referring to FIG. 13, the push-in connector 16 may be used to connect a ceiling fan motor assembly 18 to a structure 12 having electrical wiring leads 14a, 14c-14d or house wires. FIG. 13 depicts the electrical wire connections made by the push-in connector 16 in a single switch wiring scenario (jumper 64 slider switch is in single switch set up position). The plurality of ports 40 on the distal end 30 of the plug portion 24 of the push-in connector 16 are configured to receive the electrical wire leads 14a, 14c-14d of the structure 12 or ceiling, including the main live wire 14a (or black wire) which is pushed into the black port 40a, neutral wire 14c (or white wire) which is pushed into the white port 40c, and two ground wires 14d (or green wires) from the structure 12 and hanger bracket 60 which are pushed into the green ports 40d. The plurality of ports 40 on the distal end 30 of the socket portion 26 of the push-in connector 16 are configured to receive the fan wiring leads 20a-20d of the ceiling fan motor assembly 18 including the fan wire 20a (or black wire) which is pushed into the black port 40a, light wire 20b (blue wire) which is pushed into the blue port 40b, the neutral wire 20c (or white wire) which is pushed into the white port 40c, and ground wires 20d (or green wire) from the fan motor assembly 18 or downrod 21 which is pushed into the green port 40d. The plug portion 24 of the push-in connector 16 is releasably connected to the socket portion 26 of the push-in connector 16 aligning the wire leads of the plug portion 24 to the corresponding wire leads of the socket portion 26 to allow a plurality of wire connections such as fan, lighting, neutral and ground connections. Such wire connections are created by inserting each wire lead 14a, 14c-14d, 20a-20d from the ceiling fan motor assembly 18 and the ceiling 12 into its designated port 40 on the distal ends 30 of the push-in connector 16 and then aligning the plug 24 and socket 26 portions and releasably connecting the plug 24 and socket 26 portions.

Figure 14:
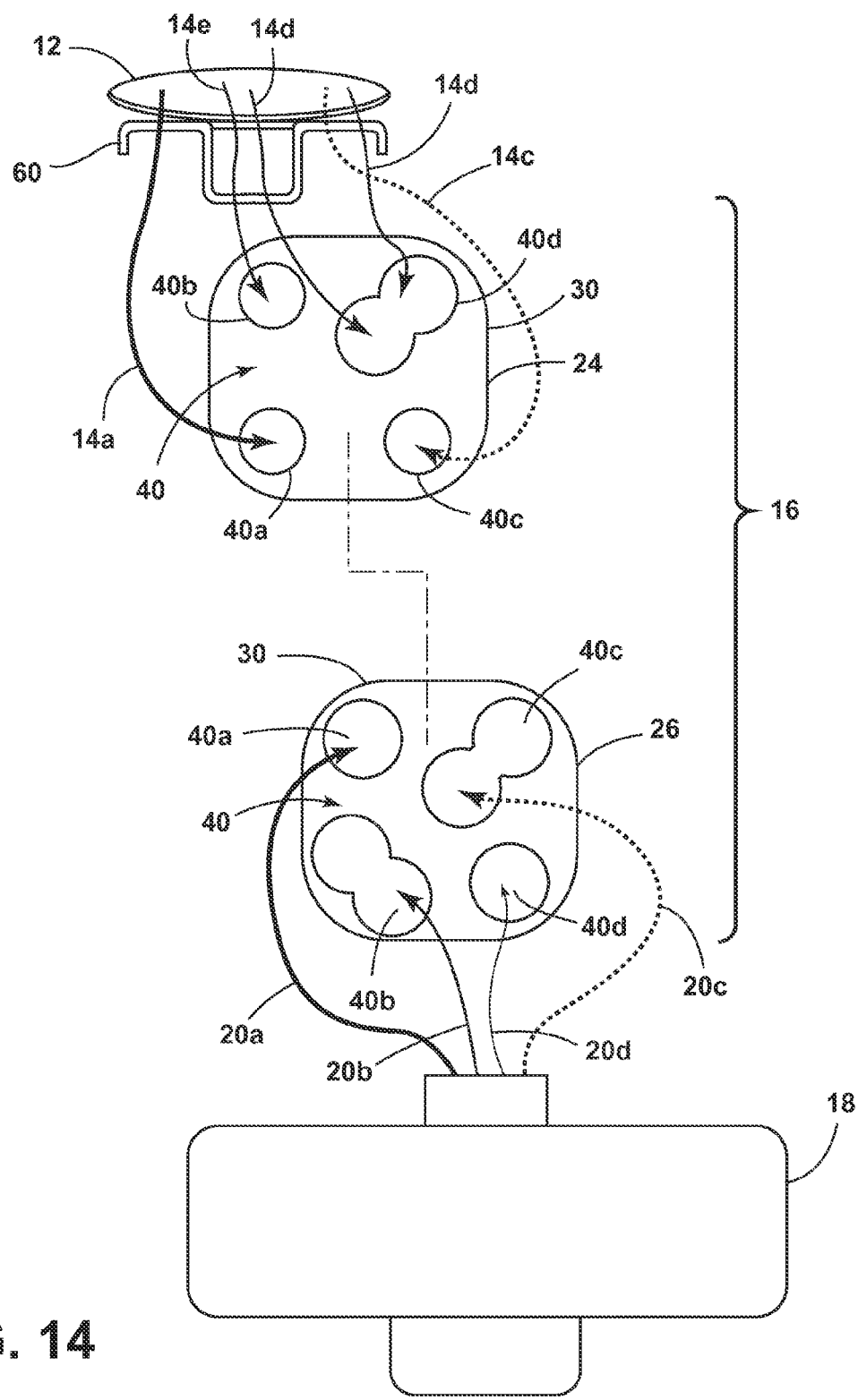
FIG. 14 illustrates a schematic view of a fan assembly wired in a dual switch wiring scenario.

Referring now to FIG. 14, the push-in connector 16 may be used to connect a ceiling fan motor assembly 18 to the structure 12 having electrical wiring leads 14a, 14c-14e or house wires. FIG. 14 depicts the electrical wire connections made by the push-in connector 16 in a dual switch wiring scenario (jumper 64 slider switch is in dual switch set up position). The plurality of ports 40 on the distal end 30 of the plug portion 24 of the push-in connector 16 are configured to receive the electrical wire leads 14a, 14c-14e of the structure 12 or ceiling, including the main live wire 14a (or black wire) which is pushed into the black port 40a, second live wire 14e (or red wire) which is pushed into the blue port 40b, neutral wire 14c (or white wire) which is pushed into the white port 40c, and two ground wires 14d (or green wires) from the house or structure 12 and hanger bracket 60 which are pushed into the green ports 40d. The plurality of ports 40 on the distal end 30 of the socket portion 26 of the push-in connector 16 are configured to receive the fan wiring leads 20a-20d of the ceiling fan motor assembly 18, including the fan wire 20a (or black wire) which is pushed into the black port 40a, light wire 20b (or blue wire) which is pushed into the blue port 40b, neutral wire 20c (or white wire) which is pushed into the white port 40c, and ground wire 20d (or green wire) from the fan motor assembly 18 or downrod 21 which is pushed into the green port 40d. The plug portion 24 of the push-in connector 16 is releasably connected to the socket portion 26 of the push-in connector 16 thereby aligning the wire leads of the plug portion 24 to the corresponding wire leads of the socket portion 26 to allow a plurality of wire connections such as fan, lighting, neutral and ground connections. Such wire connections are created by inserting each wire lead 14a, 14c-14e, 20a-20d from the ceiling fan motor assembly 18 and the ceiling 12 into its designated port 40 on the distal ends 30 of the push-in connector 16 and then aligning the plug 24 and socket 26 portions and releasably connecting the plug 24 and socket 26 portions.

In FIGS. 15 and 16, in another embodiment, the ceiling fan motor assembly 18 adapted to be coupled to the structure 12 having electrical wiring leads 14a, 14c-14e by way of push-in connector 16a, 16b. The ceiling fan motor assembly 18 comprises an electric motor (not shown) having electrical fan wiring leads 20a-20d threadable through an extended pre-wired downrod 22 and/or canopy assembly (not shown) adapted to be mounted to a ceiling or structure 12, wherein the electrical fan wiring leads 20a-20c are releasably connected to a push-in connector 16a, 16b. The ceiling fan motor assembly 18 may further comprise an elongated downrod as disclosed in U.S. patent application Ser. No. 14/186,680, which is hereby incorporated by reference in its entirety, and in which electrical downrod wiring leads 70a-70d may be placed in the downrod at the manufacturer and may extend the length of the downrod to form the pre-wired downrod 22. The pre-wired downrod 22 comprises a top end 66 which is adapted to be coupled to a canopy assembly (not shown) and a bottom end 68 which may be coupled to the electric motor within the motor assembly 18. The motor has fan wiring leads 20a-20d. The electrical downrod wiring leads 70a-70d are coupled to a second push-in connector 16b mounted at the top end 66 of the pre-wired downrod 22, and the bottom end 68 of the pre-wired downrod 22 exposes tin-dipped electrical downrod wiring leads 70a-70c releasably connectable to a plug portion 24 of a first push-in connector 16a. In one embodiment, the pre-wired downrod 22 may be about four feet in length but the downrod, pre-wired or not, may be shorter or longer in length as desired by one of skill in the art. The pre-wired downrod 22 can include a flush mounted covering, which is sealed by a gasket and secured by either spring force or a small screw, as is depicted in the downrod of the '680 application.

FIG. 15 depicts the single switch wiring scenario with the pre-wired downrod 22. Push-in connectors 16a, 16b may be used to connect the ceiling fan motor assembly 18 to the structure 12 having electrical wiring leads 14a, 14c-14e or house wires in conjunction with the pre-wired downrod 22. FIG. 15 depicts the electrical wire connections made by the push-in connectors 16a, 16b in single wall switch wiring scenario (jumper 64 slider switch is in single switch set up position). The plurality of ports 40 on the distal end 30 of the socket portion 26 of the first push-in connector 16a are configured to receive the fan wiring leads 20a-20c of the ceiling fan motor assembly 18, including the fan wire 20a (or black wire) which is pushed into the black port 40a, light wire 20b (blue wire) which is pushed into the blue port 40b, and neutral wire 20c (or white wire) which is pushed into the white port 40c. The plug portion 24 of the first push-in connector 16a is releasably connected to the socket portion 26 of the first push-in connector 16a. The plurality of ports 40 on the distal end 30 of the plug portion 24 of the first push-in connector 16a are configured to receive the tin dipped downrod wiring leads 70a-70c exposed at the bottom end of the pre-wired downrod 22, including a main live fan wire 70a (or black wire) which is pushed into the black port 40a, light wire 70b (or blue wire) which is pushed into the blue port 40b, and neutral wire 70c (or white wire) which is pushed into the white port 40c. The plug portion 24 of the first push-in connector 16a is releasably connected to the socket portion 26 of the first push-in connector 16a, thereby aligning the downrod wiring leads 70a-70c of the plug portion 24 to the corresponding fan wiring leads 20a-20c of the socket portion 26 of the first push-in connector 16a to allow a plurality of wire connections such as fan, lighting, neutral and ground connections. Such wire connections are created by inserting each fan wiring lead 20a-20c from the ceiling fan motor assembly 18 and each downrod wiring lead 70a-70c from the bottom end 68 of the pre-wired downrod 22 into its designated port 40 on the distal ends 30 of the first push-in connector 16a and then aligning the plug 24 and socket 26 portions of the first push-in connector 16a and releasably connecting the plug 24 and socket 26 portions.

Still, referring to FIG. 15, to establish the wire connections for the single switch wiring scenario of the ceiling fan motor assembly 18 to the structure 12 having electrical wiring leads 14a, 14c-14d in conjunction with a pre-wired downrod 22, a second push-in connector 16b may be used. The second push-in connector 16b is coupled to the top end 66 of the pre-wired downrod 22. The plurality of ports 40 on the distal end 30 of the socket portion 26 of the second push-in connector 16b are pre-wired with the downrod wiring leads 70a-70d of the pre-wired downrod 22 including the fan wire 70a (or black wire) which is pushed into the black port 40a, light wire 70b (blue wire) which is pushed into the blue port 40b, neutral wire 70c (or white wire) which is pushed into the white port 40c, and ground wire 70d (or green wire) which is pushed into the green port 40d. The plug portion 24 of the second push-in connector 16b is releasably connected to the socket portion 26 of second push-in connector 16b. The plurality of ports 40 on the distal end 30 of the plug portion 24 of the second push-in connector 16b are configured to receive the electrical wire leads 14 comprising electrical wiring leads 14a, 14c-14d of the ceiling 12 or house wires including the main live wire 14a (or black wire) which is pushed into the black port 40a, neutral wire 14c (or white wire) which is pushed into the white port 40b, and ground wires 14d (or green wires form the house or structure 12 and hanger bracket 60) which are pushed into the green ports 40d. The plug portion 24 of the second push-in connector 16b is releasably connected to the socket portion 26 of the second push-in connector 16b, thereby aligning the electrical wiring leads 14a, 14c-14d of the plug portion 24 to the corresponding downrod wiring leads 70a-70d of the socket portion 26 to allow a plurality of wire connections such as fan, lighting, neutral and ground connections. Such wire connections are created by inserting each electrical wiring lead 14a-14e from the ceiling or structure 12 into its designated port 40 on the distal ends 30 of the plug portion 24 of the second push-in connector 16b, and then aligning the plug 24 and socket 26 portions of the second push-in connector 16b and releasably connecting the plug 24 and socket 26 portions of the second push-in connector 16b.

Referring now to FIG. 16, in one embodiment, the double switch wiring scenario with a pre-wired downrod 22 with push-in connectors 16a and 16b may be used to connect the ceiling fan motor assembly 18 to the structure 12 or ceiling having electrical wiring leads 14a, 14c-14e or house wires. FIG. 16 depicts the electrical wire connections made by the push-in connectors 16a and 16b in the double switch wiring scenario (jumper 64 slider switch is in double switch set up position). The plurality of ports 40 on the distal end 30 of the socket portion 26 of the first push-in connector 16a are configured to receive the fan wiring leads 20a-20c of the ceiling fan motor assembly 18, including the fan wire 20a (or black wire) which is pushed into the black port 40a, light wire 20b (or blue wire) which is pushed into the blue port 40b, and neutral wire 20c (or white wire) which is pushed into the white port 40c. The plug portion 24 of the first push-in connector 16*a* is releasably connected to the socket portion 26 of the first push-in connector 16*a* in order to establish wire connections. The plurality of ports 40 on the distal end 30 of the plug portion 24 of the first push-in connector 16*a* are configured to receive the tin dipped downrod wiring leads 70*a*-70*c* exposed at the bottom end 68 of the pre-wired downrod 22, including the main live fan wire 70*a* (or black wire) which is pushed into the black port 40*a*, light wire 70*b* (or blue wire) which is pushed into the blue port 40*b*, and neutral wire 70*c* (or white wire) which is pushed into the white port 40*c*. The plug portion 24 of the first push-in connector 16*a* is releasably connected to the socket portion 26 of the first push-in connector 16*a* thereby aligning the downrod wiring leads 70*a*-70*c* of the plug portion 24 to the corresponding fan wiring leads 20*a*-20*c* of the socket portion 26 to allow a plurality of wire connections such as fan, lighting, neutral and ground connections. Such wire connections are created by inserting each fan wiring lead 20*a*-20*c* from the ceiling fan motor assembly 18 and each downrod wiring lead 70*a*-70*c* from the bottom end 68 of the pre-wired downrod 22 into its designated port 40 on the distal ends 30 of the first push-in connector 16*a*, and then aligning the plug 24 and socket 26 portions of the first push-in connector 16*a* and releasably connecting the plug 24 and socket 26 portions.

Still, referring to FIG. 16, to establish the wire connections for the double switch wiring scenario of the ceiling fan 10 to the structure 12 having electrical wiring leads 14*a*, 14*c*-14*e* in conjunction with the pre-wired downrod 22, the second push-in connector 16*b* may be used. The second push-in connector 16*b* couples to the top end 66 of the pre-wired downrod 22. The plurality of ports 40 on the distal end 30 of the socket portion 26 of the second push-in connector 16*b* are pre-wired with the downrod wiring leads 70*a*-70*d* of the pre-wired downrod 22, including the live fan wire 70*a* (or black wire) which is pushed into the black port 40*a*, light wire 70*b* (blue wire) which is pushed into the blue port 40*b*, neutral wire 70*c* (or white wire) which is pushed into the white port 40*c*, and ground wire 70*d* (or green wire) which is pushed into the green port 40*d*. The plug portion 24 of the second push-in connector 16*b* is releasably connected to the socket portion 26 of the second push-in connector 16*b*. The plurality of ports 40 on the distal end 30 of the plug portion 24 of the second push-in connector 16*b* are configured to receive the electrical wiring leads 14*a*, 14*c*-14*e* of the ceiling 12 or house wires, including the main live wire 14*a* (or black wire) which is pushed into the black port 40*a*, second live wire 14*e* (or red wire) which is pushed into the blue port 40*b*, neutral wire 14*c* (or white wire) which is pushed into the white port 40*c*, and ground wires 14*d* (or green wires from the house or structure 12 and hanger bracket 60) which are pushed into the green ports 40*d*. The plug portion 24 of the second push-in connector 16*b* is releasably connected to the socket portion 26 of the second push-in connector 16*b* thereby aligning the wire leads of the plug portion 24 to the corresponding wire leads of the socket portion 26 to allow a plurality of wire connections such as fan, lighting, neutral and ground connections. Such wire connections are created by inserting each electrical wiring lead 14*a*, 14*c*-14*e* from the ceiling or structure 12 into its designated port 40 on the distal end 30 of the plug portion 24 of the second push-in connector 16*b*, and then aligning the plug 24 and socket 26 portions of the second push-in connector 16*b* and releasably connecting the plug 24 and socket portions 26 of the second push-in connector 16*b*.

Referring now to FIG. 17, a method to connect the accessory receiver 72 to ceiling fan motor assembly 18 via a single wall switch is disclosed. One example of an accessory receiver is a wireless device for receiving a wireless signal used to remotely control and operate the ceiling fan assembly 18. The second push-in connector 16*b* is coupled to the receiver 72. The plurality of ports 40 on the distal end 30 of the socket portion 26 of the second push-in connector 16*b* are pre-wired with the tin-dipped electrical receiver wiring leads 74*a*, 74*c* of the receiver 72, including a live receiver wire 74*a* (or black wire) which is pushed in the black port 40*a*, and a neutral receiver wire 74*c* which is pushed into one of the white ports 40*c*. The socket portion 26 is also pre-wired with a neutral wire 20*c* from the fan motor assembly 18 (or white wire) which is pushed in the other white port 40*c*, and a ground wire 20*d* from the ceiling fan motor assembly 18 (or green wire) which is pushed in the green port 40*d*. The plurality of ports 40 on the distal end 30 of the plug portion 24 of the second push-in connector 16*b* are configured to receive the electrical wire leads 14*a*, 14*c*-14*d* of the ceiling 12 or house wires, including the main live wire lead 14*a* (or black wire) which is pushed in the black port 40*a*, neutral wire 14*c* (or white wire) which is pushed in the white port 40*c*, and ground wires 14*d* (or green wires) which are pushed in the green ports 40*d*.

The plurality of ports 40 on the distal end 30 of the plug portion 24 of the first push-in connector 16*a* receive tin-dipped receiver wiring leads 74*b*, 74*d* of the receiver 72, including a fan load wire 74*d* (or blue wire) which is pushed the black port 40*a* and a light receiver wire lead 74*b* (or yellow wire) which is pushed in the blue port 40*b*. The plurality of ports 40 on the distal end 30 of the socket portion 26 of the first push-in connector 16*a* receive tin dipped electrical wire leads from the ceiling fan assembly 18, including the fan wire lead 20*a* (or black wire) which is pushed into the black port 40*a* and the light wire lead 20*b* (or blue wire) which is pushed into the blue port 40*b*.

While FIGS. 13-17 schematically illustrate different wiring scenarios using the push-in connector 16, FIGS. 18-20 illustrate the use of the push-in connector 16 for exemplary installations where the ceiling fan motor assembly 18 is mounted and wired in a typical ceiling mount, with FIG. 18 illustrating a low profile mounting using a downrod 21 and a single push-in connector 16, FIG. 19 illustrating a standard mounting using a pre-wired downrod 22 and two push-in connectors 16*a*, 16*b*, and FIG. 20 illustrating a standard mounting using a pre-wired downrod 22 and a single push-in connector 16.

Referring now to FIG. 18, in another example embodiment, a method of installing a ceiling fan 10 is disclosed using the push-in connector 16 in the context of a traditional, non-pre-wired, downrod 21. The method includes the steps of: (A) providing the ceiling fan 10 having the fan motor assembly 18 with an electric motor (not shown) having electrical fan wiring leads 20 comprising wiring leads 20, downrod 21, and/or canopy assembly (not shown) adapted to be mounted to the ceiling 12 of a structure and the push-in connector 16 which comprises the plug 24 and socket portions 26, each having proximal 28 and distal 30 ends, wherein the plug portion 24 and socket portion 26 releasably connect at the proximal ends 28 to form a plug and socket combination, wherein each distal end 30 comprises single or dual ports 40 or receptacles capable of connecting to tin dipped electrical wire leads releasably connected to the push-in connector 16; (B) threading the electrical fan wiring leads 20 through the downrod 21 and attaching the downrod 21 to the fan motor assembly 18; (C) connecting the fan wiring leads 20 to the plurality of ports on the distal end 30 of the socket portion 26 of the push-in connector 16 by pushing in the colored wires to the corresponding colored ports; (D) connecting electrical wire leads 14 to the plurality of ports on the distal end 30 of the plug portion 24 of the push-in connector 16 by pushing in the colored wires to the corresponding colored ports; (E) hanging the downrod 21 in the hanger bracket 60; and (F) connecting the plug 24 and socket portions 26 of the push-in connector 16.

Referring now to FIG. 19, in a further embodiment, a method of installing a ceiling fan 10 is disclosed. The method includes the steps of: (A) providing the ceiling fan motor assembly 18 having an electric motor (not shown) having fan wiring leads 20, canopy assembly (not shown) adapted to be mounted to the ceiling 12 of the structure, and first and second push-in connectors 16a, 16b, each comprising plug 24 and socket 26 portions, each having proximal 28 and distal 30 ends, wherein the plug portion 24 and socket portion 26 releasably connect at the proximal end 28 to form a plug and socket combination, wherein the distal ends 30 comprise a plurality of single or dual ports or receptacles capable of connecting to a plurality of tin dipped electrical wire leads releasably connected to the push-in connectors 16a, 16b, and an elongated, downrod comprising downrod wiring leads 70 extending the length of the downrod forming a pre-wired downrod 22, wherein the pre-wired downrod 22 comprises a top end 66 which is adapted to be coupled to the canopy assembly (not shown) and a bottom end 68 which may be coupled to the fan motor assembly 18, wherein the top end 66 of the pre-wired downrod 22 couples to a second push-in connector 16b, and wherein the bottom end 68 exposes tin-dipped downrod wiring leads 70 releasably connectable to a first push-in connector 16a; (B) connecting electrical wire leads 14 to the plurality of ports on the distal end 30 of the plug portion 24 of the second push-in connector 16b by pushing in the electrical wire leads 14 to the designated ports; (C) connecting the ground wires to the designated port on the distal end 30 of the socket portion 26 of the second push-in connector 16b; (D) connecting the downrod wiring leads 70 exposed at the bottom end 68 of the pre-wired downrod 22 to the designated ports on the distal end 30 of the plug portion 24 of the first push-in connector 16a; (E) connecting the fan wiring leads 20 to the designated ports on the distal end 30 of the socket portion 26 of the first push-in connector 16a; (F) connecting the plug 24 and socket 26 portions of the first push-in connector 16a and threading the pre-wired downrod 22 onto the ceiling fan motor assembly 18; and (G) hanging the pre-wired downrod 22 in hanger bracket 60 and connecting the plug 24 and socket 26 portions of the second push-in connector 16b.

Referring now to FIG. 20, in a further embodiment, a method of installing a ceiling fan 10 with the pre-wired downrod 22 having one push-in connector 16 is disclosed. The method includes the steps of: (A) providing the fan motor assembly 18 having an electric motor (not shown) having fan wiring leads 20, canopy assembly (not shown) adapted to be mounted to the ceiling 12 of the structure, and elongated, pre-wired downrod 22 comprising downrod wiring leads 70 extending the length of the pre-wired downrod 22, wherein the pre-wired downrod 22 comprises a top end 66 which is adapted to be coupled to the canopy assembly and a bottom end 68 which may be coupled to the fan motor assembly 18, wherein the top end 66 of the pre-wired downrod 22 is coupled to a push-in connector 16, and wherein the bottom end 68 exposes downrod wiring leads 70 connectable to fan wiring leads 20; (B) connecting electrical wire leads 14 to the plurality of ports on the distal end 30 of the plug portion 24 of the push-in connector 16 by pushing in the electrical wire leads 14 to the designated ports; (C) connecting the ground wires 70 to the designated port on the distal end 30 of the socket portion 26 of the push-in connector 16, (D) connecting the downrod wiring leads 70 exposed at the bottom end 68 of the pre-wired downrod 22 to the fan wiring leads 20 via wire connectors 34; and (E) hanging the pre-wired downrod 22 in hanger bracket 60 and connecting the plug 24 and socket 26 portions of the push-in connector 16.

Regarding the methods of FIGS. 19-20, in one variation, a further optional step may include mechanically coupling the selected pre-wired downrod 22 to the ceiling fan assembly 18.

All the embodiments in FIGS. 18-20, show a ceiling fan 10 that mounts to a ceiling 12 or structure. The ceiling 12 may have an electrical box (not shown) to which the hanger bracket 60 mounts. Electrical wire leads 14 may electrically couple to the electrical box or the structure power supply to the ceiling fan 10. A ball 78, such as a tri-lobular ball, can be provided at the top end 66 of the downrod 21 or pre-wired downrod 22 and is received in a cradle of the hanger bracket 60 to couple either downrod 21, 22 to the hanger bracket 60. Opposite of the ball 78, the downrod 21 or pre-wired downrod 22 may couple to a downrod coupler 76, mounting the fan motor assembly 18 to either downrod 21, 22.

Additional variations of the ceiling fan 10 with a pre-wired downrod 22 are contemplated in any combination of downrod wiring leads 70 with one or more push-in connectors 16 disposed on either end of the downrod wiring leads 70. The pre-wired downrod 22 may or may not be pre-mounted to the ball 78 and fan motor assembly 18, or where wire connectors 34 or additional sets of push-in connectors 16, downrod wiring leads 70, or lengths of wire are implemented as needed to electrically couple the fan motor assembly 18 to the electrical wire leads 14.

While some of the different wiring scenarios of FIGS. 13-17 and the different installations of FIGS. 18-20 are shown in the context of a non-pre-wired downrod 21, the pre-wired downrod 22 can be used in any of the wiring scenarios and/or installations. In any use of the pre-wired downrod 22, the downrod in the '680 application, with the access opening and cover can be pre-wired to form a pre-wired downrod 22. It should be noted that any suitable downrod and access opening configuration may be used in forming a pre-wired downrod 22.

Figure 21:
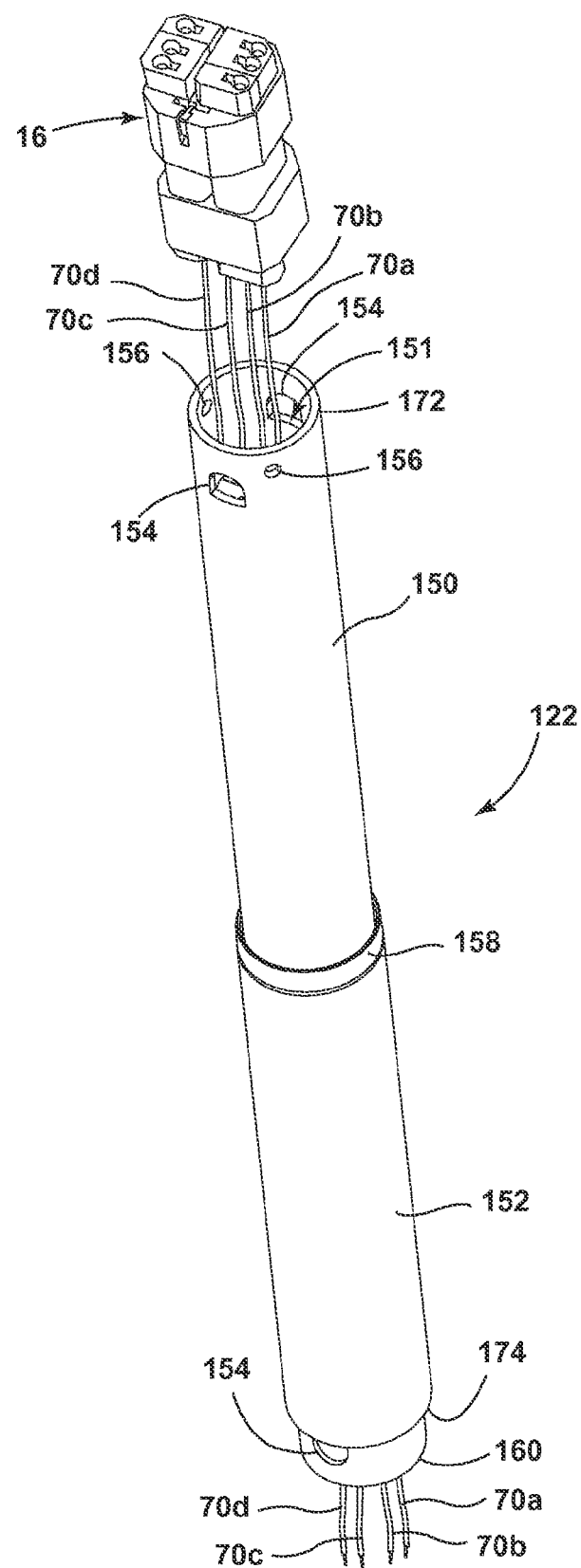
FIG. 21 illustrates a perspective view of a pre-wired ceiling fan downrod.
Figure 22:
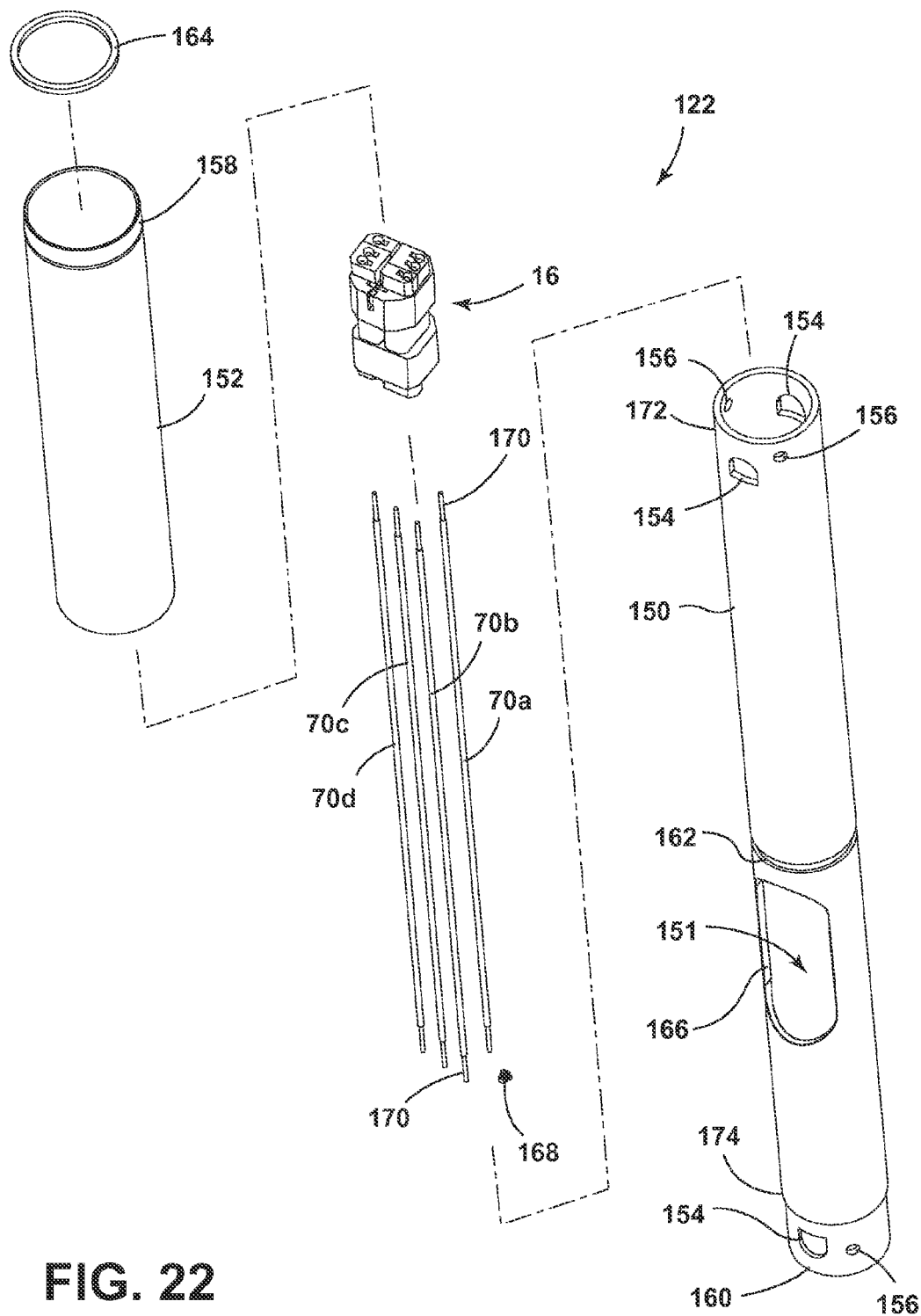
FIG. 22 illustrates an exploded view of the pre-wired downrod with one push-in connector of FIG. 21.
Figure 23:
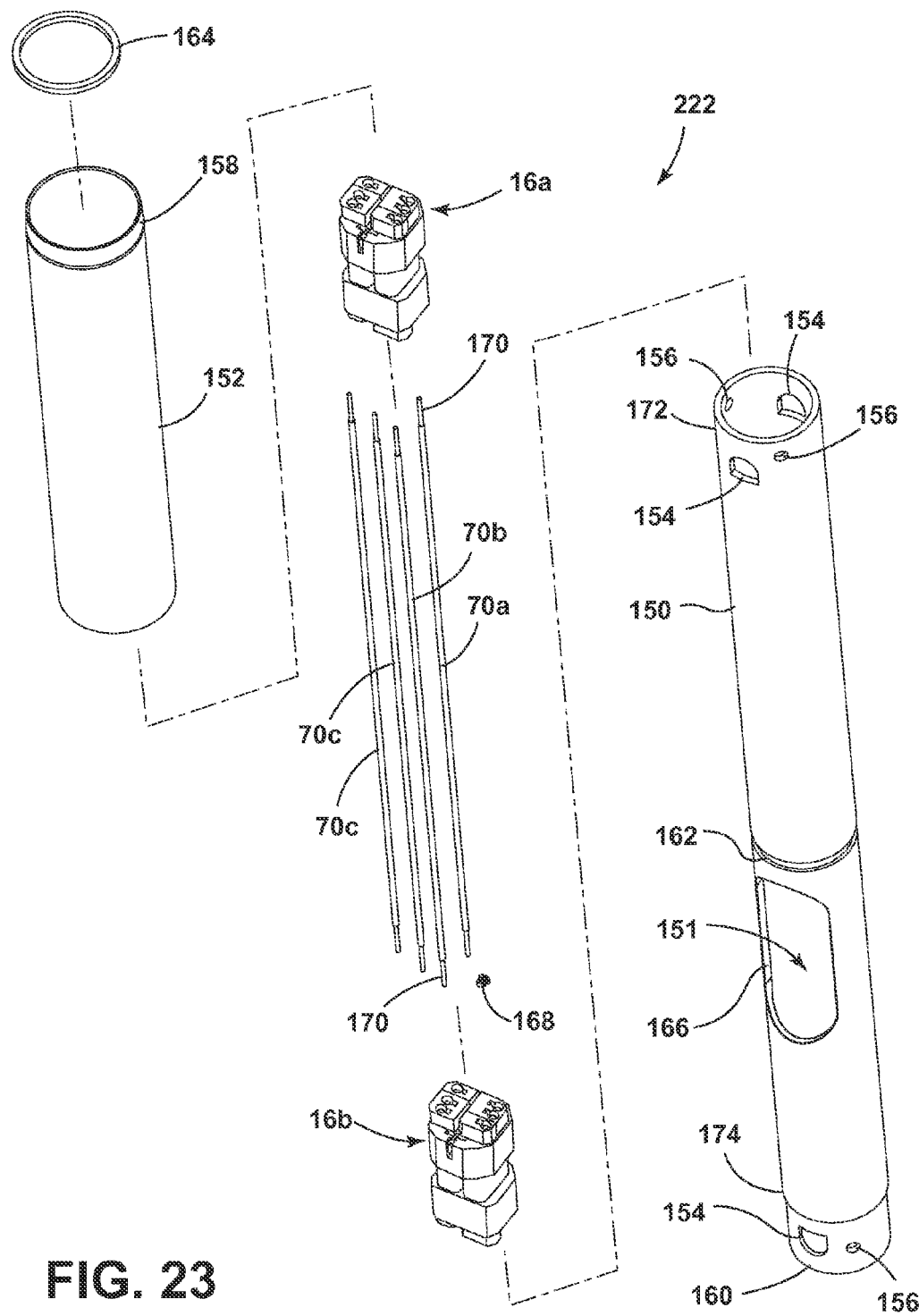
FIG. 23 illustrates an exploded view of the pre-wired downrod of FIG. 21 with two push-in connectors.

FIGS. 21-23 show one such variation to a pre-wired downrod 122 that may be used for any of the described downrods, especially the described downrods of FIGS. 15-16 and 19-20. Beginning with FIG. 21, the pre-wired downrod 122 has a body 150 defining a hollow interior 151 and may be of multiple lengths, widths, or cross sections suitable for use with a ceiling fan assembly. The pre-wired downrod 122 further comprises a top end 172 and a bottom end 174. The bottom end 174 terminates in a fan-coupling collar 160, which may mount the bottom end 174 of the pre-wired downrod 122, for example, to a downrod coupler or directly to a fan motor assembly. Downrod wiring leads 70a-70d, comprising, in one example, the black fan wire 70a, blue light wire 70b, white neutral wire 70c, and green ground wire 70d, are disposed within the hollow interior 151. The downrod wiring leads 70a-70d terminate in the push-in connector 16 toward the top end 172 of the pre-wired downrod 122. In further embodiments, additional or fewer downrod wiring leads 70a-70d may be included, and particular types of downrod wiring leads 70a-d may be optional; for example, in ceiling fans not including a tight fixture, the tight wire is not required.

A slide cover 152 is slidably received over the body 150, whereby the slide cover 152 and body 150 may slide relative to each other. The slide cover 152 terminates in a collar 158. The slide cover 152 has a cross section sized to define an interior in which the body 150 may be slidably received, enabling the slide cover 152 to slide along the body 150. One or more of the ends 172, 174 of the body 150 can optionally include a set of mounting recesses 154 for mounting the pre-wired downrod 122 to the ceiling fan 10, fan motor assembly 18, hanger bracket 60, or otherwise. The ends 172, 174 may further include a set of mounting holes 156 for use in mounting the push-in connector 16 to the pre-wired downrod 122.

FIG. 22 is an exploded view of the pre-wired downrod 122 to better illustrate the different elements firming the pre-wired downrod 122. As is seen in FIG. 22, a groove 162 is disposed around the exterior of the body 150. A stop, such as a stopper ring 164, is received within the groove 162. The stopper ring 164 has an inner diameter sized to securely rest within the groove 162, and has an outer diameter greater than the inner diameter of the collar 158 such that the slide cover 152 may slide down the body 150 from the top end 172 of the body 150 without falling downwardly off the body 150. An access opening 166 is disposed within a side of the body 150 between the groove 162 and the bottom end 174, granting access to the hollow interior 151 within the body 150 as the slide cover 152 slides along the length of the body 150. In variations on the illustrated embodiment, the access opening 166 may be located anywhere along the side of the body 150 between the top end 172 and the bottom end 174 of the pre-wired downrod 122.

The push-in connector 16 may be sized such that it can be received within the hollow interior 151 of the body 150. Set screws 168, only one of which is shown in FIG. 22, may thread through the holes 156 and into the push-in connector 16 to, thus securing it to the body 150. Alternatively, the push-in connector 16 can be unmounted. If unmounted, the push-in connector 16 may be free to move within the hollow interior 151 or may remain external of the hollow interior 151, which may be freely moved when connecting the push-in connector the electrical wiring leads 14. While the push-in connector 16 is shown on the top end 172 of the pre-wired downrod 122, it may alternatively be on the bottom end 174 of the pre-wired downrod 122, or somewhere between the top and bottom ends 172, 174.

The downrod wiring leads 70a-70d, having a set of wire tips 170 disposed on both ends of the downrod wiring leads 70a-70d, are preinstalled within the pre-wired downrod 122. The downrod wiring leads 70a-70d may comprise any number of wires having electrically conductive wire tips 170, wherein the wire tips 170 may be tin dipped or comprise an electrically conductive material such as copper, in non-limiting examples.

The wire tips 170 on either end of the downrod wiring leads 70a-70d may be coupled to the push-in connector 16 as previously described. In the context of the pre-wired downrod 122, it is contemplated that the wire tips 170 will be coupled to the appropriate ports 40 of the push-in connector 16 by the manufacturer depending on the anticipated wiring scenario, i.e. single or dual switch scenario. Alternatively, only the downrod wiring leads 70a-70d may be installed by the manufacturer to form the pre-wired downrod 122, with the connectors being provided for wiring by the installer.

In the configuration illustrated in FIG. 22, one set of wire tips 170 may be received in the push-in connector 16, while the other set of wire tips 170 may be accessible through the access opening 166. Such a pre-wired downrod 122 makes it easier for the installer to use the downrod 122 in a wiring scenario and installation similar to that of FIG. 20, where the electrical wiring leads 14 are pushed into the push-in connector 16 and the fan wiring leads 20 are manually connected to the other set of wire tips 170 with traditional wire connectors 34 such as wire nuts. The access opening 166 provides a window through which the wire tips 170 and the fan wiring leads 20 of FIG. 20 may be accessed during manual wiring or after, when the wire connectors 34 are hidden within the pre-wired downrod 122.

Turning to FIG. 23, another embodiment of the pre-wired downrod 222 is shown with a first push-in connector 16a and a second push-in connector 16b. The second push-in connector 16b may affix to the bottom end 174 of the pre-wired downrod 222 by threading screw 168 through the hole 156 at the bottom end 174 or may float freely below the bottom end 174 of the pre-wired downrod 222. The downrod wiring leads 70a-70d ending in wire tips 170 opposite of the first push-in connector 16a may be pre-inserted into the second push-in connector 16b by a manufacturer. In the context of the pre-wired downrod 222, it is contemplated that the wire tips 170 will be coupled to the appropriate ports 40 of the second push-in connector 16b, as well as the first push-in connector 16a, by the manufacturer. The pre-wired downrod 222 of FIG. 23 is well suited for use in the installation of FIG. 19 using the wiring scenarios of either of FIGS. 15-16 and 19. An installer may easily electrically couple fan wiring leads 20 to downrod wiring leads 70a-70d by pushing the fan wiring leads 20 into the second push-in connector 16b. Upon pushing fan wiring leads 20 into the second push-in connector 16b and pushing electrical wiring leads 14 into the first push-in connector 16a, the fan motor assembly 18 receives electrical power from the structure.

There are many variations for mounting the ceiling fans 10 of FIGS. 18-20 utilizing a pre-wired downrod comprising one or more of the pre-wired downrods 22, 122, 222. The downrods 22, 122, 222 may be incorporated into a set of pre-wired downrods and may comprise different lengths. The number and location of push-in connectors 16, along with the number and length of downrods, can be varied to cover a variety of installation and wiring scenarios for ceiling fans. Because there are a variety of installation and wiring scenarios, the set of pre-wired downrods can be provided, such as at a point of sale, to let an installer match the downrod or downrods to their particular installation and wiring needs. The set of pre-wired downrods may be provided in a kit with the fan as part of the original purchase or may be for sale in an ala carte fashion.

One illustrative scenario is providing both a short downrod, downrod 21 in FIG. 18, but pre-wired, suitable for a low profile mounting, and a standard length downrod, like the pre-wired downrod 22 in FIGS. 19 and 20, suitable for a standard mounting. This would provide the installer with the option of a low profile or standard profile mounting. Additionally or alternatively, a longer downrod may be provided for high ceiling installations. A set of pre-wired downrods with multiple varying lengths could be provided, such as at a point of sale, to let the installer select the downrod having the desired length.

For any of the downrods, the number of push-in connectors 16 can vary from none, to a push-in connector 16 for one set of wire tips 170, to a push-in connector 16 for each set of wire tips 170. The plug 24 and socket 26 portions of the push-in connectors 16 may be pre-coupled or may be separated when the installer receives the downrod. Some or all of the plug 24 and socket 26 portions can be connected to the corresponding fan wiring leads 20 from the fan motor, downrod wiring leads 70, or electrical wiring leads 14. In one scenario where a push-in connector 16 is used on each set of the wire tips 170, given that the electrical wiring leads 14 are not likely to be sold with the ceiling fan, one of the push-in connectors 16 can be pre-coupled or have mated plug 24 and socket 26 portions, with one of the plug 24 and socket 26 portions connected to the wire tips 170 from the downrod wiring leads 70a-70d, and the other push-in connector 16 can be separated or have unmated plug 24 and socket 26 portions, with one of the disconnected plug 24 and socket 26 receiving the fan wiring leads 20 and the other of the disconnected plug 24 and socket 26 connected to the wire tips 170 from the downrod wiring leads 70a-70d. Of course, both push-in connectors 16 can be pre-coupled.

Figure 24:
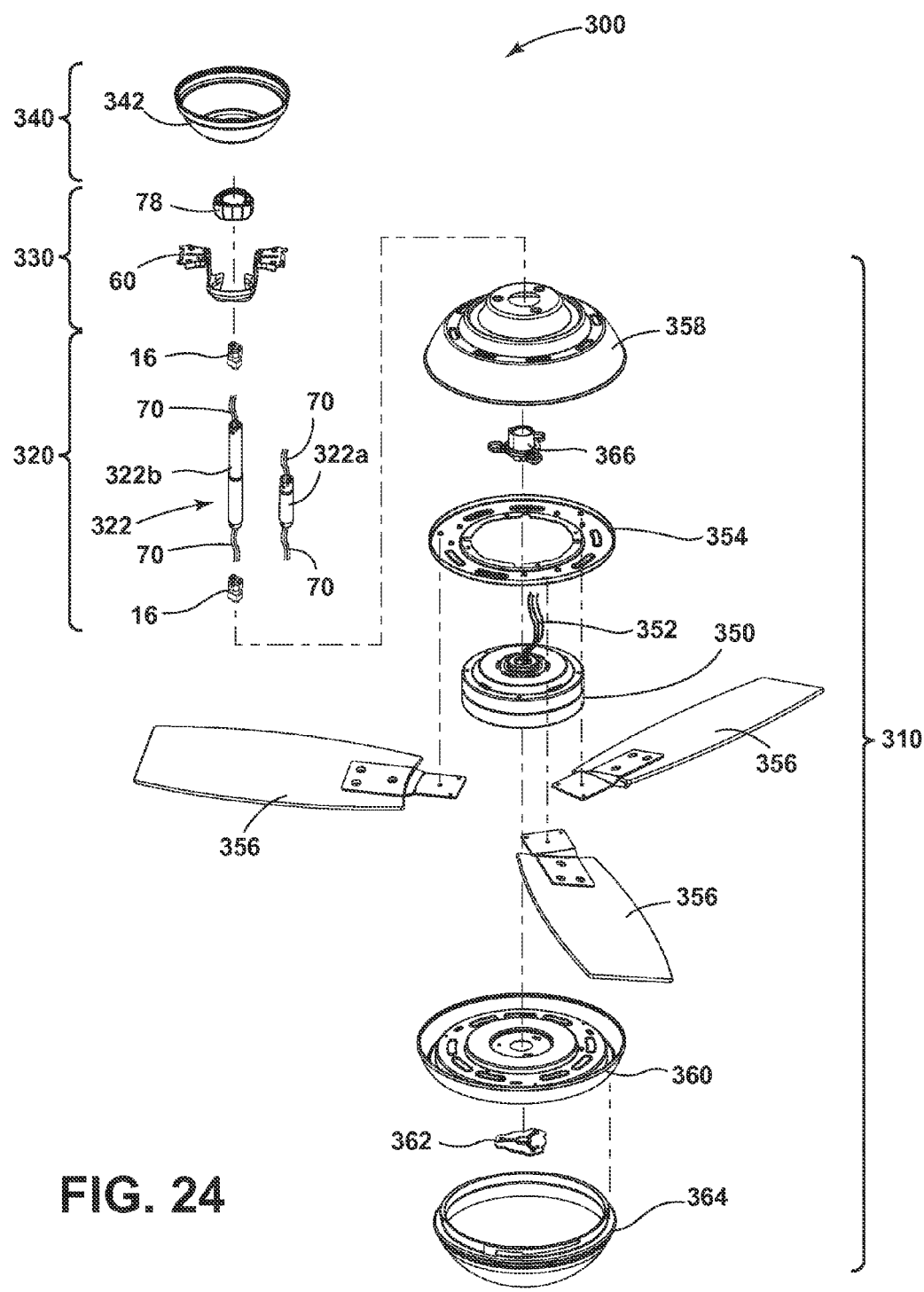
FIG. 24 illustrates an exploded view of ceiling fan elements comprising a kit with multiple pre-wired downrods.
Figure 25:
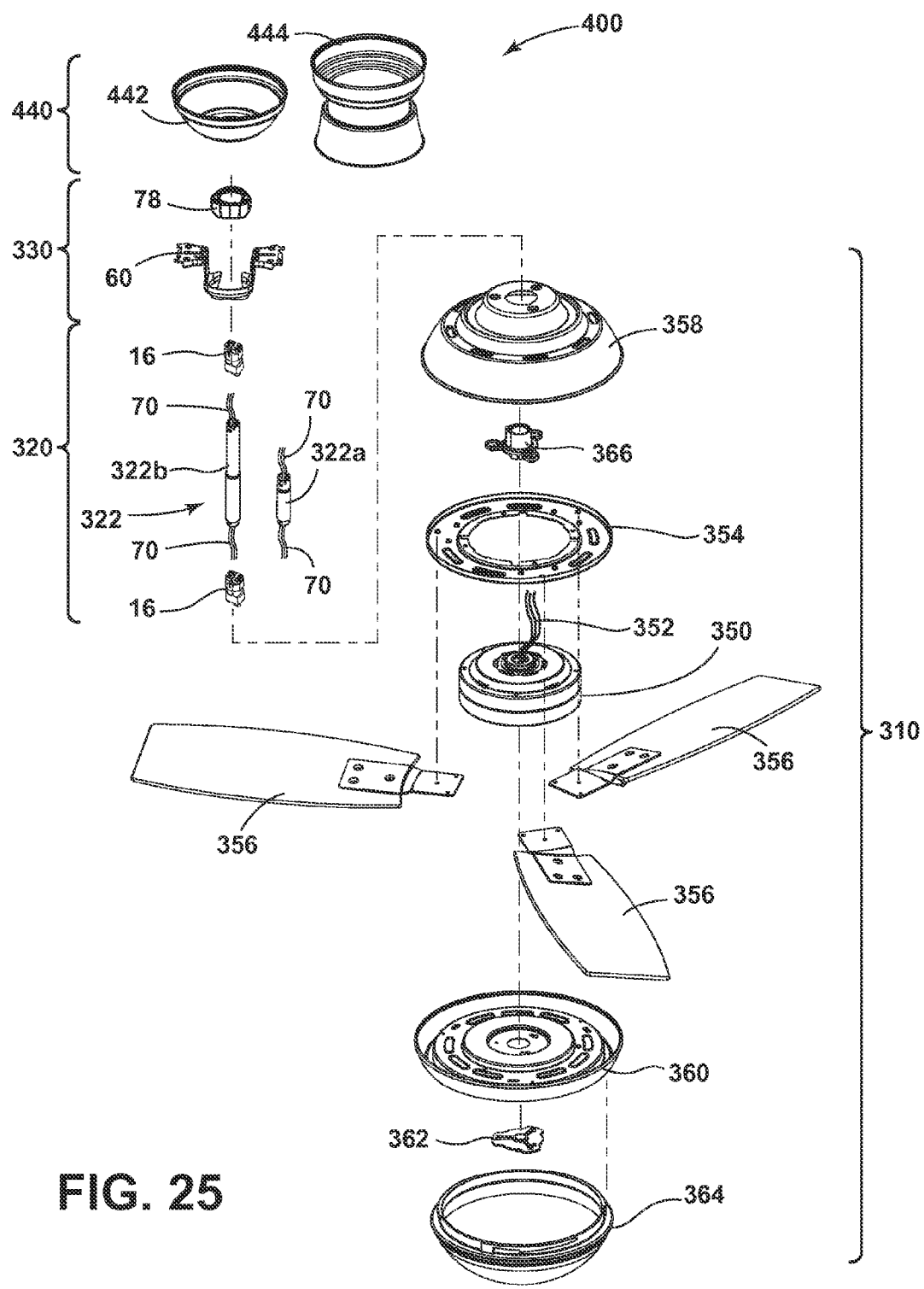
FIG. 25 illustrates an exploded view of ceiling fan elements comprising a kit with multiple canopies and multiple pre-wired downrods.

It is contemplated that a set of pre-wired downrods of varying length could be provided for one, some, or all of the different wiring/installation scenarios of FIGS. 13-20. It is further contemplated that different combinations for different wiring/installation scenarios can be assembled in a kit for ease of installation. FIGS. 24-25 illustrate two exemplary kits. Regarding FIG. 24, a ceiling fan kit 300 comprises a fan motor assembly 310, pre-wired downrod set 320, mounting assembly 330, and canopy set 340. The pre-wired downrod set 320 may comprise at least one push-in connector 16, a short pre-wired downrod 322a and a long pre-wired downrod 322b. Each pre-wired downrod 322 is preinstalled with a set of downrod wiring leads 70 and may comprise any of the pre-wired downrods 22, 122, 222 of FIGS. 21-23. While a set of two pre-wired downrods 322 are shown, the pre-wired downrod set 320 may contain any number of pre-wired downrods 322 having varying lengths, sizes, or shapes. Either pre-wired downrod 322a, 322b may be used for installation, and for convenience the following description will generally refer to downrod 322, with the understanding the description applies to either downrod 322a, 322b is included.

The mounting assembly 330 comprises the hanger bracket 60 and the ball 78. The hanger bracket 60 mounts to the ceiling or structure and the ball 78 couples the pre-wired downrod 322 to the hanger bracket 60. The ball 78 can provide for pivoting movement of the pre-wired downrod 322 relative to the hanger bracket 60 and can have a tri-lobe configuration to improve the seating and pivoting movement relative to the hanger bracket 60.

The canopy set 340 comprises a non-adjustable length canopy 342, best suited for a traditional-profile mounting. The non-adjustable length canopy 342 may further comprise the non-adjustable length canopy as disclosed in U.S. patent application Ser. No. 14/702,201 filed on May 1, 2015, which is incorporated herein by reference in its entirety. While FIG. 24 shows a single, non-adjustable length canopy 342, any number of canopies having differing shapes, sizes, or functionalities may be included in the canopy set 340.

The fan motor assembly 310, which may comprise the ceiling fan motor assembly 18 of FIGS. 13-20, may alternatively comprise a motor 350, including motor wires 352 which may comprise the fan wiring leads 20 of FIGS. 13-20, rotatably driving a rotor 354, which mounts a plurality of fan blades 356. Upper motor housing 358 and lower motor housing 360 enclose the motor 350 while leaving an annular opening through which the fan blades 356 extend. A motor coupler 366, which may comprise the downrod coupler 76 of FIGS. 18-20, mounts to an upper end of the motor 350, while a motor coupler brace 362 and a light globe or unit 364 mount to the lower end of the motor 350.

FIG. 25 shows a variation of FIG. 24 where a ceiling fan kit 400 comprises a canopy set 440 including both a non-adjustable length canopy 442 and an adjustable length canopy 444. While FIG. 25 shows both the non-adjustable length canopy 442 and the adjustable length canopy 444, any number of canopies having differing shapes, sizes, or functionalities may be included in the canopy set 440. The non-adjustable length canopy 342 is best suited for traditional-profile mounting, and the adjustable length canopy 444, best suited for low-profile mounting. The canopy set 440 gives the installer an option to mount the ceiling fan to the ceiling in alternative mounting profiles where an installer may normally be limited to one mounting profile or required to purchase additional parts to accommodate a particular ceiling or installation.

Turning now to FIGS. 26-48, multiple versions or embodiments for push-in connectors are shown, which may be used for any of the push-in connectors described herein. In cases where more than one push-in connector is used in a particular installation, it is not necessary that the same version be used. The different versions can be mixed in a particular installation.

Figure 26:
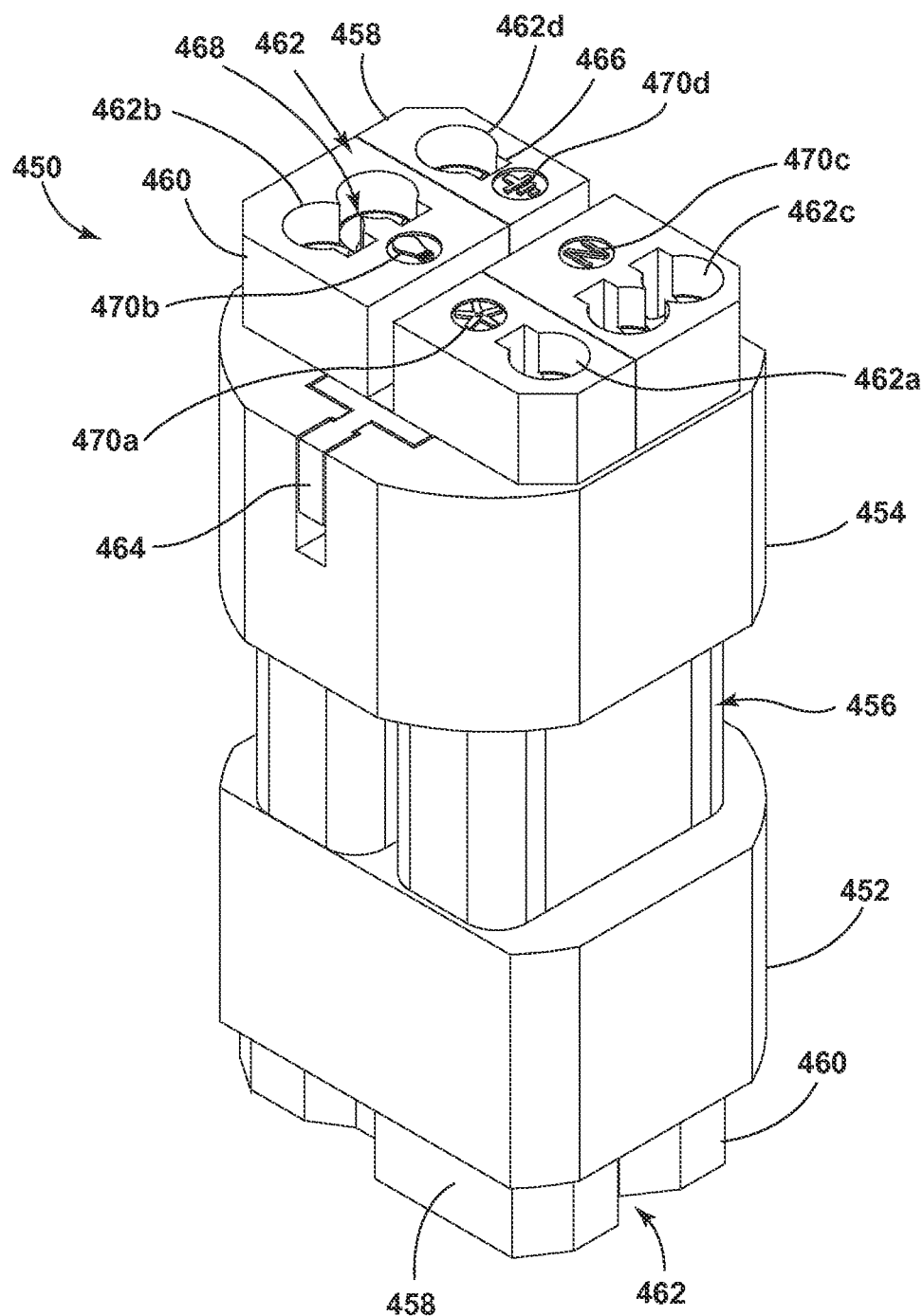
FIG. 26 illustrates a perspective view of an alternative embodiment of connector of FIG. 1.
Figure 27:
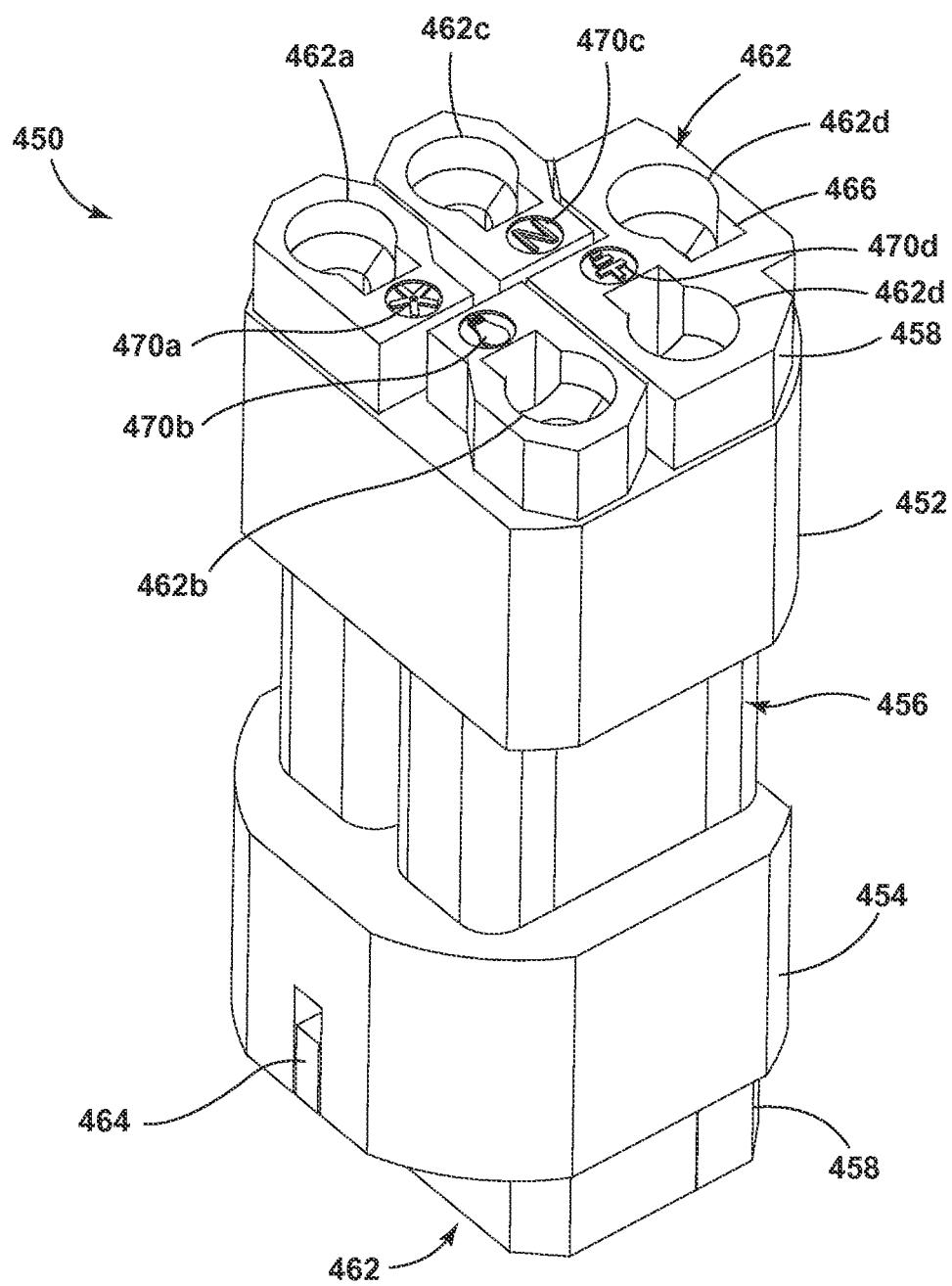
FIG. 27 illustrates the opposite end of the push-in connector of FIG. 26.
Figure 28:
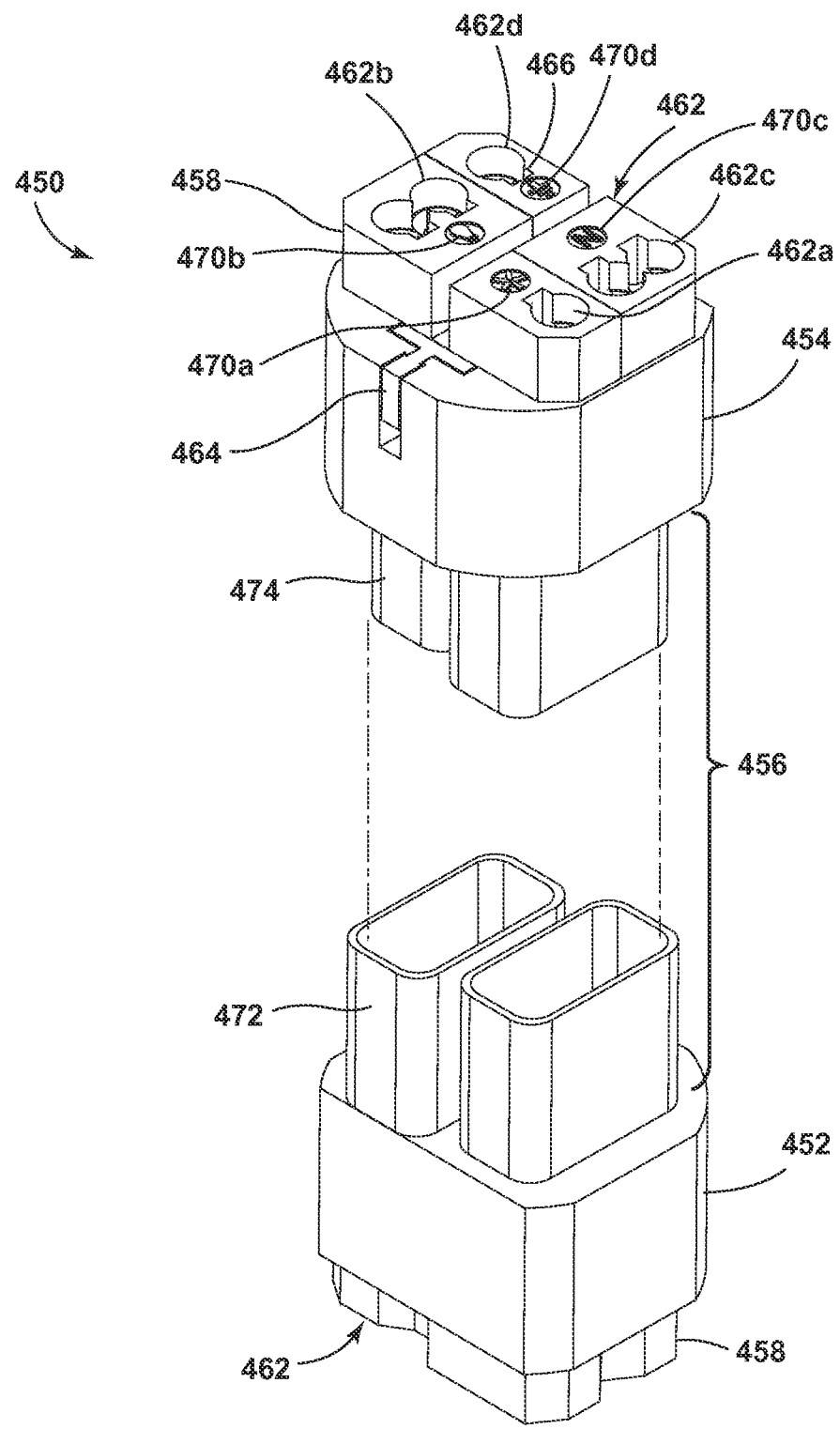
FIG. 28 illustrates an exploded view of the push-in connector of FIG. 26.

FIGS. 26-28 show another embodiment of the push-in connector, which is a variation on the push-in connector of FIGS. 1-9. In FIG. 26, a push-in connector 450 comprises a plug portion 452 and a socket portion 454, each portion having a proximal end 456 and a distal end 458. The distal end 458 of the socket portion 454 comprises a plurality of raised surfaces 460 each surface having a single or dual port 462, each port integrated with a release port 466. Dual ports 462 are integrated, such that they share a cavity 468 for the insertion of a wire lead. Each raised surface 460 is further disposed with indicia 470. The socket portion 454 contains six ports 462 comprising a single fan port 462a, dual light port 462b, dual neutral port 462c, and single ground port 462d, identified as such by corresponding indicia 470 comprising fan indicia 470a, light indicia 470b, neutral indicia 470c, and ground indicia 470d, respectively. The socket portion 454 further comprises a jumper 464, facilitating the electrical connection between either one or two live wire leads.

In FIG. 27, the distal end 458 of the plug portion 452 has five ports 462, comprising single fan 462a, single light 462b, single neutral 462c, and dual ground 462d ports, identified as such by corresponding fan indicia 470a, light indicia 470b, neutral indicia 470c, and ground indicia 470d, respectively.

In FIG. 28, the plug 452 and socket 454 portions have been disconnected. The proximal ends 456 of the portions comprise two plugs 472 and sockets 474, adapted to releasably connect to one another, which upon connection, electrically couple wire leads inserted into the ports 462 to one another.

In further variations, the plug portion 452 may comprise a single plug 472 and the socket portion 454 may comprise a single socket 474, or may comprise any number of plugs 472 or sockets 474 corresponding to the ports 462. The indicia 470 may further comprise colors, symbols, icons, shapes, or otherwise which may correspond to a particular wire lead or port 462.

Figure 29:
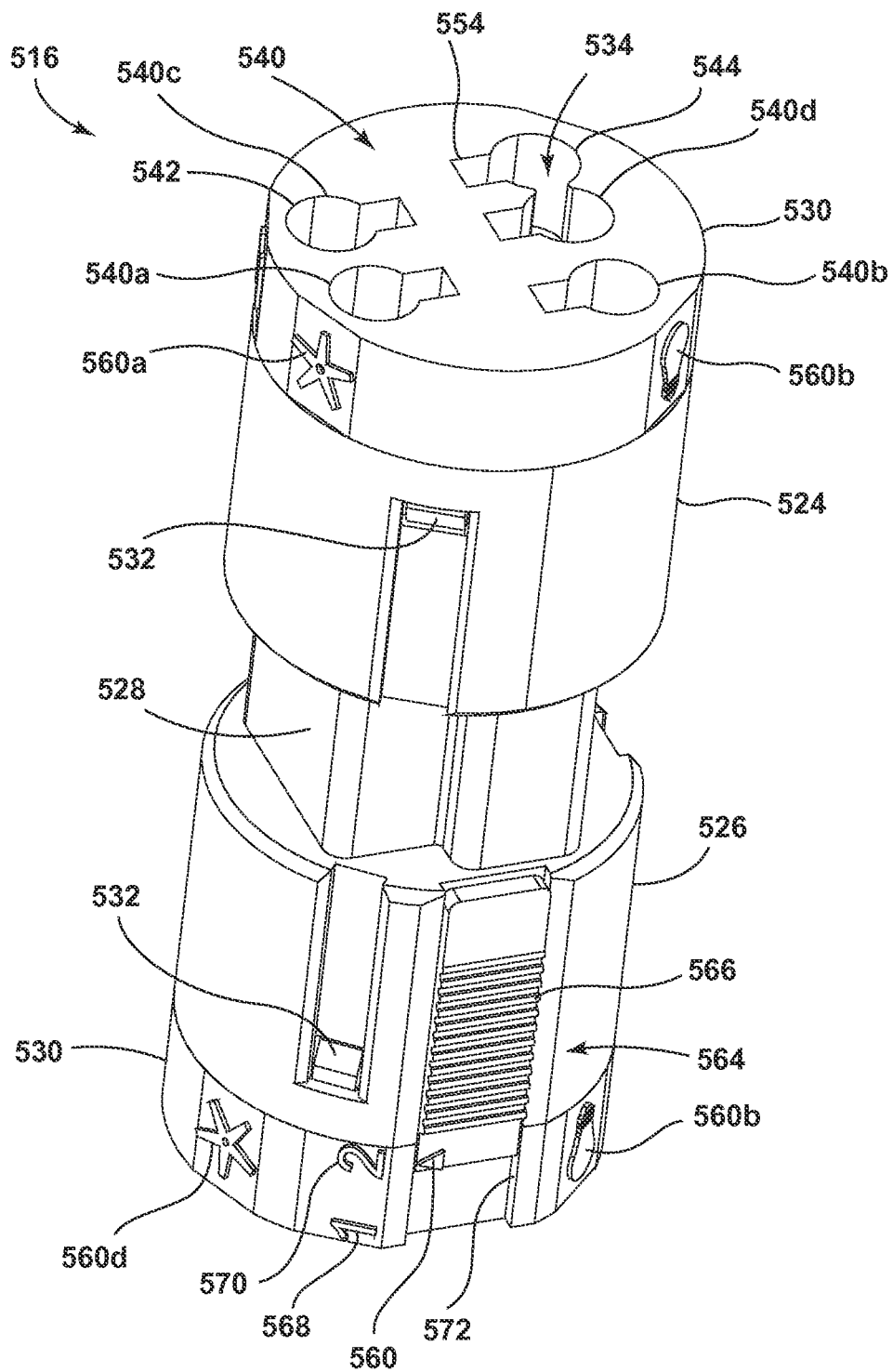
FIG. 29 illustrates a perspective view of a cylindrical push-in connector according to another embodiment of the push-in connector.
Figure 30:
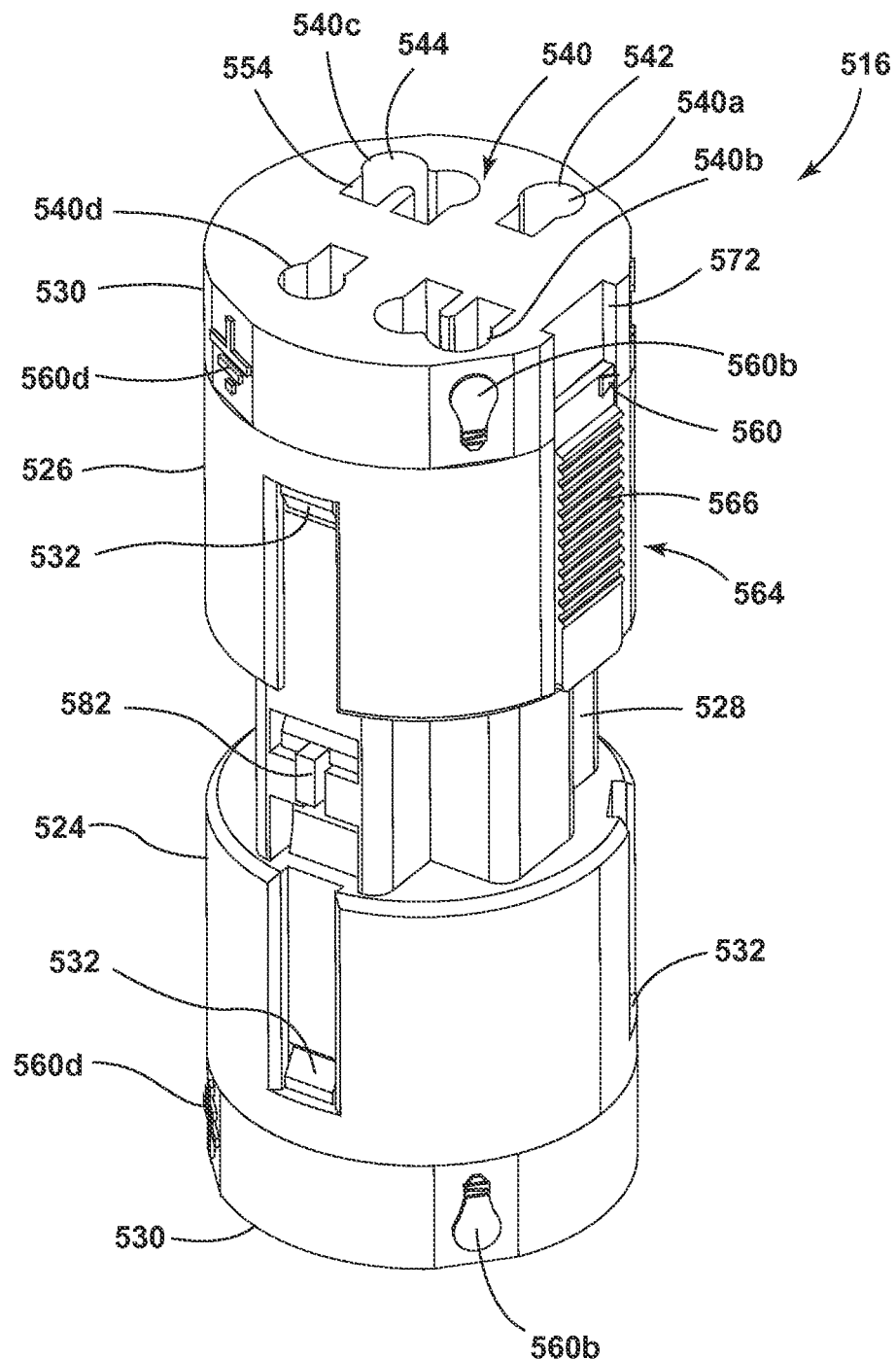
FIG. 30 illustrates a perspective view of the opposite end of the push-in connector of FIG. 29.
Figure 31:
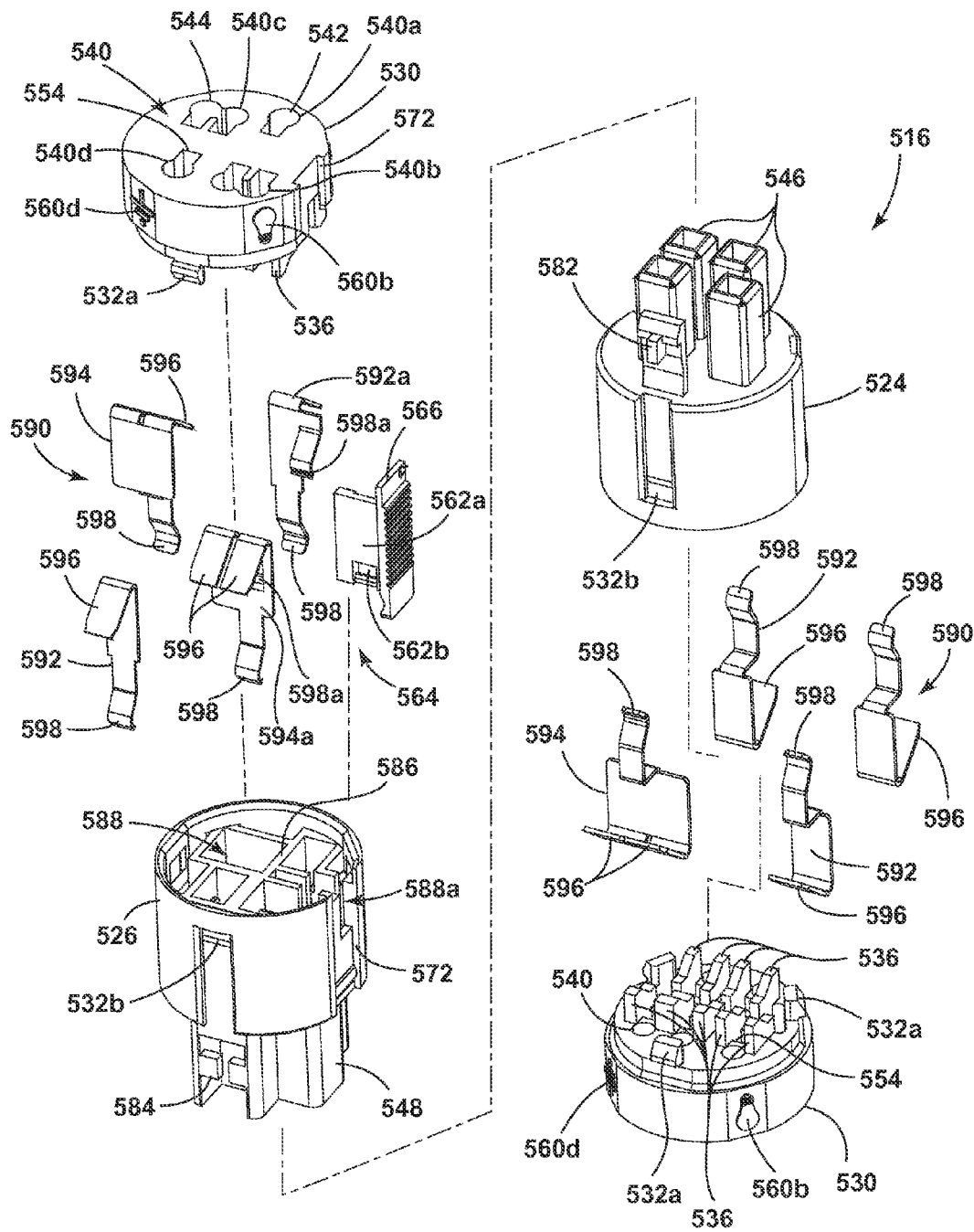
FIG. 31 illustrates an exploded view of the push-in connector of FIG. 30.

Another embodiment of a push-in connector 516 is illustrated in FIGS. 29-31. Beginning with FIG. 29, the push-in connector 516, comprises a plug portion 524 and a socket portion 526 which releasably connect to one another at a proximal end 528. Each portion, opposite of the proximal end 528, is enclosed by a cap comprising the distal end 530. Each distal end 530 couples to each respective portion with a push-lock 532.

The distal end 530 disposed on the plug portion 524 has five ports 540, white any number of ports 540 is contemplated. Each port 540 may be a single port 542 for receiving a single wire lead or may be a dual port 540 for receiving two wire leads. The five ports 540 may comprise a single fan port 540*a*, single light port 540*b*, single neutral port, 540*c*, and dual ground ports 540*d*. Each port 540 is further disposed with a release port 554 for accepting a release member. Each port 540 and complementary release port 554 are integrated such that they share a cavity 534 providing access to the internal components of the push-in connector 516, later described in the discussion of FIG. 31.

The distal ends 530, on both the plug 524 and socket 526 portions, also contain a plurality of indicia 560, each corresponding to a port 540 disposed on the distal end 530 for receiving the insertion of a particular wire lead. While the indicia 560 disposed on the distal end 530 are shown as symbols of a fan 560*a*, light 560*b*, neutral (not shown), and ground 560*d*, best seen in both FIGS. 29 and 30, the indicia 560 may comprise any colors, symbols, icons, shapes or otherwise which may indicate the insertion of a particular wire lead into a corresponding port 540. As may be appreciated, the fan indicia 560*a*, light indicia 560*b*, neutral indicia (not shown), and ground indicia 560*d* correspond to the fan port 540*a*, light port 540*b*, neutral port 540*c*, and ground port 540*d* respectively.

A jumper 564 is incorporated as a slide member 566 on the side of the socket portion 526. The jumper 564 may operate by sliding the slide member 566 along a channel 572 disposed within the side of the socket portion 526 between a first jumper indicia 568 corresponding to a first position for a single-switch wiring scenario, and a second jumper indicia 570 corresponding to a second position for a dual-switch wiring scenario. The distal end 530 disposed on the socket portion 526 is shaped to extend the channel 572 and further comprises both jumper indicia 568, 570 between which the slide member 566 may be slid. The slide member 566 may further contain indicia 560, shown as an arrow, corresponding to either jumper indicia 568, 570 when slid along the channel 572.

FIG. 30 shows the distal end 530 on the end of the socket portion 526 of the push-in connector 516. The distal end 530 on the socket portion 526 has six ports 540, comprising single fan 540*a*, dual light 540*b*, dual neutral 540*c*, and single ground 540*d* ports, with each port 540 having an incorporated release port 554. Each port 540 is associated with corresponding indicia 560, having light 560*b* and ground 560*d* indicia symbols shown. The proximal ends 528 secure with a lock 580, comprising a male component 582 and female component 584 (FIG. 31) associated with the plug portion 524 and socket portion 526 respectively.

Turning to FIG. 31, the organization and composition of the internal electrical components of the push-in connector 516 of FIGS. 29 and 30 may be seen. Each distal end 530 has been exploded from the plug 524 and socket 526 portions 526 of the push-in connector 516, and a plurality of busbars 590 are now viewable.

The underside of the distal end 530 corresponding to the plug portion 524 contains a plurality of supports 536. The ports 540 and release ports 554, on the underside of each distal end 530, have supports 536 disposed on either side for supporting and aligning the busbars 590 with their corresponding ports 540. Each distal end 530 also contains a plurality of push-lock male components 532*a* comprising half of the push-lock 532 of FIGS. 29 and 30.

The plug portion 524 has a plurality of push-lock female components 532*b* disposed within it for receiving the push-lock mate components 532*a* disposed on the distal end 530. The plug portion 524 comprises the male component 582 of the lock 580, used to secure the plug 524 and socket portions 526 together. The plug portion 524 further comprises four plugs 546 extending from the plug portion 524 adapted for insertion into the socket portion 526. The plugs 546 may be disposed in a keyed manner, allowing insertion into the socket portion 526 in a single orientation.

The socket portion 526 is disposed with a plurality of sockets 548 for receiving the slidable insertion of the plugs 546 from the plug portion 524. The distal end 530 is exploded from the socket portion 526, exposing a series of non-conductive walls 586 defining a plurality of internal recesses 588. Each internal recess 588 is adapted to receive one busbar 590 such that insertion of a wire lead through the port 540 on the distal end 530 will extend into one internal recess 588, electrically and mechanically coupling to a busbar 590. A jumper recess 588*a*, partially disposed within the channel 572, is disposed in a manner allowing communication between two adjacent internal recesses 588 which may be used to electrically couple or uncouple busbars 590 disposed within the adjacent internal recesses 588 upon sliding the slide member 566. The socket portion 526 is further disposed with push-lock female components similar to that of the plug portion 524, and has the complementary female component 584 to the male component 582 of the plug portion 524 which, upon interconnection, comprises the lock 580 of FIG. 30.

The distal end 530 associated with the socket portion 526 is disposed with a plurality of supports 536, similar to that of the distal end 530 associated with the plug portion 524, while only partially visible.

The plurality of busbars 590 may comprise different types of busbars 590 including but not limited to, a single busbar 592, dual busbar 594, single jumper busbar 592*a*, and dual jumper busbar 594*a*. Busbars 590 generally have one engagement ridge 598, while single busbars 592 have one spring finger 596 and dual busbars 594 have two spring fingers 596. Each jumper busbar 592*a*, 594*a* has an additional engagement ridge 598*a* for electrically coupling to one another via the jumper 564.

While not visible in FIG. 31 for the plug portion 524, both the plug portion 524 and the socket portion 526 comprise a corresponding system of non-conductive walls 586 defining a plurality of internal recesses 588. The internal recesses 588 receive the busbars 590, securing and aligning the busbars 590 with respective ports 540, plugs 546, or sockets 548. The corresponding systems of walls 586 between the plug 524 and socket 526 portions are designed to electrically couple corresponding wire leads, as may be identified by the indicia 560, upon coupling the plug 524 and socket portions 526.

The jumper 564 comprises a conductive component 562*a* and a non-conductive component 562*b* extending from the slide member 566 internally of the socket portion 526 within a jumper recess 588*a*. Upon sliding the slide member 566 into a dual switch position, the conductive material of the conductive component 562*a* of the jumper 564 electrically couples jumper engagement ridges 598*a* of the jumper busbars 592*a*, 594*a* disposed within the internal recesses 588 adjacent to the jumper recess 588*a*. Sliding the slide member 566 to the single switch set-up position, moves the non-conductive component 562 between the adjacent busbars 590 in adjacent internal recesses 588, returning to push-in connector 516 to a single switch wiring scenario.

The spring fingers 596 protrude from the busbars 590 at an angle, and may flex to accommodate the insertion a wire lead into a port 540. At insertion, the spring finger 596 compresses, accommodating the insertion of the wire lead and secures the wire lead against a wall 586 within the push-in connector 516 while simultaneously electrically coupling the wire lead to the busbar 590. During removal of the wire lead, a release tool may be inserted into the release port 554, pushing the spring finger 596 away from the wire lead, facilitating wire lead removal.

The engagement ridges 598 extend from the busbar 590 at an end opposite of the spring finger 596. Each engagement ridge 598 comprises a curved shape, which may flex or bend at the body of one of the busbars 590 to slide over a second, complementary engagement ridge 598 of another busbar 590. Upon engagement of the two engagement ridges 598, the two busbars 590 associated therewith electrically couple to one another. The engagement ridges 598 on the busbars 590 extend from the plug 524 and socket 526 portions within the plugs 546 and sockets 548 such that connection between the two portions 524, 526 electrically couples the internal busbars 590 at complementary engagement ridges 598 in both portions 524, 526. During separation of the plug 524 and socket 526 portions, the engagement ridges 598 slide back over and apart from one another, slightly bending or flexing at the body of the busbar 590, in the same manner in which they were engaged.

Regarding the push-in connector 516 of FIGS. 29-31, while the distal end 530 with six ports 540 is generally intended to orient towards the fan motor assembly, the push-in connector 516 may be oriented in either direction. In further variations, the distal ends 530 may be disposed with any number of ports 540 having a plug 524 and socket 526 portion with associated busbars 590 corresponding to the ports 540. The embodiment shown is exemplary and meant to be non-limiting.

Figure 32:
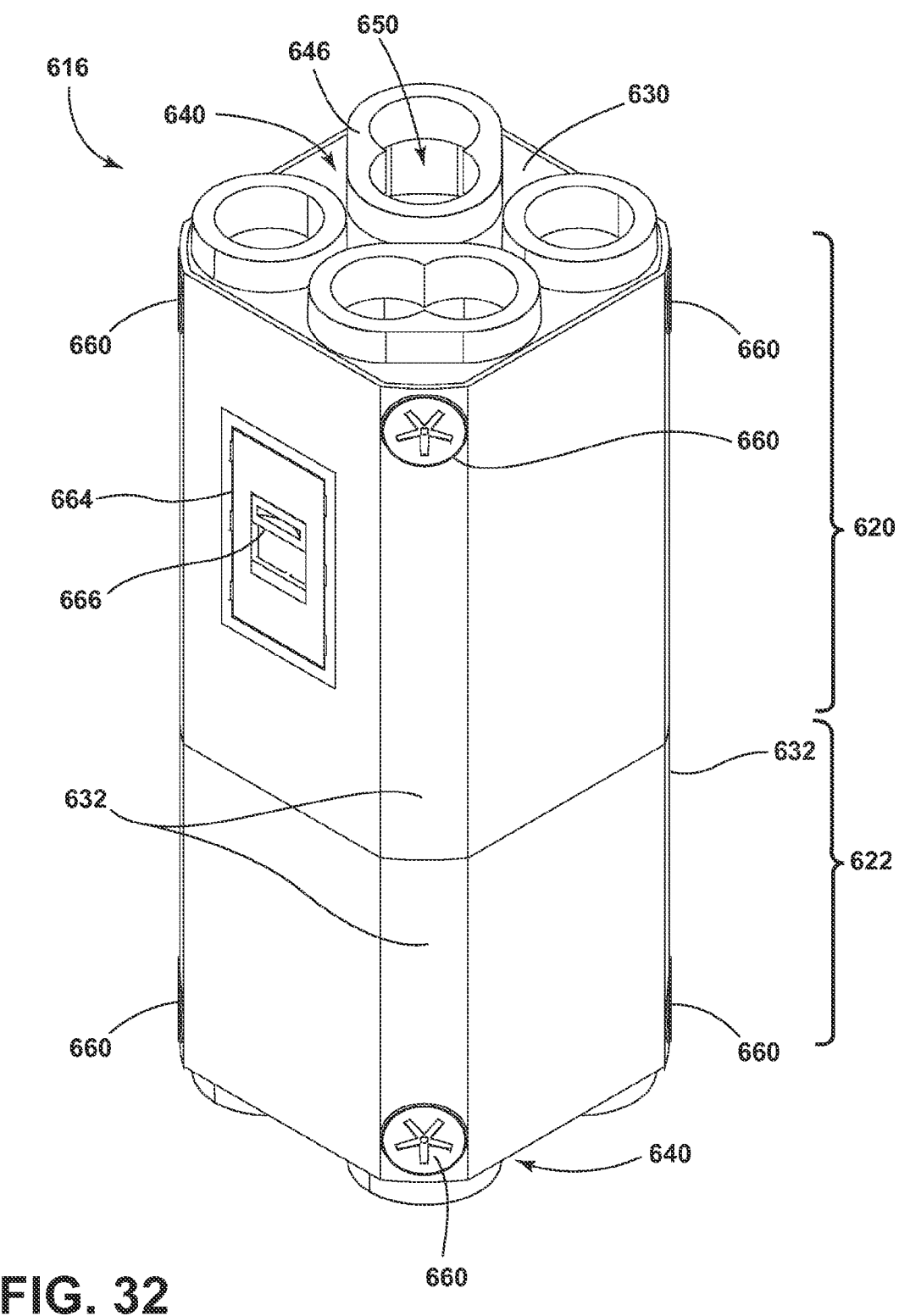
FIG. 32 illustrates a perspective view of a cubic push-in connector according to another embodiment of the push-in connector.
Figure 33:
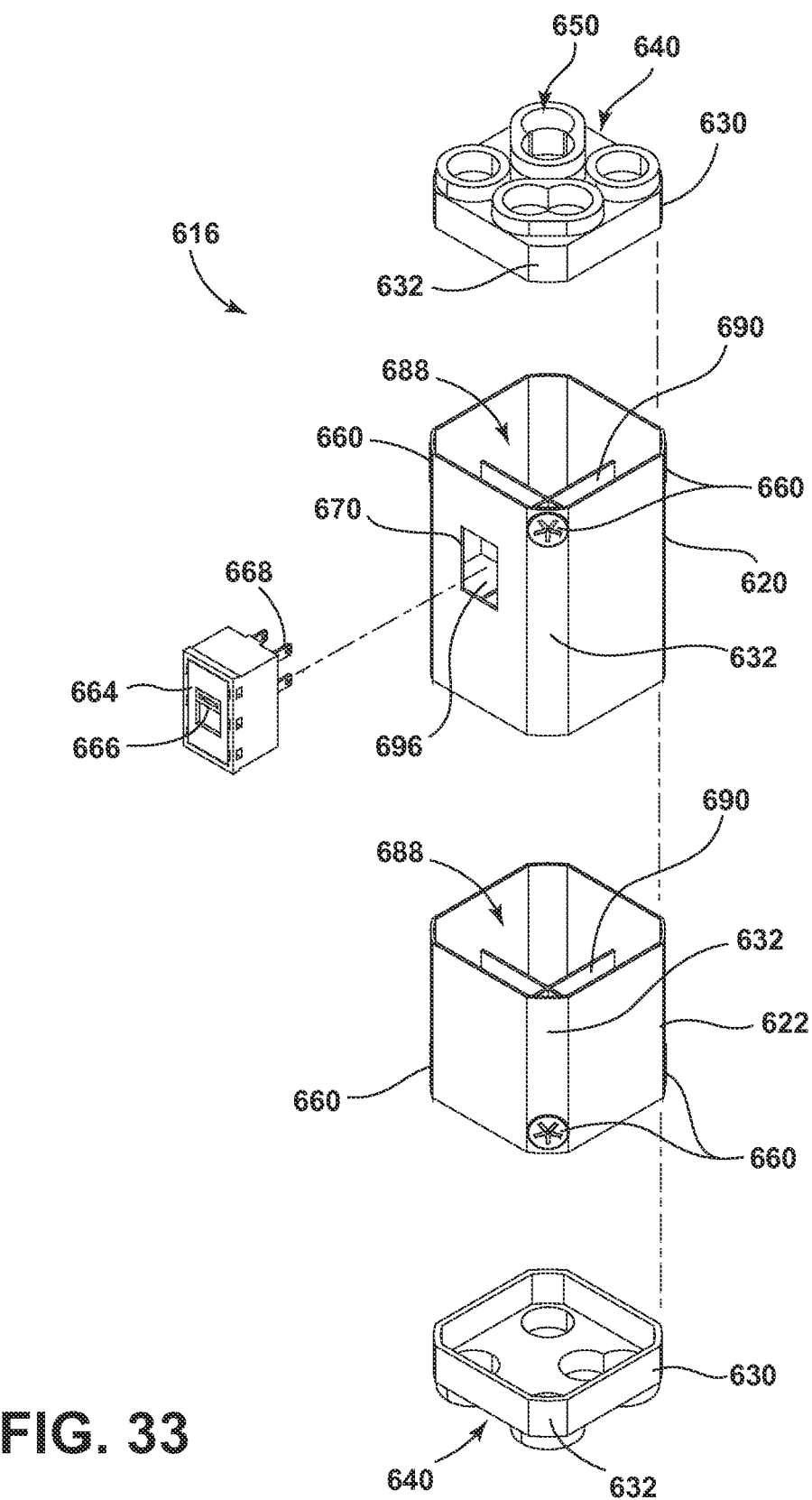
FIG. 33 illustrates an exploded view of the push-in connector of FIG. 32.

Another embodiment of a push-in connector 616 is shown in FIGS. 32 and 33, in which the push-in connector 616 combines into a single unit without releasably connectable plug and socket portions as compared to other embodiments. In FIG. 32 the push-in connector 616 comprises an upper member 620 and a lower member 622, with each member 620, 622 having a distal end 630. The distal ends 630 comprise a plurality of ridges 646 defining single or dual ports 640 wherein the dual ports may share a cavity 650 for accepting wire insertion. The upper and lower members 620, 622 have beveled edges 632, with each beveled edge 632 having indicia 660 corresponding to a port 640. The upper member 620, on one side, comprises a jumper 664 with a jumper switch 666. The jumper may be operated by actuating the jumper switch 666.

Referring to FIG. 33, the distal ends 630 are further disposed with beveled edges 632 permitting insertion within the upper and lower members 620, 622. The upper member 620 further comprises a jumper opening 670 for receiving the jumper 664. Both the upper and lower members 620, 622 are hollow, defining internal recesses 688. Within each internal recess 688 is a busbar 690, which comprises a plurality of spring fingers 696. Upon insertion of wire leads into corresponding ports 640 on opposite distal ends 630, the wire leads are electrically coupled to one another. The jumper 664 further comprises a set of prongs 668 extending from the jumper 664. The prongs 668 are operably connected to the jumper switch 666 such that actuation of the jumper switch 666 correspondingly moves the prongs 668. In a dual wiring scenario, the prongs 668 will contact the internal busbars 690 such that two adjacent busbars 690 are electrically coupled.

Figure 34:
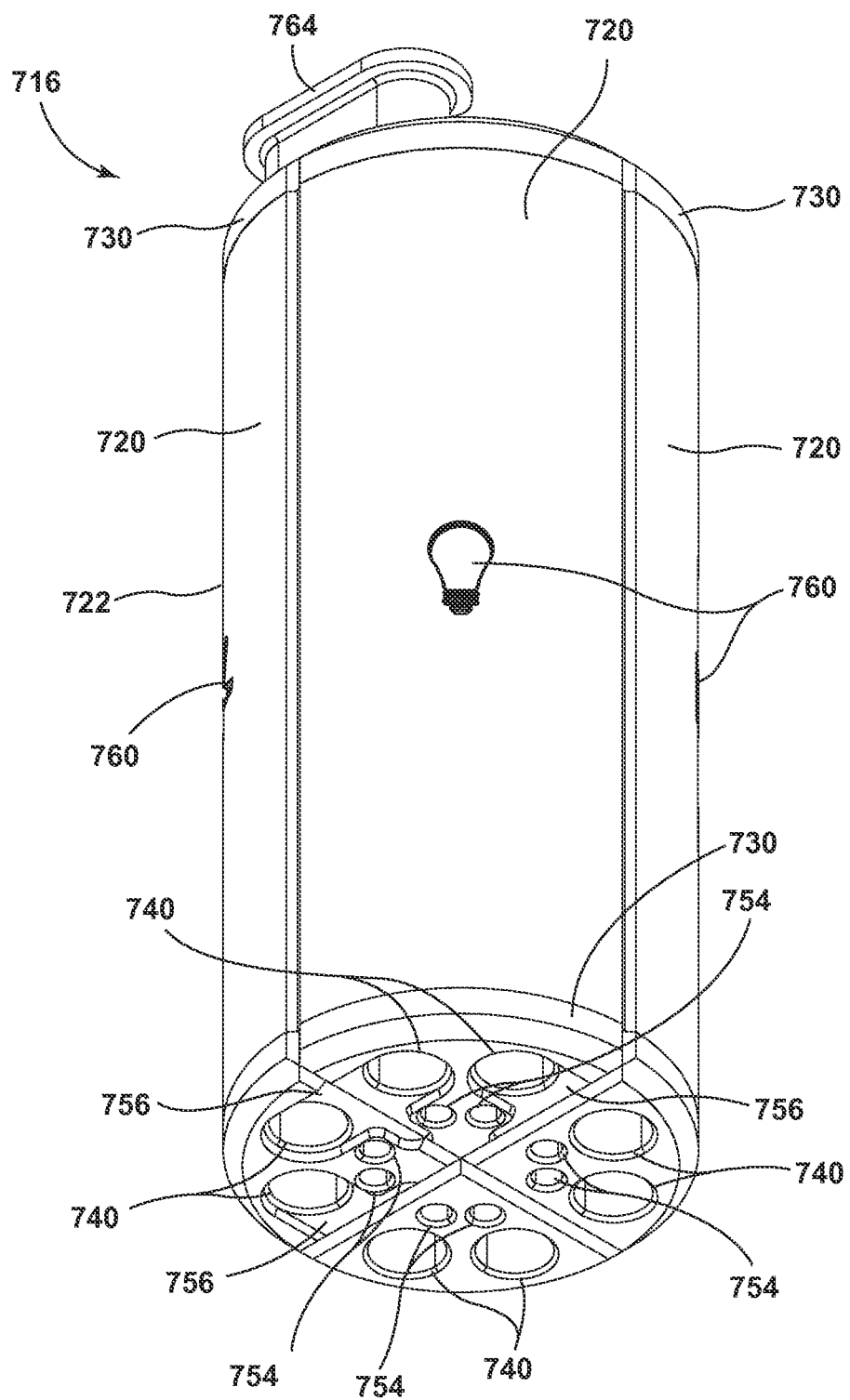
FIG. 34 illustrates a bottom perspective view of a quadrant-style push-in connector according to another embodiment of the push-in connector.
Figure 35:
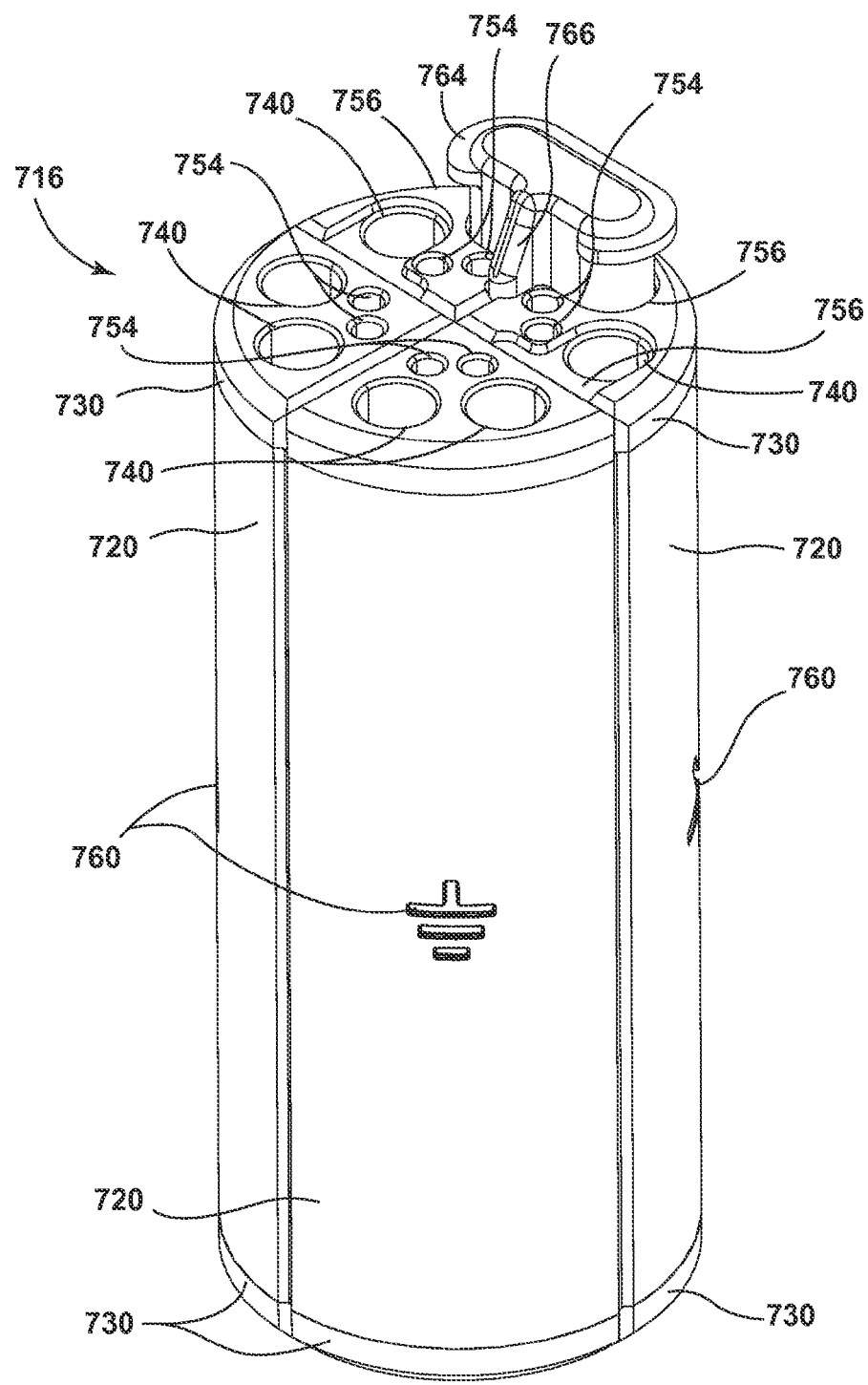
FIG. 35 illustrates a top perspective view of the push-in connector of FIG. 34.
Figure 36:
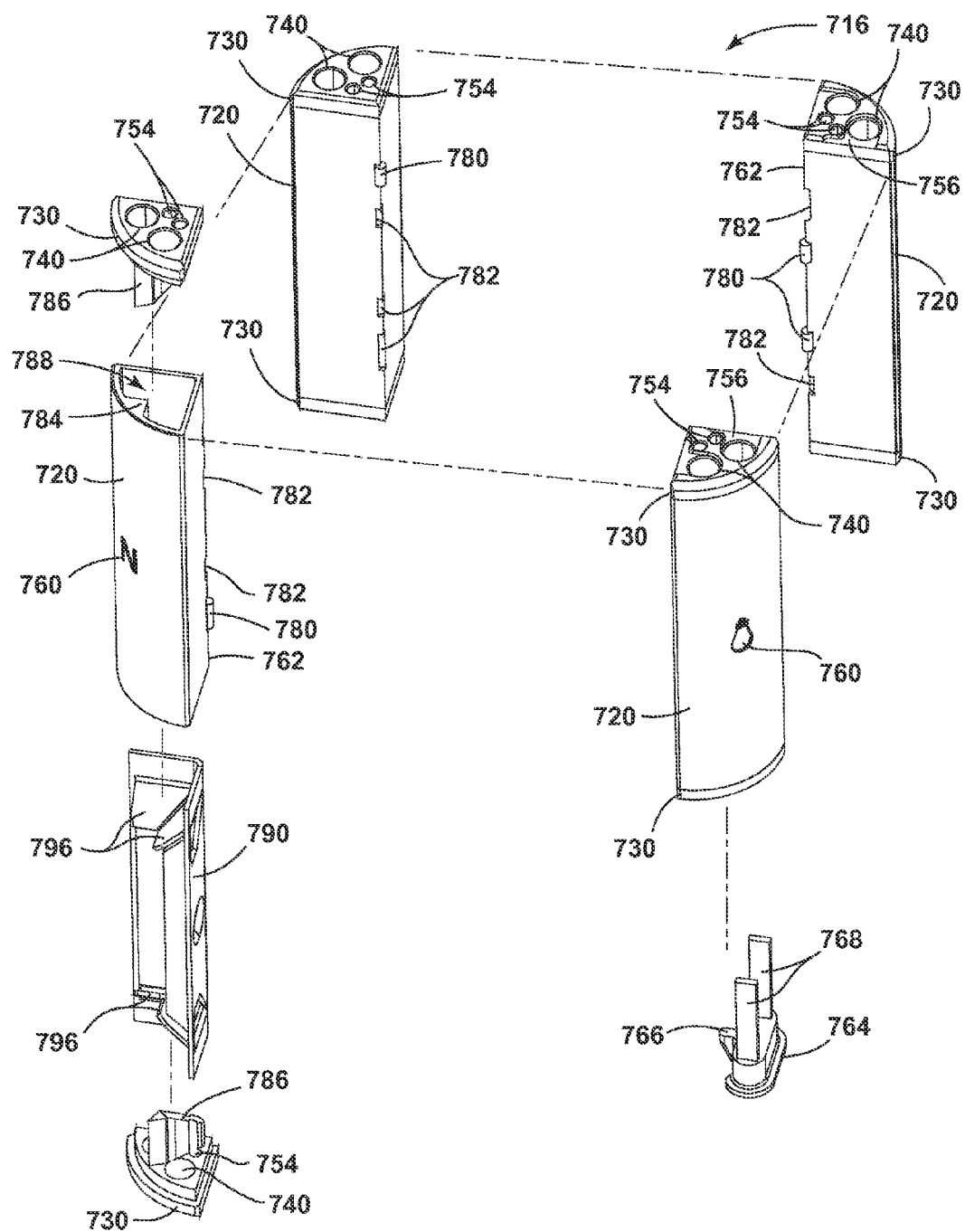
FIG. 36 illustrates an exploded view of the push-in connector of FIGS. 34 and 35.

FIGS. 34-36 show another embodiment of a push-in connector in the form of a quadrant-style push-in connector 716 combinable into a single unit without releasably connectable plug and socket portions as compared to other embodiments. Turning to FIG. 34, the push-in connector 716 comprises a body 722 having a set of four quadrants 720, each being identified by indicia 760 disposed on the side of the each quadrant 720. Each quadrant 720 may be equally sized, the combination of which forms a cylindrical shaped body 722. Alternatively, each quadrant 720 may be uniquely sized, such that the combination of all quadrants 720 completes the push-in connector 716. Each quadrant 720 has two distal ends 730 disposed on either end of each quadrant 720. Each distal end 730 has a set of two wire ports 740 and two release ports 754. The ports 740 and release ports 754 may be separated from one another or integrated into a single port.

At least some of the distal ends 730 of the quadrants may contain a jumper-key recess 756 for accepting a jumper 764 into two adjacent ports 740 among two adjacent quadrants 720. The distal ends 730 may be arranged between adjacent quadrants 720 such that the jumper-key recesses 756 combine into a particular combination for the insertion of a jumper 764 into a particular position among two adjacent quadrants 720. For example, the jumper-key recesses 756 may be arranged among an adjacent light and fan quadrants 720 such that the insertion of a jumper 764 would permit control of the light units and fan from two wall switches. In the illustrated embodiment, the neutral and ground quadrants 720, as identified by their indicia 760, are not provided with jumper-key recesses 756, and so do not receive the jumper 764.

Turning now to FIG. 35, the opposite end of the push-in connector 716 with a jumper 764 inserted into ports 740 between two adjacent quadrants 720 is shown. The jumper 764 further comprises a jumper ridge 766, extending from one side of the jumper 764. The jumper ridge 766 is shaped to fit particularly within the jumper-key recesses 756 such that the jumper 764 may only be inserted in a single orientation among adjacent accepting ports 740.

Turning to FIG. 36, an exploded view of the push-in connector 716 is shown. Each quadrant 720 includes an inner edge 762 having one or more male keys 780 and female keys 782. The male 780 and female 782 keys are disposed along the inner edges 762 of the quadrants 720 such that combination of the quadrants 720 may only be arranged in a particular combination. In one example, the quadrants 720 may be keyed to combine such that the light and fan quadrants 720 are adjacent to one another, accommodating the insertion of the jumper 764 between the two quadrants 720 and enabling single or dual wall switch wiring scenarios. In variations, the male 780 and female 782 keys may be disposed allowing any combination of quadrants 720, being keyed or non-keyed.

The quadrants 720 are hollow, and include an internal recess 788 for receiving a busbar 790. The internal recess 788 is further defined by a protrusion 784 within each quadrant 720. The busbar 790 contains four spring fingers 796, electrically coupled to one another, with two spring fingers 796 disposed on either end of the busbar 790. Upon insertion, the busbars 790 are disposed within the internal recess 788 such that an inserted wire is held against the protrusion 784 by the spring finger 796. Each distal end 730 further comprises a separator 786 which extends between the two spring fingers 796 disposed on either side of the busbar 790. The separator 786 prevents two wires inserted into a single quadrant 720 from contacting one another or may further be used as a surface in which a spring finger 796 secures a wire.

The jumper 764 further comprises jumper prongs 768 extending therefrom. The jumper prongs 768 are inserted into ports 740 among adjacent quadrants 720 where the jumper-key recesses 756 permit the insertion of the jumper 764. Upon insertion, the prongs 768 contact the spring fingers 796 of the busbars 790 within the quadrants 720, electrically coupling the busbars 790 and facilitating a dual switch wiring scenario.

Another embodiment of a push-in connector 816 is shown in FIGS. 37-41, in which the push-in connector 816 is a four-port embodiment. In FIG. 37, the push-in connector 816 comprises a body 820 covered on opposite ends by two distal ends 830. Each distal end 830 couples to the body 820 with a push-lock 832. The distal ends 830 are identical, each comprising four ports 840 having four corresponding release buttons 854 identified as such by four indicia 860. Each port 840 and associated release button 854 may comprise further indicia such as colors, icons, or symbols, identifying a particular wire for insertion. FIG. 38, showing a top view of the push-in connector 816, is exemplary of how the ports 840, release buttons 854, and indicia 860 may be disposed.

FIG. 39 is a top view of the push-in connector 816 with the distal end 830 removed to show the internal components of the push-in connector 816. The push-in connector 816 comprises internal walls 886 defining a plurality of internal recesses 888. Each internal recess 888 is associated with a busbar 890, a spring member 896, and a release member 856. Each spring member 896 aligns beneath an associated port 840 (FIG. 37) for accepting the insertion of a wire lead. The busbar 890 is disposed within each internal recess 888, opposite from the spring member 896, such that the spring member 896 will press an inserted wire lead against the busbar 890. The release members 856 are aligned adjacent to the spring member 896 and operable coupled with one of the release buttons 854, such that depression of the release button 854 pushes the release member 856 against the spring member 896, bending the spring member 896 away from the busbar 890. The bent spring member 896 permits removal of an inserted wire lead, normally secured by the spring member 896 against the busbar 890.

Turning to FIG. 40, taken at the cross-section V-Y of FIG. 37, the internal recess 888, as defined by the internal walls 886, situates the spring member 896 opposite the busbar 890. The spring member 896 aligns against an inner internal wall 886, and has a finger 898 extending across the internal recess 888 to the busbar 890. The release member 856, extending from the corresponding release button 854, rests against the finger 898, adjacent to where an inserted wire may contact the finger 898. Each busbar 890 extends along an outer internal wall 886 between two corresponding internal recesses 888 disposed on opposite ends of the push-in connector 816.

Figure 41:
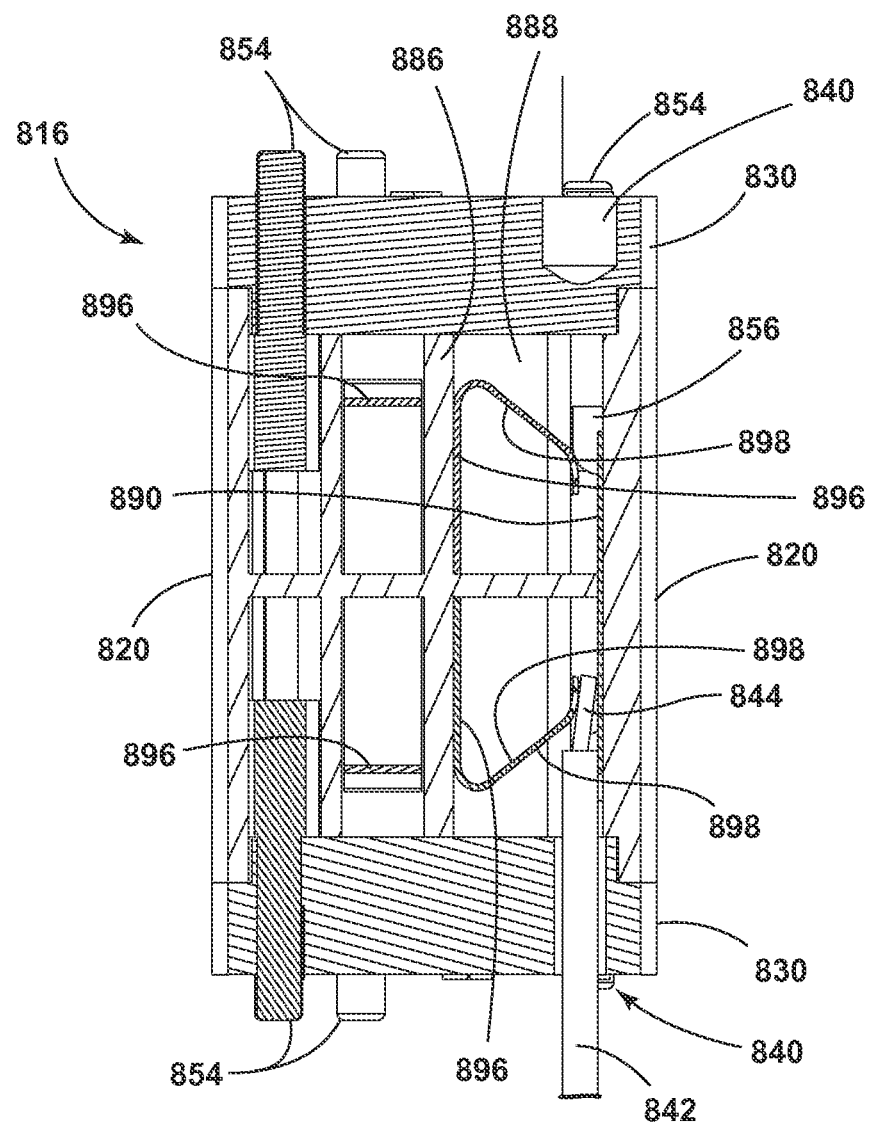
FIG. 41 illustrates the push-in connector of FIG. 40 with an inserted wiring lead and depressed release button.

Turning to FIG. 41, also taken at the cross-section Y-Y of FIG. 37, an inserted wire lead 842 having a wire tip 844 is pressed against the busbar 890 by the finger 898 of the spring member 896. While not shown, another wire lead may be inserted into the corresponding ports 840 disposed on the end 830 of the push-in connector 816 to electrically couple with the illustrate wire lead 842 via the busbar 890. To release the inserted wire lead 842, the release button 854 corresponding to the port 840 in which the lead 842 is inserted is depressed, forcing the release member 856 against the finger 898. The finger 898 bends backward toward the inner internal wall 886, releasing the inserted wire lead 842 and permitting removal. After removing the wire lead 842, the release button 854 is released, returning the release member 856 and thus the finger 898 to an initial position, prepared to accept the insertion of another wire lead 842.

Turning now to FIGS. 42-46, an eight-port embodiment of a push-in connector 916 is shown. Referring to FIG. 42, the push-in connector 916 is generally cubic, but may comprise any shape, and comprises a body 918. The body 918 is comprised of four sides 920, having beveled edges 922 separating the sides 920. The four sides 920 are enclosed on opposite ends by distal ends 930. The distal ends 930, having the same configuration as each other, are each provided with eight ports 940 for accepting the insertion of a wire lead. In variations of the push-in connector 916, the distal ends 930 may have a different number of ports 940 or may be dissimilar from one another. As may be appreciated, the eight ports 940 are separated into four sets 942 of two ports 940, each port 940 in each set 942 being separated by a release button 954 disposed between the two ports 940. The arrangement of the ports 940, comprising four sets 942 with a release button 954 disposed between the ports 940 of one set 942, is best appreciated in FIG. 43.

In FIG. 44, a system of internal walls 986 defines a plurality of internal recesses 988. Each internal recess 988 comprises two busbars 990, two spring members 996 and one release member 956. Each spring member 996 is situated comprises a portion below a port 940, disposed against the inner surface of the sides 920 of the body 918, and corresponds to one busbar 990. A wire lead inserted into the port 940 may contact the spring member 996 and be secured against a busbar 990. The release member 956, associated with one corresponding release button 954 (FIG. 43), extends between both spring members 996, permitting the simultaneous release of two wire leads being inserted into both ports 940 of one set 942.

Referring to FIG. 45, taken at the cross-section Z-Z of FIG. 42, each spring member 996 comprises a finger 998 extending from the spring member 996 disposed against the inner surface of one side 920 of the body 918, toward the busbar 990 disposed against one of the internal walls 986.

Figure 46:
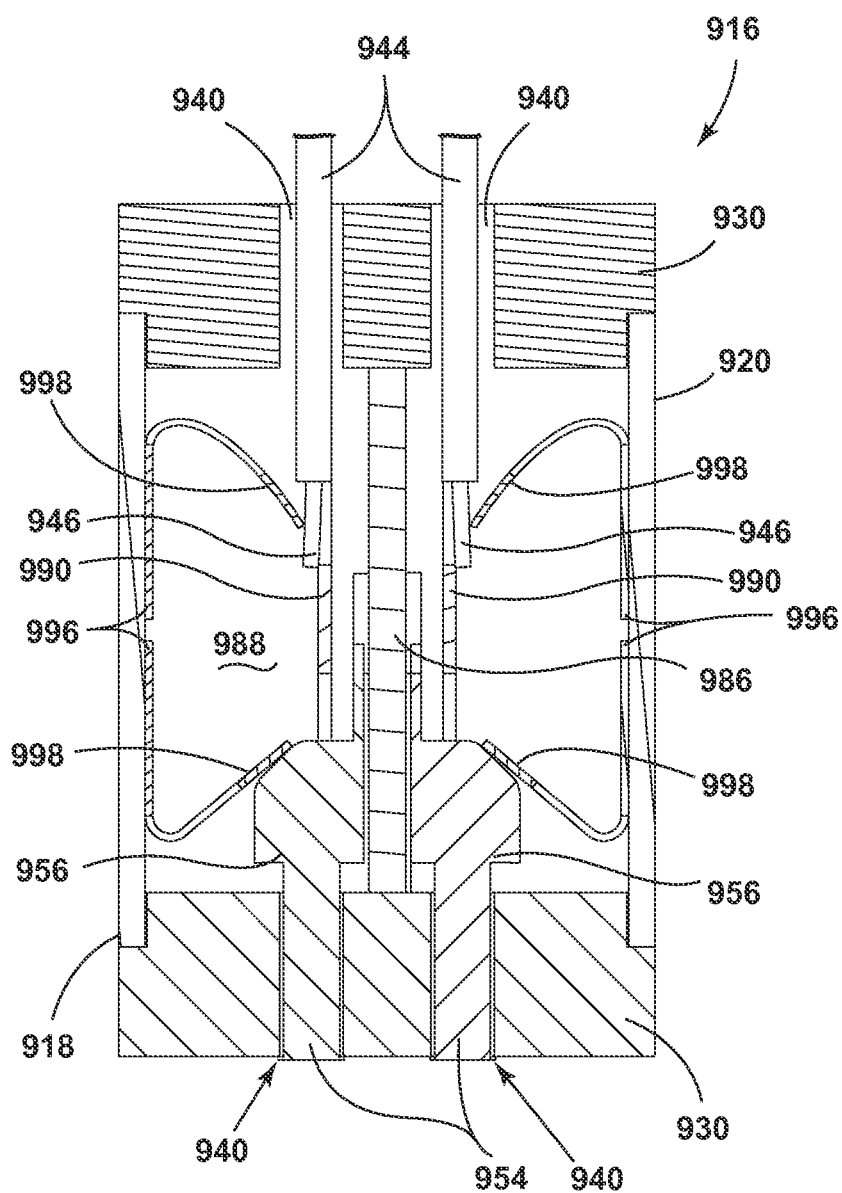
FIG. 46 illustrates the push-in connector of FIG. 45 with inserted wiring leads and depressed release buttons.

Referring to FIG. 46, also taken at the cross-section Z-Z of FIG. 42, the push-in connector 916 is shown with depressed release button 954 at the bottom, and inserted wiring leads at the top, having the release buttons 954 and release members 956 removed from the Figure. The finger 998 is situated within the internal recess 988 such that the insertion of a wire lead 944 having a wire tip 946 will bend the finger 998 toward the outer wall while forcing the wire lead 944 into contact with the busbar 990, securing the wire lead 944 against the busbar 990. The release member 956 is angled where depression of the release button 954, as shown, contacts the release member 956 and pushes the finger 998 away from the busbar 990, permitting the removal of an inserted wire lead. After removal of one or more wire leads from the ports 940, the release button 954 may be released and the finger 998 and release member 956 will return to their initial position.

Turning now to FIGS. 47 and 48, a seven-port embodiment of a push-in connector 1016 is shown. In FIG. 47, the push-in connector 1016 has a body 1020 comprising four unequal quadrants 1022 and two distal ends 1030. In the embodiment shown, three quadrants 1022a have an equal size while a fourth quadrant 1022b is smaller. Variations on this embodiment may comprise quadrants 1022 having multiple or differing sizes, being equal or unequal to one another. Each quadrant 1022 may contain indicia 1060 corresponding to a port 1040 on the distal end 1030 or a particular wire lead for insertion. The indicia 1060 may further comprise single switch indicia 1068 or dual switch indicia 1070, corresponding to the insertion of wire leads for a single or dual switch wiring scenarios, respectively. The single switch indicia 1068 may be disposed on a larger quadrant 1022*a*, identified, for example, as a fan quadrant 1022*a* by indicia 1060. The dual switch indicia may be disposed on the small quadrant 1022*b*, for example, as identified by light indicia 1060*b*. In further variations, the switch indicia 1068, 1070 may be disposed on any quadrant 1022 identified by any indicia 1060.

Each distal end 1030 comprises a single unit, but may be divided by grooves 1062 in sections to correspond to the size of the quadrants 1022, and couples to the assembled body 1020 with a push-lock 1032. Each distal end 1030 has seven ports 1040 disposed such that each of the three larger quadrants 1022*a* has two ports 1040, while the smaller quadrant 1022*b* has one port 1040 and a release port 1054. In a variation, the release port 1054 and the port 1040 of the smaller quadrant 1022*b* may be combined into an integrated port. The remaining six ports 1040 on the three larger quadrants 1022*a* are each associated with a corresponding release port 1054 disposed on the side of the quadrant 1022*a* for accepting the insertion of a release tool in an orientation perpendicular to the insertion of wire leads into the ports 1040.

FIG. 48 is an exploded view of the push-in connector 1016. The underside of one distal end 1030 is visible, and has ridges 1042 associated with the ports 1040 aligning with the three larger quadrants 1022*a*. Each ridge 1042 contains a male push-lock member 1036 designed to be accepted into a female push-lock member 1034 on the body 1020, which together form the push-lock 1032. Internally, the body 1020 comprises a system of walls 1086 defining internal recesses 1088. Each internal recess 1088 that is associated with one of the larger quadrants 1022*a* has a separator 1050 with a separator channel 1052. The separators 1050 extend into the internal recess 1088 from the outer wall of body 1020, between adjacent internal walls 1086. The internal recess 1088 associated with the smaller quadrant 1022*b* has a support 1056, disposed toward the center of the body 1020.

Within each internal recess 1088 is a busbar 1090. Busbars 1090*a* associated with the larger quadrants 1022*a* contain a busbar channel 1094, which inserts into the separator channel 1052, securing and aligning the busbar 1090*a* within the push-in connector 1016. The busbar 1090*b* associated with the small quadrant 1022*b* comprises a hook shape and inserts over the support 1056 such that the elbow of the hook-shaped busbar 1090*b* rests against the top of the support 1056.

Additionally, within each internal recess 1088 associated with each larger quadrant 1022*a* is a dual spring member 1092*a*. Each dual spring member 1092*a* contains four spring fingers 1096 for securing a wire lead against the busbar 1090*a*. The dual spring member 1092*a* associated with each of the large quadrants 1022*a*, slides into each internal recess 1088 between the walls 1086 and the separator 1050, wherein the separator 1050 holds the spring member 1092*a* aligned such that one spring finger 1096 corresponds to one port 1040. The spring fingers 1096 further align with the busbars 1090*a*, and may secure an inserted wire lead against the busbar 1090*a*. Regarding the small quadrant 1022*b*, a single spring member 1092*b* is disposed against the outer wall of the quadrant 1022*b*. The spring member 1092*b* includes two spring fingers 1096 that align with the ports 1040 of the small quadrant 1022*b*, and secures an inserted wire lead against the busbar 1090*b* within the smaller quadrant 1022*b*.

In variations, the ports 1040 and release ports 1054 may be disposed on the sides of the quadrants 1022 or the distal ends 1030 or any combination thereof. The busbars 1090 and spring members 1092 having spring fingers 1096 may further be disposed near an internal wall 1086 or an outer wall of each quadrant 1022, being associated with a busbar 1090. The organization of the ports 1040, as associated with a particular quadrant 1022, internal recess 1088, busbar 1090, or spring finger 1096 may vary, such that one or more wire leads inserted into one end of the push-in connector 1016 may electrically couple with one or more different wire leads inserted into the other end of the push-in connector 1016.

Figure 49:
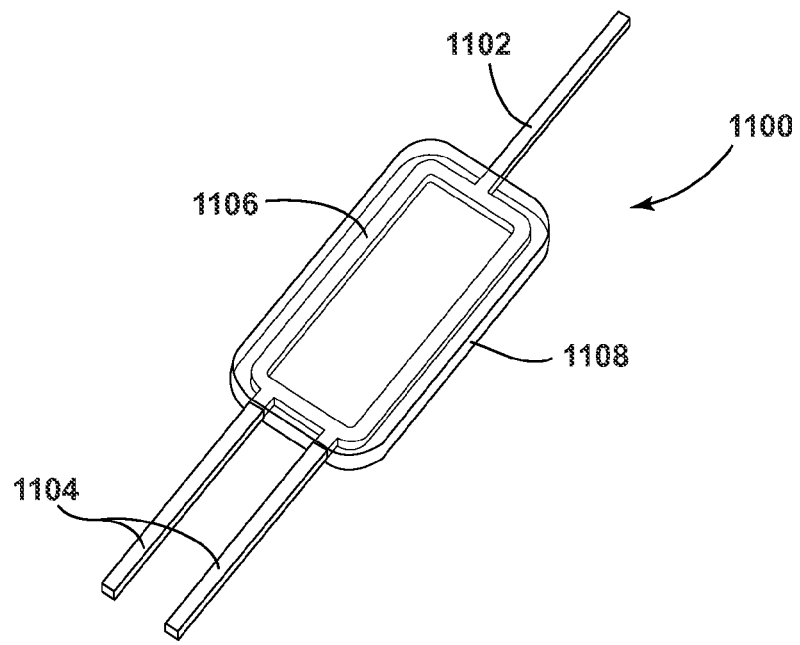
FIG. 49 illustrates a perspective view of a release tool for releasing inserted wire leads in any embodiment of the push-in connector.
Figure 50:
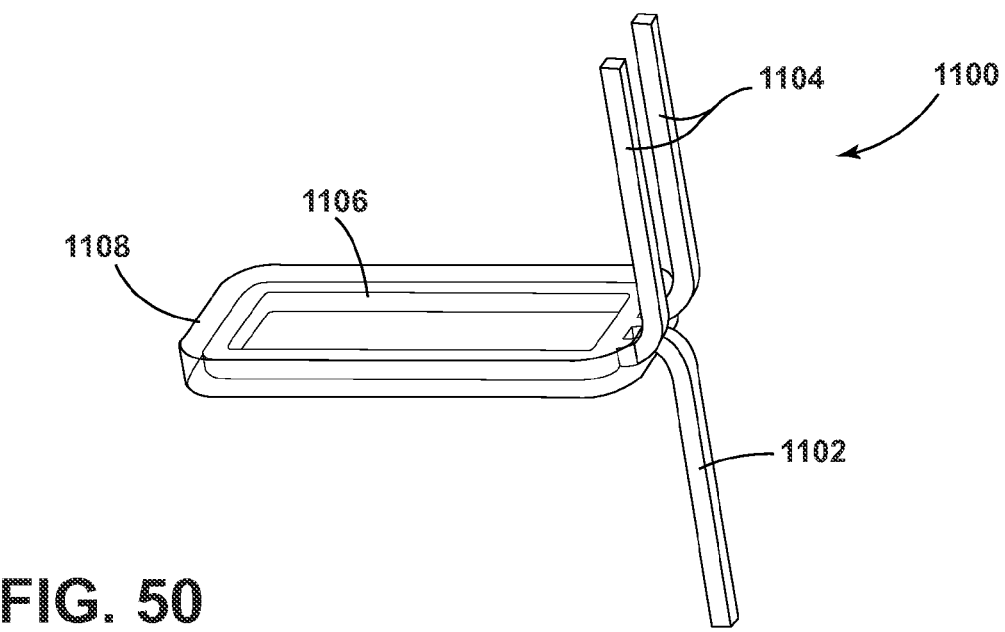
FIG. 50 illustrates a perspective view of a variation of the release tool of FIG. 49 having bent releases.

FIGS. 49 and 50 show a release tool 1100 that is adapted to insert into the release ports of any embodiment of the push-in connector disclosed herein that utilizes a release port. FIG. 49 shows the release tool 1100 having both a single release member 1102 and a dual release member 1104. A rigid body 1106 disposed within a housing 1108 connects the release members 1102, 1104 into a single unit. The housing 1108 may be made of soft, non-conductive materials such as rubber or plastic, while other materials are contemplated. Turning to FIG. 50, each release member 1102, 1104 may bend perpendicular to the body 1106, facilitating ease of use based upon the needs of a particular push-in connector.

In use, either the single release member 1102 or the dual release member 1104, depending on the particular push-in connector, may be inserted into one or more release ports on any of the push-in connectors disclosed herein. Upon insertion, the release member 1102, 1104 contacts a spring finger or any other release mechanism designed to release a wire lead, and pushes the spring finger away from the wire lead, permitting removal.

Turning now to FIGS. 51-58, schematic views of embodiments of push-in connectors and their respective electrical connections are shown. Each section containing a "G", "N", "F", or "L" represents a port 1240 disposed within a push-in connector 1216. Hereinafter, as shown, the "G" represents a ground or green port, the "N" represents a neutral or white port, the "F" represents a fan or live black port, and "L" represents a light or live blue port. Each port 1240 may be labelled with indicia shown as colors, icons, symbols, or any other representative labelling corresponding to a particular wire for insertion.

Figure 52:
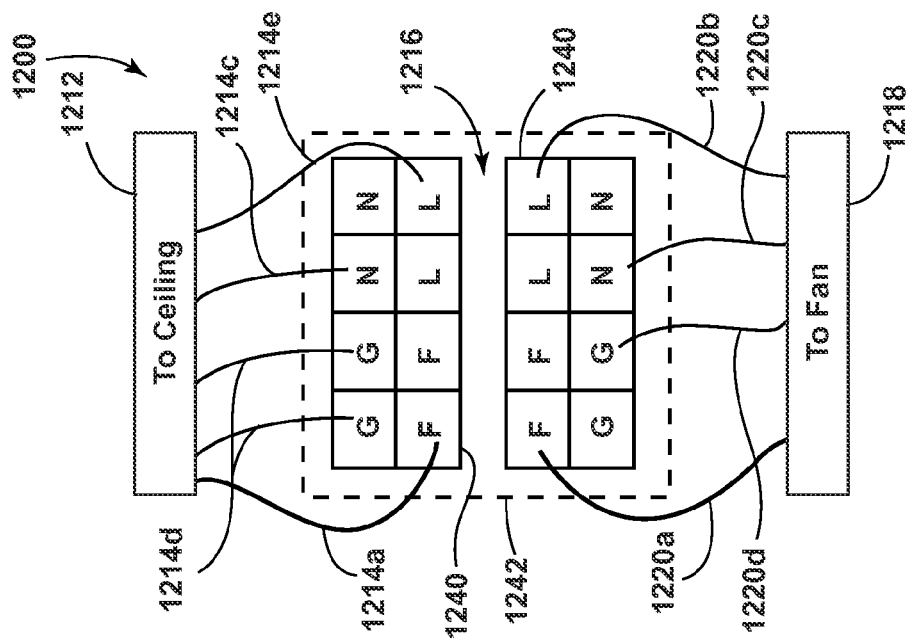
FIG. 52 illustrates a schematic view of the push-in connector of FIG. 51 electrically coupling a fan to structure wiring.
Figures 53, 54:
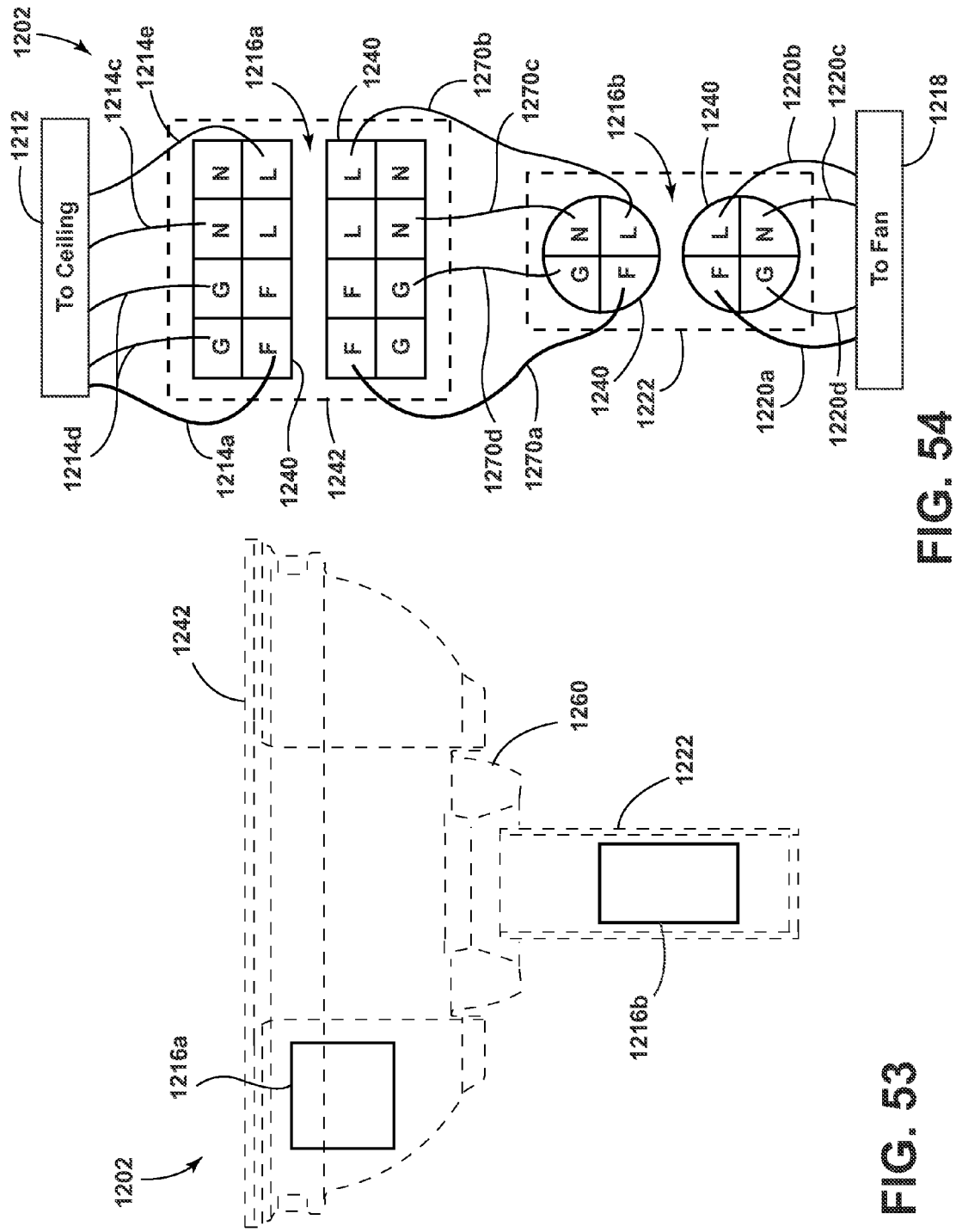
FIG. 53 illustrates a view of a push-in connector disposed within a ceiling fan canopy and another push-in connector disposed within a downrod according to another embodiment of the invention.
FIG. 54 illustrates a schematic view of the push-in connectors of FIG. 53 electrically coupling a fan to structure wiring.

FIGS. 52 and 54 show wiring scenarios utilizing two live wires for controlling a ceiling fan motor and light unit from two controllers, independent of one another, such as from two separate wall switches. Alternatively, FIGS. 56 and 58 show wiring scenarios utilizing a single live wire for controlling a ceiling fan motor from a single controller, which may simultaneously operate both the fan motor and the light unit. In variations on any of the scenarios, one or two live wires may be utilized in any embodiment, enabling either wiring scenario, controlling the fan motor and light unit from one or two sources.

Figure 51:
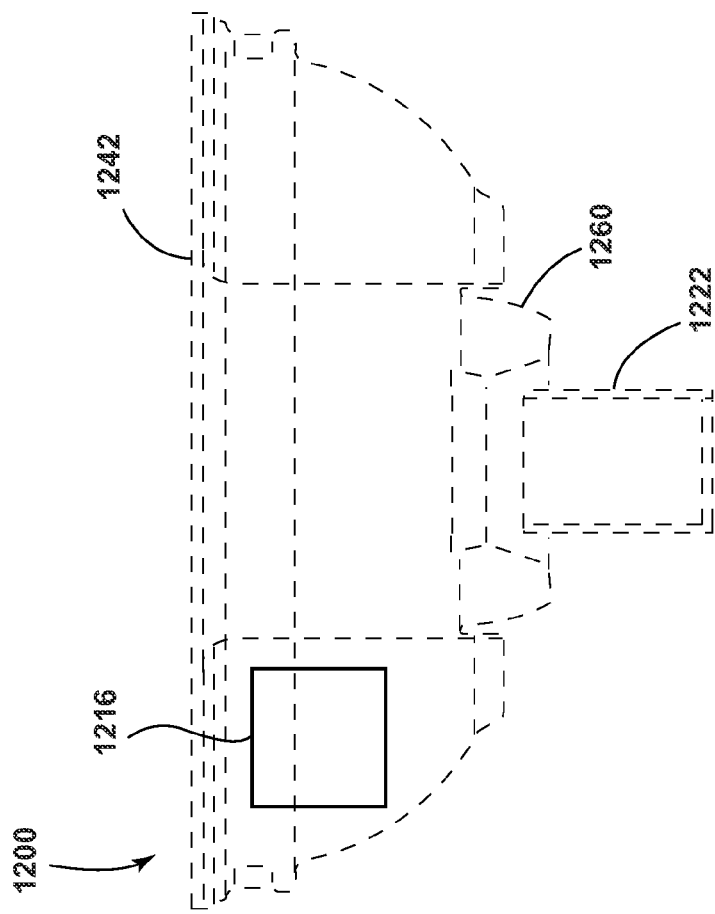
FIG. 51 illustrates a view of a push-in connector disposed within a ceiling fan canopy according to another embodiment of the invention.

Turning to FIG. 51, a first wiring scenario 1200, with a push-in connector 1216, such as the eight-port push-in connector of FIG. 42, is shown as mounted within a canopy 1242, but may alternatively mount to a hanger bracket 1260. A downrod 1222, pre-wired or otherwise, is mounted to and extends from the hanger bracket 1260. Alternate embodiments may utilize any other push-in connectors as disclosed herein. Turning now to FIG. 52, electrical wiring leads 1214*a*, 1214*c*, 1214*d*, 1214*e* from a ceiling 1212 may couple to the push-in connector 1216 and fan wiring leads 1220*a*-1220*d* from a fan motor assembly 1218 may couple to the push-in connector 1216 opposite of the electrical wiring leads 11214*a*, 1214*c*, 1214*d*, 1214*e*, electrically coupling the fan motor assembly 1218 to the structure power supply.

Electrical wiring leads 1214*a*, 1214*c*, 1214*d*, 1214*e* comprising a live black wire 1214*a*, white neutral wire 1214*c*, two green ground wires 1214*d*, and live red wire 1214*e* electrically couple to the push-in connector 1216 at the black fan port F, white neutral port N, two green ground ports G and blue light port L, respectively. The ceiling fan wiring leads 1220*a*, 1220*b*, 1220*c*, 1220*d* comprising a black fan wire 1220*a*, blue light wire 1220, white neutral wire 1220*c*, and green ground wire 1220*d* electrically couple to the black fan port F, the blue light port L, the white neutral port N, and the green ground port G, respectively. Utilizing the push-in connector 1216 facilitates easy wiring between the structure electrical supply and the fan motor and light unit.

Turning now to FIG. 53, a second wiring setup 1202 with a first push-in connector 1216*a* having eight ports, such as the push-in connector of FIG. 42, mounts within the canopy 1242, but may alternatively mount to the hanger bracket 1260, and a second push-in connector 1216*b*, such as the push-in connector of FIG. 37, mounts within the pre-wired downrod 1222. In variations, any push-in connector embodiment may be substituted for either push-in connector 1216*a*, 1216*b*.

Turning to FIG. 54, electrical wiring leads 1214*a*, 1214*c*, 1214*d*, 1214*e* from the ceiling 1212 couple to the first push-in connector 1216*a* and fan wiring leads 1220*a*-1220*d* from the fan motor assembly 1218 couple to the second push-in connector 1216*b*. The fan wiring leads 1220*a*-1220*d* are electrically couples to the electrical wiring leads 1214*a*, 1214*c*, 1214*d*, 1214*e* by coupling the two push-in connectors 1216*a*, 1216*b* to one another using downrod wiring leads 1270*a*-1270*d*, providing electrical power to the fan motor assembly 1218.

Electrical wiring leads 1214*a*, 1214*c*, 1214*d*, 1214*e* comprising the live black wire 1214*a*, white neutral wire 1214*c*, two green ground wires 1214*d*, and live red wire 1214*e* couple to the black fan port F, white neutral port N, two green ground ports G, and blue light port L, respectively, of the first push-in connector 1216*a*. On the opposite end of the first push-in connector 1216*a*, downrod wiring leads 1270*a*-1270*d* comprising the black fan wire 1270*a*, blue light wire 1270*b*, white neutral wire 1270*c*, and green ground wire 1270*d* electrically couple to black fan port F, blue tight port L, white neutral port N, and green ground port G, respectively, on both of the push-in connectors 1216*a*, 1216*b*. The second push-in connector 1216*b*, opposite of the downrod wiring leads 1270*a*-1270*d*, couples to the fan wiring leads 1220*a*-1220*d* comprising the black fan wire 1220*a*, blue light wire 1220*b*, white neutral wire 1220*c*, and green ground wire 1220*d* to the black fan port F, blue light port L, white neutral port N, and green ground port G, respectively. Upon completing the push-in connections between the push-in connectors 1216*a*, 1216*b*, the fan motor assembly 1218 electrically couples to the structure power supply. Utilizing both push-in connectors 1216*a*, 1216*b* facilitates easy wiring connections, enabling an installer to quickly connect wiring leads from both the structure and the fan motor assembly 1218. After mounting the ceiling fan assembly to the ceiling 1212, the electrical connections may be quickly and easily completed by connecting wiring leads between the two push-in connectors 1216*a*, 1216*b*.

FIG. 55 shows a third wiring set-up 1204, with two push-in connectors 1216*a*, 1216*b* disposed within the canopy 1242, including the first push-in connector 1216*a*, which may have eight ports 1240 disposed either ends, and the second push-in connector 1216*b* which may have four ports 1240 disposed on either ends. The first push-in connector 1216*a* may comprise the push-in connector of FIG. 42 and the second push-in connector 1216*b* may comprise the push-in connector of FIG. 37. In variations, any push-in connector disclosed herein, having any number of ports 1240 may be utilized in place of either push-in connector 1216*a*, 1216*b*. The push-in connectors 1216*a*, 1216*b* may either mount to the canopy 1242 or to the hanger bracket 1260. A receiver 1272, for receiving a signal from a remote source, mounts within the canopy 1242 and may mount to either the canopy 1242 or the hanger bracket 1260.

Turning to FIG. 56, the electrical wiring leads 1214*a*, 1214*c*, 1214*d* couple to the first push-in connector 1216*a* and the first push-in connector 1216*a* couples to the second push-in connector 1216*b*, interconnecting the receiver 1272 between them. The second push-in connector 1216*b* couples to the fan wiring leads 1220*a*-1220*d*, electrically coupling the fan motor assembly 1218 and the receiver 1272 to the structure power supply.

Electrical wiring leads 1214*a*, 1214*c*, 1214*d* comprising the live black wire 1214*a*, white neutral wire 1214*c*, and two green ground wires 1214*d* couple to the first push-in connector 1216*a*. The set of downrod wiring leads 1270*a*-1270*d* utilized with a set of receiver wiring leads 1274*a*, 1274*c* interconnect the receiver 1272 and the two push-in connectors 1216*a*, 1216*b*. The white neutral wire 1270*c* and green ground wire 1270*d* couple the two push-in connectors 1216*a*, 1216*b* at the white neutral port N and green ground port G, respectively, while the black fan wire 1270*a* and the blue light wire 1270*b* couple to the black fan port F and blue light port L of the second push-in connector 1216*b*, coupling the second push-in connector 1216*b* to the receiver 1272. The receiver wiring leads comprising the black fan wire 1274*a* and white neutral wire 1274*c*, couple the first push-in connector 1216*a* to the receiver 1272 at the black fan port F and white neutral port C, respectively. At completion of the connection of the downrod wiring leads 1270*a*-1270*d* and the receiver wiring leads 1274*a*, 1274*c*, the first push-in connector 1216*a* is electrically coupled to the second push-in connector 1216*b* with the receiver 1272 electrically coupled between the two.

Fan wiring leads 1220*a*-1220*d* comprising the black fan wire 1220*a*, blue light wire 1220*b*, white neutral wire 1220*c*, and green ground wire 1220*d* are coupled to the black fan port F, blue light port L, white neutral port C, and green ground port G, respectively, at the remaining end of the second push-in connector 1216*b*. The completed connections electrically couple the fan motor assembly 1218 to the structure power supply while simultaneously providing power to the receiver 1272.

Utilizing both push-in connectors 1216*a*, 1216*b* facilitates easy wiring connections, enabling an installer to quickly connect wiring leads from both the ceiling 1212 and the fan motor assembly 1218. The ceiling fan assembly may be mounted to the ceiling while wiring connections may be quickly and easily completed without the need to hold the fan during wiring.

FIG. 57 shows a fourth wiring set-up 1206 with three push-in connectors 1216*a*, 1216*b*, 1216*c*. The first push-in connector 1216*a*, receiver 1272, and second push-in connector 1216*b* are disposed within the canopy 1242, and the third push-in connector 1216*c* is disposed within the pre-wired downrod 1222. The first push-in connector 1216a may comprise the push-in connector of FIG. 42 and the second and third push-in connectors 1216b, 1216c may comprise the push-in connector of FIG. 37. In variations, the push-in connectors 1216a, 1216b, 1216c may comprise any embodiment of the push-in connector described herein and may comprise any combination thereof utilizing any number of ports.

Turning to FIG. 58, electrical wiring leads 1214a, 1214c, 1214d from the ceiling 1212 may couple to the first push-in connector 1216a, which may in turn couple to the receiver 1272 and the second push-in connector 1216b by utilizing wiring leads 1270a-1270d and receiver wiring leads 1274a, 1274c. The second push-in connector 1216b may electrically couple to the third push-in connector 1216c in the pre-wired downrod 1222 with additional downrod wiring leads 1270a-1270d, which electrically couple to the fan motor assembly 1218 with fan wiring leads 1220a-1220d. Upon completion of the electrical connections, the motor and the light unit are electrically coupled to the structure power supply white simultaneously providing power to the receiver 1272.

Electrical wiring leads 1214a, 1214c, 1214d comprising the black live wire 1214a, white neutral wire 1214c, and two green ground wires 1214d couple to the first push-in connector 1216a at the black fan port F, white neutral port N, and two green ground ports G, respectively. On the opposite end of the first push-in connector 1216a, the white neutral wire 1270c and green ground wire 1270d couple to the white neutral port N and green ground port G, respectively. Further, receiver wiring leads 1274a, 1274c comprising the black fan wire 1274a and white neutral wire 1274c couple the receiver 1272 to the first push-in connector 1216a at the black fan port F and a second white neutral port N, respectively. The receiver 1272 also couples to the second push-in connector 1216b with wiring leads comprising the black fan wire 1270a and blue light wire 1270b coupling to the black fan port F and blue light port L, respectively.

The second push-in connector 1216b electrically couples to the third push-in connector 1216c with downrod wiring leads 1270a-1270d comprising the black fan wire 1270a, blue light wire 1270b, white neutral wire 1270c, and green ground wire 1270d being inserted into the black fan ports F, blue light ports L, white neutral ports N, and green ground ports G, respectively, of each push-in connector 1216b, 1216c.

The third push-in connector 1216c couples to the fan motor assembly 1218 with fan wiring leads 1220a-1220d comprising the black fan wire 1220a, blue light wire 1220b, white neutral wire 1220c, and green ground wire 1220d being inserted into the black fan port F, blue light port L, white neutral port N, and green ground port G, respectively. At completion of the push-in wiring connections, the fan motor assembly 1218 electrically couples to the structure power supply white simultaneously providing power to the receiver 1272.

Utilizing all three push-in connectors 1216a, 1216b, 1216c facilitates easy wiring connections, enabling an installer to quickly connect wiring leads from both the structure and the fan motor assembly. After mounting the ceiling fan assembly to the structure, the electrical connections may be quickly and easily completed by connecting wiring leads between the two push-in connectors within the canopy as well as connect to the push-in connector within the downrod after mounting the downrod to the hanger bracket.

As has been previously described herein, the components and electrical connections described in FIGS. 51-58 are by way of example only and are not limiting. Variations on the amount and type of push-in connectors 1216, wiring connections, and components such as the canopy 1242, hanger 1260, pre-wired downrod 1222, and receiver 1272, are contemplated, in which some elements may be optional. The wiring leads comprising electrical wiring leads 1214, fan wiring leads 1220, downrod wiring leads 1270, and receiver wiring leads 1274 may be varied or implemented in alternative manners such that an electrical connection is made between incorporated components.

Utilizing all three push-in connectors facilitates easy wiring connections, enabling an installer to quickly connect wiring leads from both the structure and the fan motor assembly. After mounting the ceiling fan assembly to the structure, the electrical connections may be quickly and easily completed by connecting wiring leads between the two push-in connectors within the canopy as well as connect to the push-in connector within the downrod after mounting the downrod to the hanger bracket.

As has been previously described herein, the components and electrical connections described in FIGS. 51-58 are by way of example only and are not limiting. Variations on the amount and type of push-in connectors 1216, wiring connections, and components such as the canopy 1242, pre-wired downrod 1222, receiver 1272, and push-in connectors 1216 are contemplated, in which some elements may be optional. The wiring leads comprising electrical wiring leads 1214a-1214e, fan wiring leads 1220a-1220d, downrod wiring leads 1270a-1270d, and receiver wiring leads 1274a, 1274c may be varied or implemented in alternative manners such that an electrical connection is made between incorporated components.

Turning now to FIGS. 59 and 60, a push-in connector which may support a dual switch wiring scenario without the use of a jumper is shown. FIG. 59 shows the push-in connector 1316 comprises a body 1320 having a plug portion 1324 and a socket portion 1326, each comprising a distal end 1330 having a plurality of ports 1340 associated with a plurality of release ports 1354. The plug portion 1324 and the socket portion 1326 are releasably connectable at a proximal end of both portions 1324, 1326. The ports 1340 and release ports 1354 are connected by a plurality of internal recesses 1388 as defined by a series of internal walls 1386 disposed within the body 1320 of the push-in connector 16.

In the socket portion 1326, one internal recess 1388 has a short busbar 1390b, comprising a spring finger 1396 and a busbar prong 1380, while the remaining internal recesses 1388 may comprise a standard length busbar 1390a comprising both a spring finger 1396 and an engagement ridge 1398. The internal recess 1388 comprising the short busbar 1390 connects to one standard length busbar 1390a in an adjacent internal recess 1388 via a channel 1384. The busbar prong 1380 is disposed within the channel 1384 such that the spring finger 1396 of the adjacent standard length busbar 1390a may contact and electrically couple with the short busbar 1390, permitting an inserted wire contacting the short busbar 1390b to electrically couple to a wiring lead inserted into the distal end 1330 of the plug portion 1324.

Turning to FIG. 60, an inserted wire 1314 will deflect the spring finger 1396 to electrically uncouple the adjacent short busbar 1390b and the standard length busbar 1390a by forcing the spring finger 1396 of the standard length busbar away from the busbar prong 1380, facilitating the separation between inserted live fan and light wiring leads, permitting individual control of the fan motor and light unit in a dual switch wiring scenario. In this manner, the selection of a single switch or dual switch wiring scenario can be accomplished by the mere insertion of the wiring lead into the proper port. The port can carry an appropriate indica to indicate whether it is for a single or dual switch wiring scenario. This structure can be applied to other alternative wiring configurations where a jumper would traditional be used.

Electrical connectors having push-in ports allow for even quicker and easier electrical connectivity when installing a ceiling fan. Push-in ports having indicia allow an inexperienced installer to quickly identify the appropriate electrical connections to be made between wires. Furthermore, electrical connectors having jumper switches facilitate quick and easy installation of a ceiling fan where the fan or lighting element may have multiple control sources requiring the connection of multiple live wires. The jumper switch allows an installer to easily adjust the electrical connections to the ceiling based upon a single or dual control setup.

Figure 61:
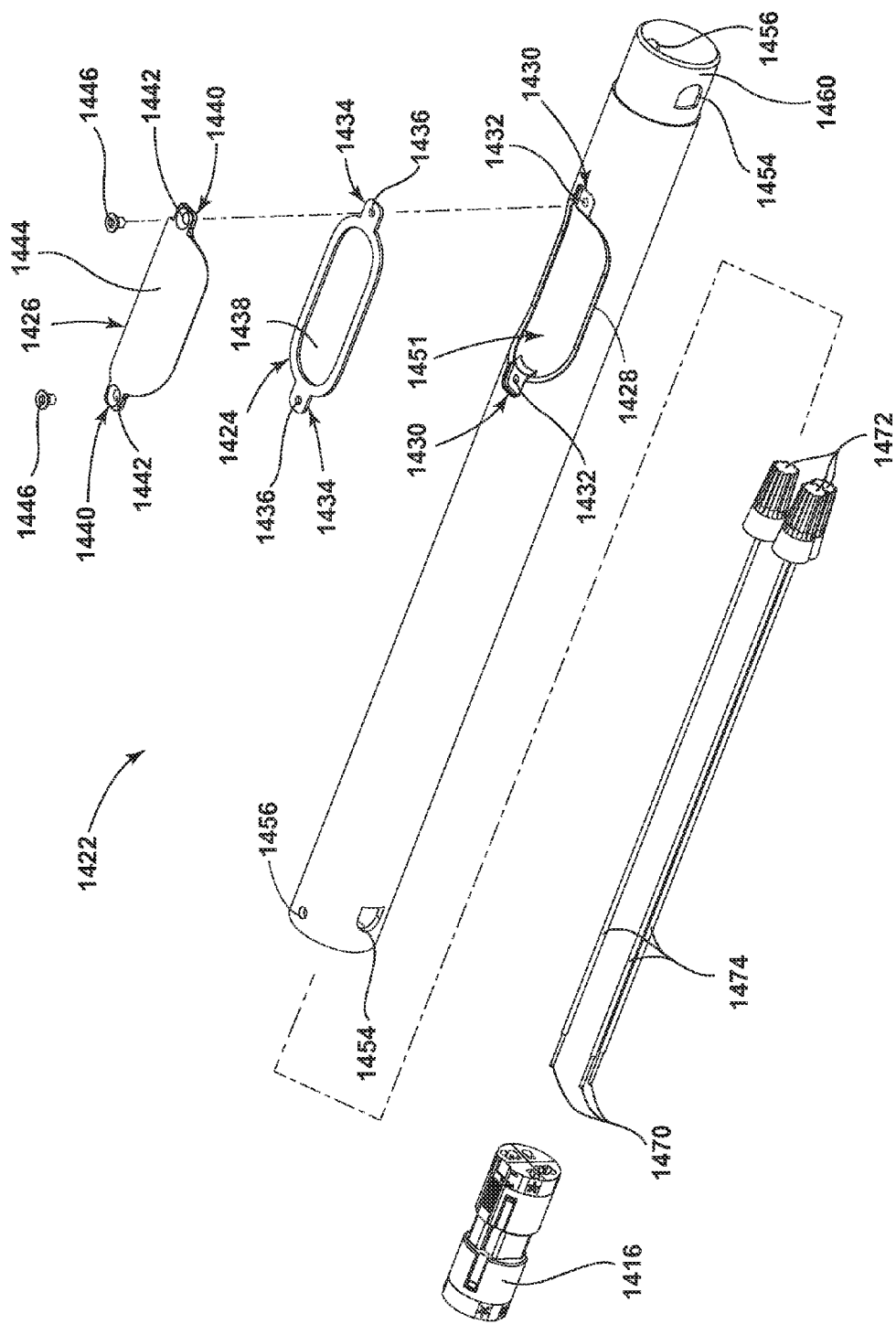
FIG. 61 illustrates an exploded view of a downrod having a recessed and flush mounted cover plate.

Turning to FIG. 61, an exploded view of an alternative downrod 1422 is shown. The downrod 1422 can be similar to the downrod 122 illustrated in FIGS. 21-23, however, the downrod 1422 in FIG. 61 comprises a gasket 1424 and a flush-mounted mounting cover 1426 to cover an opening 1451 rather than the slide cover 152. Similar elements from FIGS. 21-23 will be identified with similar numerals increased by a value of 1300, except for a set of wires identified by 1471 and a set of wiring nuts identified by 1472. The opening 1451 is defined by a groove 1428 having two mounting surfaces 1430 with a set of first holes 1432 disposed on both longitudinal ends of the groove 1428 with respect to the longitudinal length of the downrod 1422. The gasket 1424 comprises two gasket extensions 1434, each having a second hole 1436, adapted to be received at the mounting surfaces 1430. The gasket 1424 further comprises an aperture 1438 that can be used to feed wiring through the gasket 1424 to complete electrical connections. The mounting cover 1426 comprises an arcuate body 1444 with an arcuate shape complementary to that of the downrod 1422. The mounting cover 1426 comprises two cover extensions 1440 having third holes 1442, complementary to the mounting surfaces 1430 and the first holes 1432. A set of screws 1446 can be inserted into the third holes 1442, through the second holes 1436 of the gasket 1424, and into the first holes 1432 such that the mounting cover 1426 couples to the downrod 1422 with the gasket 1424 disposed therebetween. The mounting cover 1426 is shaped to be received within the groove 1428, defining a flush mount with the downrod 1422 such that a smooth surface is defined between the downrod 1422 and the mounting cover 1426.

It can be appreciated that the mounting cover 1426 and the gasket 1424 are removably attachable to the downrod 1422 for ease of removal for making electrical wiring connections through the opening 1451. The gasket 1424 defines a seal at the opening 1451, providing outdoor use for the downrod 1422. The flush-mounted mounting cover 1426 combines a simple, aesthetically pleasing solution for making electrical connections within a downrod, without the need to remove the downrod from a fan motor, or remove a ceiling fan from the ceiling or structure. It should be understood that as used herein the term "ceiling" of a structure is intended to include not only the conventional ceiling of a building or house, but also any other structure, which can support a ceiling fan such as an exposed beam, post, or the like.

It should be further understood that as used herein the term "busbar" is intended to include any member constructed of electrically conductive material intended to electrically couple two electrically conductive elements or facilitate electrical connectivity between two electrically conductive elements.

It should be further understood that as used herein the term "hanger bracket" is intended to include any member adapted to mount the ceiling fan assembly to the ceiling and may comprise a bracket, mounting plate, or otherwise.

It thus is seen that a ceiling fan is now provided that overcomes problems associated with the prior art. It should be understood that many modifications may be made to the disclosed embodiment described herein without departure from the spirit and scope of the technology as described herein.

While the invention has been described in connection with certain specific embodiments thereof, it is to be understood that this is by way of illustration and not of limitation. Reasonable variation and modification are possible within the scope of the forgoing disclosure and drawings without departing from the spirit of the invention, which is defined in the appended claims.

The invention claimed is:

1. An electrical connector comprising:
   a plug having a first set of push-in ports, including at least two live wire push-in ports;
   a socket having a second set of push-in ports, including at least two live wire push-in ports; and
   a jumper switch provided on one of the plug or socket and operable between a first position and a second position;
   wherein at least one of the corresponding at least two live wire push-in ports on the plug are electrically disconnected from at least one of the corresponding at least two live wire push-in ports on the socket when the jumper switch is the first position; and
   wherein the at least two live wire push-in ports on the plug are electrically connected with the at least two live wire push-in ports on the socket when the jumper switch is in the second position.

2. The electrical connector of claim 1 wherein the jumper switch is provided on the socket.

3. The electrical connector of claim 1 wherein each of the first and second sets of push-in ports comprise at least a fan wire port, a light wire port, a ground wire port, and a neutral wire port, with the fan wire port and the light port defining the live wire push-in ports.

4. The electrical connector of claim 3 wherein one of the first and second sets of push-in ports further comprises a second light port and a second neutral port, and the other of the first and second sets of push-in ports comprises a second ground port.

5. The electrical connector of claim 4 wherein the first set of push-in ports comprises the second ground port.

6. The electrical connector of claim 5 wherein the first and second positions of the jumper switch correspond to a first condition and a second condition, respectively.

7. An electrical connector comprising:
   a body having a first set of push-in ports, including at least two live wire push-in ports, and a second set of push-in ports, including at least two live wire push-in ports; and
   a jumper switch carried by the body and operable between a first position representative of a first condition and a second position representative of a second condition, where the corresponding at least one of the live wire push-in ports of the at least two live wire push-in ports on each of the first set and second set are electrically disconnected in the first condition, and where the corresponding at least two live wire push-in ports of each of the first and second sets are electrically connected in the second condition.

8. The electrical connector of claim 7 wherein each of the first and second sets of push-in ports comprise at least a fan wire port, a light wire port, a ground wire port, and a neutral wire port, with the fan wire port and the light port defining the live wire push-in ports.

9. The electrical connector of claim 8 wherein one of the first and second sets of push-in ports further comprises a second light port and a second neutral port, and the other of the first and second sets of push-in ports comprises a second ground port.

10. The electrical connector of claim 9 wherein the first set of push-in ports comprises the second ground port.

11. The electrical connector of claim 10 wherein the jumper switch is operable between first and second positions, which correspond to the first and second conditions, respectively.

12. The electrical connector of claim 7 wherein the body has opposing ends and the first set of push-in ports is located on one of the opposing ends and the second set of push-in ports is located on the other of the opposing ends.

* * * * *